(12) United States Patent
Fukutomi et al.

(10) Patent No.: US 8,341,497 B2
(45) Date of Patent: Dec. 25, 2012

(54) SEMICONDUCTOR STORAGE

(75) Inventors: Kazuhiro Fukutomi, Kanagawa (JP); Hideaki Sato, Kanagawa (JP); Shinichi Kanno, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 423 days.

(21) Appl. No.: 12/713,631

(22) Filed: Feb. 26, 2010

(65) Prior Publication Data

US 2010/0223531 A1    Sep. 2, 2010

(30) Foreign Application Priority Data

Feb. 27, 2009    (JP) ................... 2009-047304

(51) Int. Cl.
*G11C 29/00* (2006.01)
*G06F 11/00* (2006.01)

(52) U.S. Cl. ........................ 714/766; 714/6.22

(58) Field of Classification Search .......... 714/718, 714/766, 800, 704, 736, 763, 6.2, 6.21, 701, 714/6.22; 711/100, 114, 200; 365/185.33, 365/200, 201

See application file for complete search history.

(56) References Cited

U.S. PATENT DOCUMENTS

| | | | |
|---|---|---|---|
| 6,970,310 B2 * | 11/2005 | Kawaguchi et al. | 360/31 |
| 7,496,811 B2 | 2/2009 | Kanno | |
| 7,551,478 B2 | 6/2009 | Kanno | |
| 7,590,919 B2 | 9/2009 | Kanno | |
| 2007/0273709 A1 * | 11/2007 | Kimura et al. | 345/619 |
| 2008/0205145 A1 | 8/2008 | Kanno | |
| 2008/0320375 A1 * | 12/2008 | Hori et al. | 714/807 |
| 2009/0177944 A1 | 7/2009 | Kanno | |
| 2009/0183052 A1 | 7/2009 | Kanno et al. | |
| 2009/0222628 A1 | 9/2009 | Yano et al. | |
| 2009/0327604 A1 | 12/2009 | Sato et al. | |
| 2009/0327802 A1 | 12/2009 | Fukutomi et al. | |
| 2009/0327803 A1 | 12/2009 | Fukutomi et al. | |
| 2010/0005228 A1 | 1/2010 | Fukutomi et al. | |
| 2010/0011260 A1 | 1/2010 | Nagadomi et al. | |
| 2010/0037009 A1 | 2/2010 | Yano et al. | |
| 2010/0049907 A1 | 2/2010 | Kitsunai et al. | |
| 2010/0077266 A1 | 3/2010 | Kanno et al. | |
| 2011/0016266 A1 | 1/2011 | Asano et al. | |

OTHER PUBLICATIONS

David A. Patterson, et al., "A Case for Redundant Arrays of Inexpensive Disks (RAID)", Proceedings of the 1988 ACM SIGMOD, 1988, pp. 109-116.
U.S. Appl. No. 13/035,194, filed Feb. 25, 2011, Fukutomi, et al.
U.S. Appl. No. 13/038,804, filed Mar. 2, 2011, Yamamoto, et al.
U.S. Appl. No. 12/883,796, filed Sep. 16, 2010, Fukutomi, et al.
U.S. Appl. No. 13/218,812, filed Aug. 26, 2011, Fukutomi, et al.

\* cited by examiner

*Primary Examiner* — Phung M Chung
(74) *Attorney, Agent, or Firm* — Oblon, Spivak, McClelland, Maier & Neustadt, L.L.P.

(57) ABSTRACT

A semiconductor storage includes a receiver configured to receive a write request from a host device; a storage unit configured to hold redundancy data generation/non-generation information; a writing unit configured to write data in a semiconductor memory array and write redundancy data generation/non-generation information of the written data in the storage unit; a first data extracting unit configured to extract data whose redundancy data is not generated from among the data held by the semiconductor memory array; a first redundancy data generating unit configured to generate redundancy data; a first redundancy data writing unit configured to write the generated redundancy data in the semiconductor memory array; and a first redundancy data generation/non-generation information updating unit configured to update the redundancy data generation/non-generation information of the data whose redundancy data held by the storage unit is generated.

20 Claims, 42 Drawing Sheets

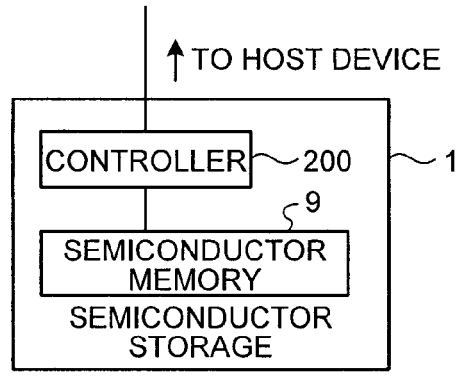
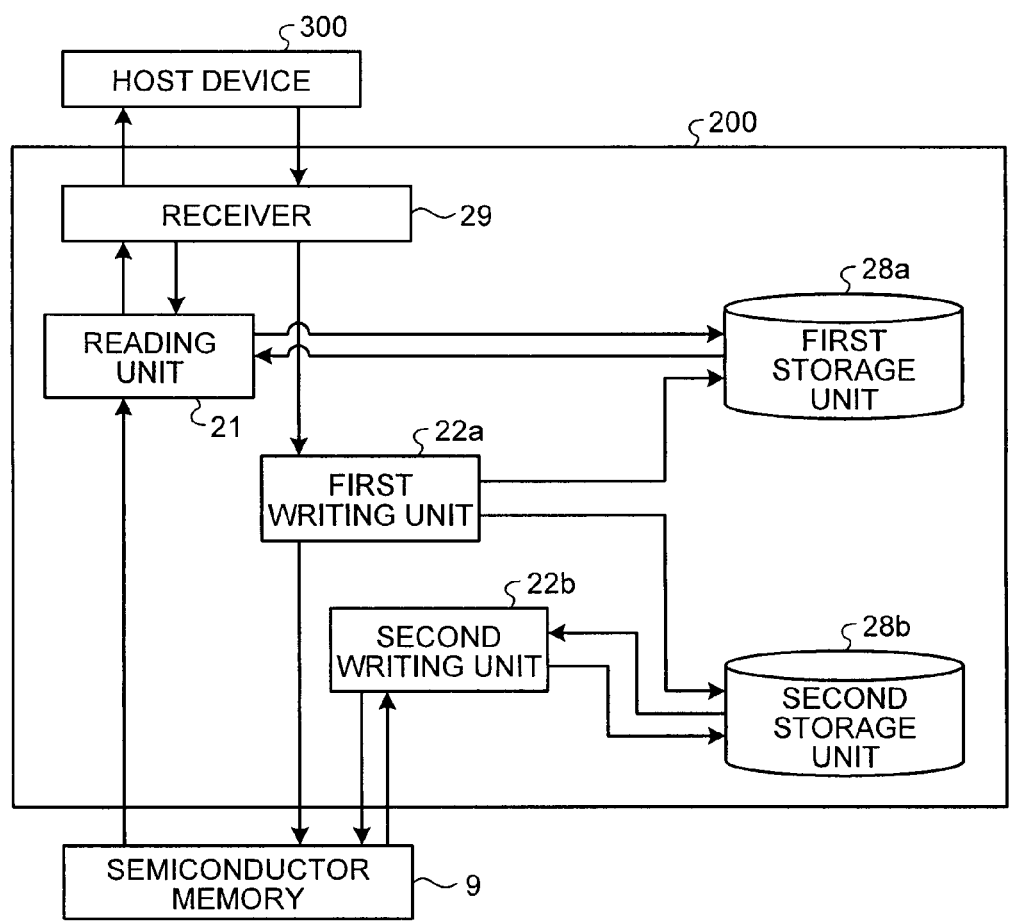

FIG.9A  ADDRESS TABLE 11

| ADDRESS AREA | BLOCK NUMBER |
|---|---|
| 0 | 0 |
| 1 | 1 |
| 2 | 2 |
| 3 | 3 |
| 4 | 4 |
| 5 | 5 |
| 6 | 6 |
| 7 | 7 |

FIG.9B  BLOCK TABLE 12

| BLOCK NUMBER | BLOCK STATE |
|---|---|
| 0, 1, 2, 3, 4, 5, 6, 7 | ADDRESS ALLOCATION |
| 8, 9 | PARITY ALLOCATION |
| 10, 11, 12 | NON-ALLOCATION |

FIG.9C  PARITY CORRESPONDENCE LIST 39

| GROUP NUMBER | DATA BLOCK GROUP | PARITY BLOCK GROUP |
|---|---|---|
| 0 | 0, 1, 2 | 8 |
| 1 | 3, 4, 5 | 9 |

| ADDRESS AREA | BLOCK NUMBER |
|---|---|
| 0 | 0→10 |

| BLOCK NUMBER | BLOCK STATE |
|---|---|
| 0 | →NON-ALLOCATION |
| 8 | →NON-ALLOCATION |
| 10 | →ADDRESS ALLOCATION |

| GROUP NUMBER | DATA BLOCK GROUP | PARITY BLOCK GROUP |
|---|---|---|
| 1 | 3, 4, 5 | 9 |

FIG.13A

| ADDRESS AREA | BLOCK NUMBER |
|---|---|
| 0 | 10 |
| 1 | 1 |
| 2 | 2 |
| 3 | 3 |
| 4 | 4 |
| 5 | 5 |
| 6 | 6 |
| 7 | 7 |

FIG.13B

| BLOCK NUMBER | BLOCK STATE |
|---|---|
| 0 | NON-ALLOCATION |
| 1<br>2<br>3<br>4<br>5<br>6<br>7 | ADDRESS ALLOCATION |
| 8 | NON-ALLOCATION |
| 9 | NON-ALLOCATION |
| 10 | ADDRESS ALLOCATION |
| 11<br>12 | PARITY ALLOCATION |

FIG.13C

| GROUP NUMBER | DATA BLOCK GROUP | PARITY BLOCK GROUP |
|---|---|---|
| 2 | 1, 2, 3 | 11 |
| 3 | 4, 5, 6 | 12 |

FIG.14A

| ADDRESS AREA | BLOCK NUMBER |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |

FIG.14B

| BLOCK NUMBER | BLOCK STATE |
|---|---|
| 0, 1, 2, 3, 4, 5, 6, 7, 8, 9, 10, 11 | ADDRESS ALLOCATION |
| 12, 13, 14, 15 | PARITY ALLOCATION |
| 16, 17, 18, 19, 20 | NON-ALLOCATION |

| GROUP NUMBER | DATA BLOCK GROUP | PARITY BLOCK GROUP |
|---|---|---|
| 0 | 0, 1, 2 | 12 |
| 1 | 3, 4, 5 | 13 |
| 2 | 6, 7, 8 | 14 |
| 3 | 9, 10, 11 | 15 |

| ADDRESS AREA | BLOCK NUMBER |
|---|---|
| 1 | 1→16 |
| 6 | 6→17 |
| 7 | 7→18 |

| BLOCK NUMBER | BLOCK STATE |
|---|---|
| 1<br>6<br>7 | →NON-ALLOCATION |
| 12<br>14 | →NON-ALLOCATION |
| 16<br>17<br>18 | →ADDRESS ALLOCATION |

| GROUP NUMBER | DATA BLOCK GROUP | PARITY BLOCK GROUP |
|---|---|---|
| 1 | 3, 4, 5 | 13 |
| 3 | 9, 10, 11 | 15 |

FIG.16A

| ADDRESS AREA | BLOCK NUMBER |
|---|---|
| 0 | 0 |
| 1 | 16 |
| 2 | 2 |
| 3 | 3 |
| 4 | 4 |
| 5 | 5 |
| 6 | 17 |
| 7 | 18 |
| 8 | 8 |
| 9 | 9 |
| 10 | 10 |
| 11 | 11 |

FIG.16B

| BLOCK NUMBER | BLOCK STATE |
|---|---|
| 0 | ADDRESS ALLOCATION |
| 1 | NON-ALLOCATION |
| 2, 3, 4, 5 | ADDRESS ALLOCATION |
| 6, 7 | NON-ALLOCATION |
| 8, 9, 10, 11 | ADDRESS ALLOCATION |
| 12 | NON-ALLOCATION |
| 13 | PARITY ALLOCATION |
| 14 | NON-ALLOCATION |
| 15 | PARITY ALLOCATION |
| 16, 17, 18 | ADDRESS ALLOCATION |
| 19, 20 | PARITY ALLOCATION |

| GROUP NUMBER | DATA BLOCK GROUP | PARITY BLOCK GROUP |
|---|---|---|
| 1 | 3, 4, 5 | 13 |
| 3 | 9, 10, 11 | 15 |
| 4 | 0, 16, 2 | 19 |
| 5 | 17, 18, 8 | 20 |

FIG.23A
ADDRESS TABLE

| ADDRESS AREA | BLOCK NUMBER |
|---|---|
| 0 | 5 |
| 1 | 6 |
| 2 | 2 |
| 3 | 3 |
| 4 | 7 |

FIG.23B
BLOCK TABLE

| BLOCK NUMBER | BLOCK STATE |
|---|---|
| 0 | PRE-UPDATE ALLOCATION |
| 1 | PRE-UPDATE ALLOCATION |
| 2 | ADDRESS ALLOCATION |
| 3 | ADDRESS ALLOCATION |
| 4 | PRE-UPDATE ALLOCATION |
| 5 | ADDRESS ALLOCATION |
| 6 | ADDRESS ALLOCATION |
| 7 | ADDRESS ALLOCATION |
| 8 | PARITY ALLOCATION |
| 9 | PARITY ALLOCATION |
| 10 | NON-ALLOCATION |
| 11 | NON-ALLOCATION |

FIG.23C
PARITY CORRESPONDENCE LIST

| GROUP NUMBER | DATA BLOCK GROUP | PARITY BLOCK GROUP |
|---|---|---|
| 0 | 0, 1, 2 | 8 |
| 1 | 3, 4, 5 | 9 |

FIG.23D
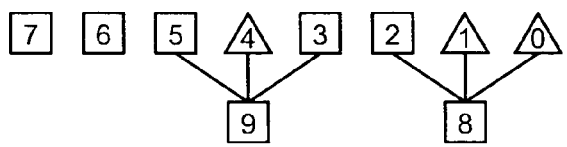

| ADDRESS AREA | BLOCK NUMBER |
|---|---|
| 2 | 2→10 |

| BLOCK NUMBER | BLOCK STATE |
|---|---|
| 0, 1, 2 | →NON-ALLOCATION |
| 8 | →NON-ALLOCATION |
| 10 | →ADDRESS ALLOCATION |
| 11 | →PARITY ALLOCATION |

| GROUP NUMBER | DATA BLOCK GROUP | PARITY BLOCK GROUP |
|---|---|---|
| 1 | 3, 4, 5 | 9 |
| 2 | 6, 7, 10 | 11 |

| ADDRESS AREA | BLOCK NUMBER |
|---|---|
| 4 | 7→10 |

| BLOCK NUMBER | BLOCK STATE |
|---|---|
| 7 | →NON-ALLOCATION |
| 10 | →ADDRESS ALLOCATION |

| GROUP NUMBER | DATA BLOCK GROUP | PARITY BLOCK GROUP |
|---|---|---|
| | | (NOT CHANGED) |

| ADDRESS AREA | BLOCK NUMBER |
|---|---|
|  | (NOT CHANGED) |

| BLOCK NUMBER | BLOCK STATE |
|---|---|
| 0, 1, 8 | →NON-ALLOCATION |
| 4, 9 | →NON-ALLOCATION |
| 10 | →PARITY ALLOCATION |

| GROUP NUMBER | DATA BLOCK GROUP | PARITY BLOCK GROUP |
|---|---|---|
| 2 | 2, 3, 5 | 10 |

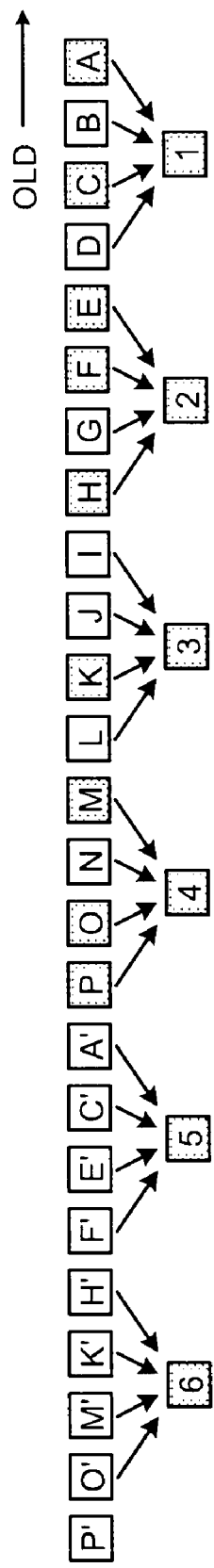
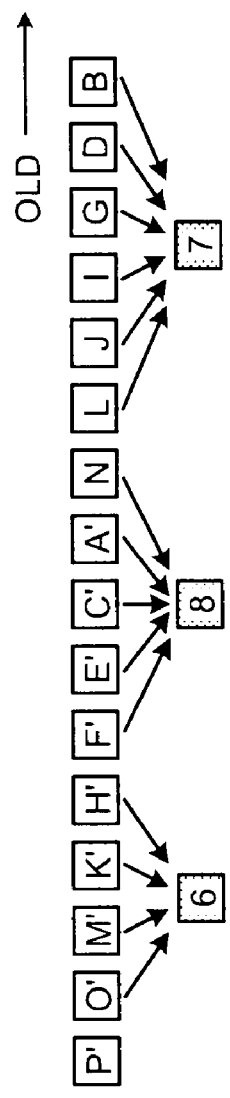
FIG.33A
FIG.33B

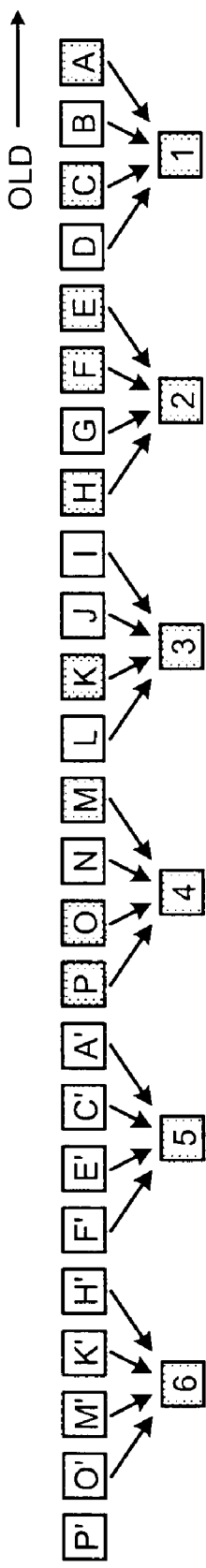
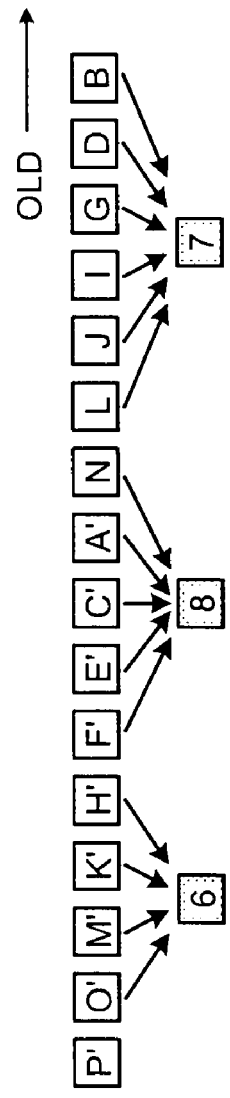
FIG.40A
FIG.40B

BEFORE UPDATE

UPDATE BLOCK 5

OPERATION OF PARITY DATA $P_2' = 4 \oplus 5' \oplus 6$ ···(A)

or $P_2' = P_2 \oplus 5 \oplus 5'$ ···(B)

WRITE PARITY DATA

FIG.45A

UPDATE OF ONE PLACE

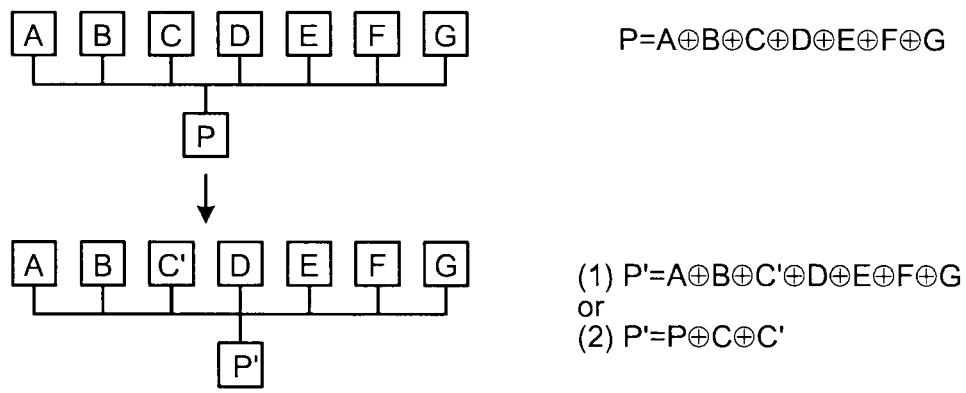

$P = A \oplus B \oplus C \oplus D \oplus E \oplus F \oplus G$ (1) $P' = A \oplus B \oplus C' \oplus D \oplus E \oplus F \oplus G$
or
(2) $P' = P \oplus C \oplus C'$

FIG.45B

UPDATE OF TWO PLACES

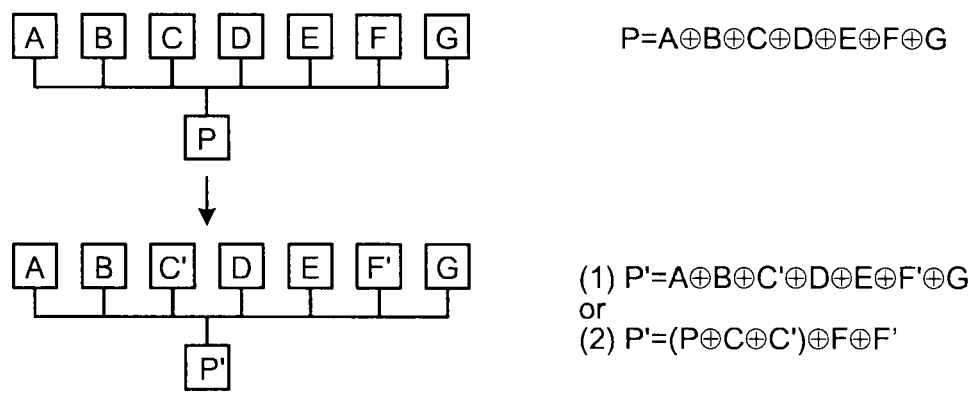

$P = A \oplus B \oplus C \oplus D \oplus E \oplus F \oplus G$ (1) $P' = A \oplus B \oplus C' \oplus D \oplus E \oplus F' \oplus G$
or
(2) $P' = (P \oplus C \oplus C') \oplus F \oplus F'$

FIG.45C

PARTIALLY CALCULATED DATA (1) $T = P \oplus C \oplus F$ (2) $P' = T \oplus C' \oplus F'$

US 8,341,497 B2

SEMICONDUCTOR STORAGE

CROSS-REFERENCE TO RELATED APPLICATIONS

This application is based upon and claims the benefit of priority from the prior Japanese Patent Application No. 2009-047304, filed on Feb. 27, 2009; the entire contents of which are incorporated herein by reference.

BACKGROUND OF THE INVENTION

1. Field of the Invention

The present invention relates to a semiconductor storage.

2. Description of the Related Art

In recent years, non-volatile semiconductor memories have been used in various devices, such as computers, mobile phones, and home electric appliances, and have been actively developed. In particular, NAND-type flash memories are non-volatile semiconductor memories that allow for electrical rewrite, a high capacity, and high integration.

Also, a NAND-type flash memory that has the same connection interface standard (for example, ATA standard) as a hard disk drive (HDD), that is, a solid state drive (SSD) has been developed recently. Since the SSD has more excellent data read performance than the HDD, it can be expected to realize low power consumption and strong shock resistance.

As examples of a method for storing data in the non-volatile semiconductor memory, a method that erases data once in a block unit and writes data, a method that reads/writes data in a page unit, and a method where erase, read, and write units are fixed are used.

In general, the lifespan of the NAND-type flash memory depends on an erase/write count. Accordingly, in the NAND-type flash memory, if data is written into only a specific block and an erase operation is concentrated on the specific block, only the specific block may reach the end of its usefulness. For this reason, it is tried to lengthen the lifespan of each block by executing an equalizing process on an erase count of each block. The equalizing process is called wear leveling.

Meanwhile, in a storage system, such as a disk array, which is used in a server environment, in order to improve reliability, redundant arrays of independent/inexpensive disks (RAID) to which plural storage devices are connected may be constructed (for example, refers to D. Patterson, G. Gibson, and R. Katz. "A Case for Redundant Arrays of Inexpensive Disks (RAID)", Proceedings of the 1988 ACM SIGMOD, pp. 109-116, June 1988).

Meanwhile, in the NAND-type flash memory, a value of data that is stored at the time of recording the data may become different from a value of the data that is read at the time of reading the data due to a high capacity and high integration, and the stored data may not be securely reproduced. Accordingly, as in the RAID, when redundancy is maintained with respect to all the recorded data, redundancy information, that is, parity data needs to be updated, whenever the data is updated.

Among semiconductor memories, in some memories, a data erase/write time may be significantly longer than a data read time. In this case, if parity data is updated for every data update, performance of the entire semiconductor storage, such as a write process speed, is deteriorated. As the parity data is updated, that is, a block erase/write count increases, the lifespan of the semiconductor storage is shortened.

SUMMARY OF THE INVENTION

According to one aspect of the present invention, a semiconductor storage includes a receiver configured to receive, from a host device, a write request including data to be written into a semiconductor memory array or information of a storage place of the data to be written into the semiconductor memory array and logical address information of the semiconductor memory array output by the host device; a storage unit configured to hold redundancy data generation/non-generation information indicating whether or not redundancy data of data held by the semiconductor memory array is generated; a writing unit configured to write the data to be written included in the write request or the data to be written obtained based on the information of the storage place thereof included in the write request, into the semiconductor memory array, and write redundancy data generation/non-generation information of the written data into the storage unit; a first data extracting unit configured to extract data whose redundancy data is not generated from among the data held by the semiconductor memory array, based on the redundancy data generation/non-generation information held by the storage unit; a first redundancy data generating unit configured to generate redundancy data based on the extracted data; a first redundancy data writing unit configured to write the generated redundancy data into the semiconductor memory array; and a first redundancy data generation/non-generation information updating unit configured to update the redundancy data generation/non-generation information, held by the storage unit, of the data whose redundancy data is generated.

According to another aspect of the present invention, a semiconductor storage includes a receiver configured to receive, from the host device, a write request, which includes data to be written in a semiconductor memory array or information of a storage place of the data to be written in the semiconductor memory array and logical address information of the semiconductor memory array output by a host device; a storage unit configured to hold redundancy data generation/non-generation information corresponding to information indicating whether redundancy data of the data held by the semiconductor memory array is generated; a writing unit configured to write data to be written included in the write request or the data to be written obtained based on the information of the storage place thereof included in the write request, into the semiconductor memory array, and write redundancy data generation/non-generation information of the written data in the storage unit; a redundancy data generating/writing unit configured to extract data whose redundancy data is not generated from among the data held by the semiconductor memory array, based on the redundancy data generation/non-generation information held by the storage unit, generate redundancy data based on the extracted data, write the generated redundancy data in the semiconductor memory array, and update the redundancy data generation/non-generation information of the data whose redundancy data held by the storage unit is generated; and a block number changing unit configured to change the number of semiconductor memory arrays in which the redundancy data is held, based on the redundancy data generation/non-generation information held by the storage unit, and update the redundancy data generation/non-generation information.

According to still another aspect of the present invention, a semiconductor storage includes a receiver configured to receive, from the host device, a write request, which includes data to be written in a semiconductor memory array or information of a storage place of the data to be written in the semiconductor memory array and logical address information of the semiconductor memory array output by a host device; a storage unit configured to hold redundancy data generation/non-generation information corresponding to information indicating whether redundancy data of the data held by the semiconductor memory array is generated; a writing unit configured to write data to be written included in the write request or the data to be written obtained based on the information of the storage place thereof included in the write request, into the semiconductor memory array, and write redundancy data generation/non-generation information of the written data in the storage unit; a redundancy data generating unit configured to extract data whose redundancy data is not generated from among the data held by the semiconductor memory array, based on the redundancy data generation/non-generation information held by the storage unit, generate redundancy data based on the extracted data, and update the redundancy data generation/non-generation information of the data whose redundancy data is generated; a temporary storage unit configured to store the generated redundancy data; a redundancy data generation/non-generation information updating unit configured to store the generated redundancy data in the temporary storage unit and update the redundancy data generation/non-generation information; and a redundancy data writing unit configured to write the redundancy data stored in the temporary storage unit into the semiconductor memory array, based on the redundancy data generation/non-generation information, and update the redundancy data generation/non-generation information.

BRIEF DESCRIPTION OF THE DRAWINGS

FIG. 1 is a diagram schematically illustrating the functional configuration of a semiconductor storage 1;

FIG. 2 is a diagram illustrating an example of the functional configuration of a controller 200 that is included in the semiconductor storage 1;

FIGS. 9A to 9D are diagrams illustrating a state of each table before the write process according to the second embodiment;

FIGS. 13A to 13D are diagrams illustrating an example of an address table 11 when an arrangement sequence is a data update sequence for each address area;

FIGS. 14A and 14B are diagrams illustrating an example of address table 11 when a parity group is constructed according to static information;

FIGS. 16A and 16B are diagrams illustrating an example of an address table 11 when a parity group is constructed according to static information;

FIGS. 23A to 23D are diagrams illustrating a state of each table before the write process according to the fifth embodiment;

FIGS. 33A and 33B are diagrams illustrating a state of each table when a pre-update block increases and a new parity group is generated;

FIGS. 40A and 40B are diagrams illustrating an example of decreasing the number of parity groups;

FIGS. 45A to 45C are diagrams illustrating an operation when parity data is updated.

DETAILED DESCRIPTION OF THE INVENTION

Figure 3:
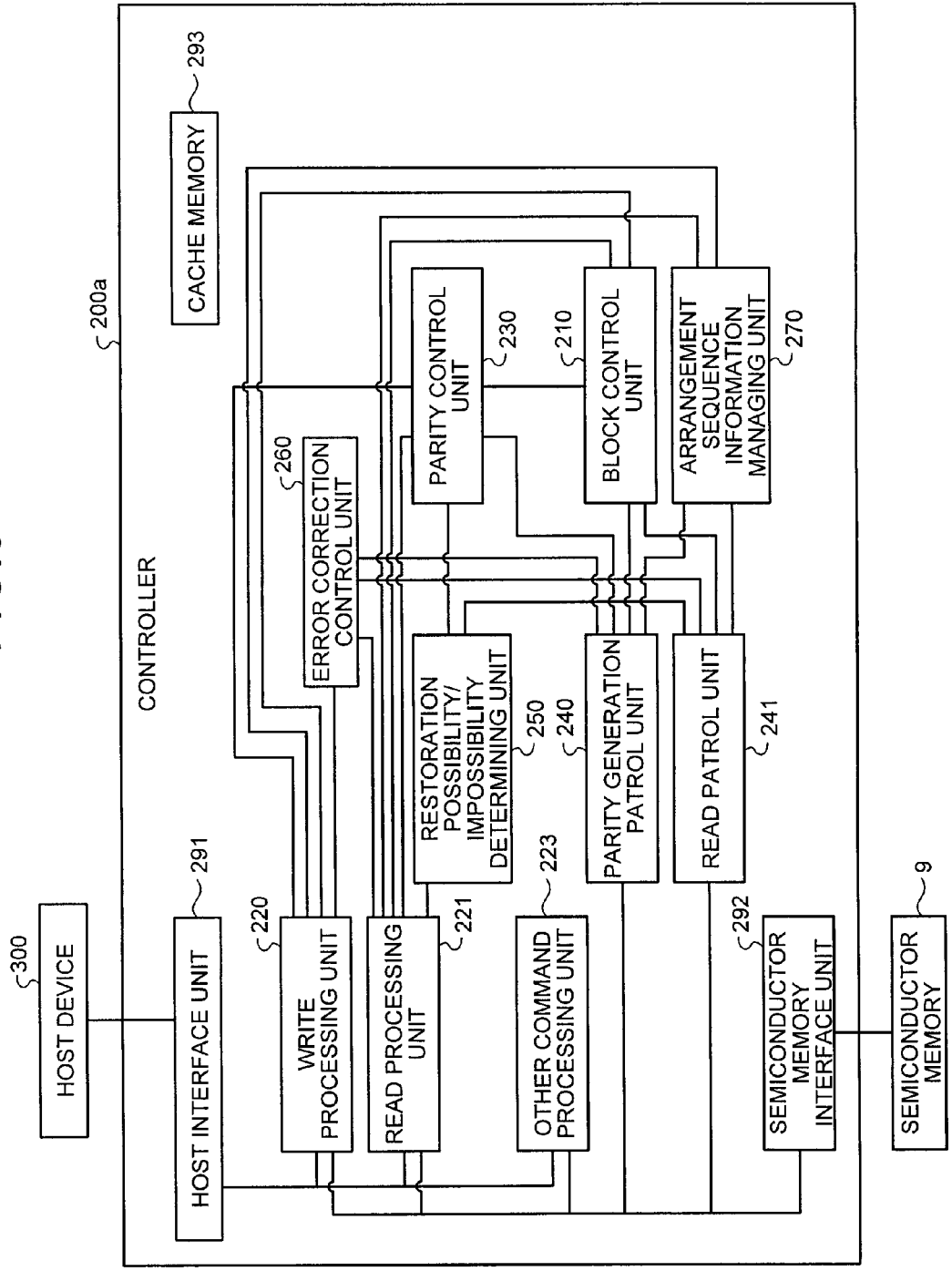
FIG. 3 is a diagram illustrating an example of the functional configuration of a controller 200a that is included in the semiconductor storage 1.

Hereinafter, exemplary embodiments of the invention will be described based on the accompanying drawings.

EMBODIMENTS

In the RAID configuration that is used in a server environment, even when a specific storage is failed and data cannot be read, data that is stored in the failed storage can be restored from data that is stored in a different storage. In a disk array device that mounts this RAID function, improvement of fault tolerance and a storage capacity of the disk array device larger than a storage capacity of a single storage are realized. In the following embodiment, an example of realizing the redundancy configuration, such as the RAID, by a block composed of a semiconductor memory, such as a flash memory, will be described.

The "block" that is composed of the semiconductor memory is a predetermined unit when data is recorded in a semiconductor memory array. In the following embodiment, a record unit and an erase unit of data are equalized. However, the record unit of the data may not be the same as the erase unit of the data and may be an appropriate unit. In the drawings, the "semiconductor memory" corresponds to the "semiconductor memory array" in the specification.

In the following embodiment, an example of writing and erasing data with respect to a block included in the semiconductor memory array by wear leveling (equalizing process) will be mainly described. However, the present invention is not limited to the example using the wear leveling, and may be applied when data is written and erased with respect to the block included in the semiconductor memory array.

(Entire Block Diagram)

FIG. 1 schematically illustrates the functional configuration of a semiconductor storage 1 according to an embodiment. The semiconductor storage 1 includes a controller 200 and a semiconductor memory array 9. The controller 200 receives a command, such as a write request and a read request, from a host device (not illustrated). The controller 200 executes a predetermined process on the semiconductor memory array 9 according to the received request. The semiconductor memory array 9 records and reproduces data. The semiconductor memory array 9 has plural blocks. Each of the blocks has plural semiconductor memories.

First Embodiment

FIG. 2 illustrates the functional configuration of a semiconductor storage according to the first embodiment. The semiconductor storage according to this embodiment includes the controller 200 that is connected to a host device 300 and the semiconductor memory array 9. The controller 200 has a receiver 29, a first storage unit 28a, a second storage unit 28b, a first writing unit 22a, a second writing unit 22b, and a reading unit 21.

The receiver 29 receives a write request from the host device 300. The write request includes logical address information that can be recognized by the host device 300 and write data specification information that is information to specify data to be written. The logical address information is information that includes information of an address area corresponding to a range of addresses where the host device 300 requests write. The write data specification information is information that includes data to be written or information of a storage place where the data to be written is stored.

The receiver 29 receives a read request from the host device 300. The read request includes the logical address information that can be recognized by the host device 300. The logical address information includes at least an address area that corresponds to a range of addresses where the host device 300 requests read. The read request may include storage place information that indicates a place where read data is stored (written).

The first storage unit 28a records address association information that corresponds to information where physical address information and logical address information are associated with each other. The physical address information is information of a physical address of data that is recorded in the semiconductor memory array 9.

The second storage unit 28b records parity generation/non-generation information that is information indicating whether redundancy information (parity) is generated, based on the data stored in the semiconductor memory array 9.

The first writing unit 22a writes data, which is received by the receiver 29, in the semiconductor memory array 9. The first writing unit 22a writes address association information of the written data in the first storage unit 28a. The first writing unit 22a writes the parity generation/non-generation information, which is related to the data written into the semiconductor memory array 9, in the second storage unit 28b.

The second writing unit 22b extracts data that does not become a base of generation of the parity, using the parity generation/non-generation information recorded in the second storage unit 28b. The second writing unit 22b generates the parity based on the extracted data. The second writing unit 22b writes the generated parity in the semiconductor memory array 9. The second writing unit 22b updates the parity generation/non-generation information recorded in the second storage unit 28b, with respect to data becoming a base of generation of the parity.

The reading unit 21 extracts logical address information of data to be read that is included in the read request received by the receiver 29, and extracts physical address information from the first storage unit 28a using the extracted logical address information. The reading unit 21 uses the extracted physical address information to read the target data from the semiconductor memory array 9, and transmits a read reply to the host device 300 through the receiver 29. In this case, the read reply is information that includes the read data or information indicating the storage completion of the read data in the place specified by the storage place information.

Second Embodiment

Before the detailed description of a semiconductor storage according to the second embodiment, wear leveling will be described. The wear leveling indicates a process of equalizing an erase count of data with respect to blocks composed of semiconductor memories between the blocks, that is, adjusting the erase count as equal as possible.

In the second embodiment, each block that is included in the semiconductor memory array 9 is associated with information of a block state indicating at least any one of the following three states.

(A1) A block number is set to an address table 11 to be described in detail below (hereinafter, this state is called an "address allocation state").

(A2) The block is used as a block that holds redundancy information, that is, parity data (hereinafter, this state is called a "parity allocation state").

(A3) The block is not in both the states (A1) and (A2) and in a non-used state (hereinafter, this state is called a "non-allocation state").

In this case, the block number is identification information of the block.

The "block of the address allocation state" is called an "address allocation block", the "block of the parity allocation state" is called a "parity allocation block", and the "block of the non-allocation state" is called a "non-allocation block". Among the "address allocation blocks", a state before a write process of the block that becomes the "non-allocation block" by the write process is also called a "pre-update block".

[Block Diagram of a Controller]

FIG. 3 illustrates the functional configuration of a controller 200a that is different from the controller 200 of FIG. 2 included in the semiconductor storage 1 of FIG. 1. The controller 200a of FIG. 3 has a write processing unit 220, a read processing unit 221, an other command processing unit 223, an error correction control unit 260, a parity control unit 230, a restoration possibility/impossibility determining unit 250, a parity generation patrol unit 240, a read patrol unit 241, a block control unit 210, an arrangement sequence information managing unit 270, a cache memory 293, a host interface unit 291, and a semiconductor memory interface unit 292.

Lines that couple the individual units of the block diagram including the block diagram of the controller described in the following embodiment indicate a process relationship between the individual units. However, a process relationship between the individual units that are not coupled by the lines may include a relationship not described in the drawing.

The write processing unit 220 receives a write request from the host device 300 through the host interface unit 291. The write request includes at least an address area that corresponds to a range of addresses where the host device 300 request write and write data specification information that is information to specify data to be written. The written data specification information is information that includes data to be written or information of a storage place where the data to be written is stored.

The detailed description of the parity control unit 230 is given below. The parity control unit 230 has a parity generating unit 31, a restoring unit 32, a replacing unit 33, a parity correspondence list managing unit 34, and a parity correspondence list 39.

The detailed description of the error correction control unit 260 is given below. The error correction control unit 260 has an error detection/correction information managing unit 61, an error detection information generating unit 62, an error detecting unit 63, an error correction information generating unit 64, and an error correcting unit 65.

The write processing unit 220 requests the error detection information generating unit 62 of the error correction control unit 260 to generate error detection information from the data to be written, and receives the error detection information that is generated by the error detection information generating unit 62 according to the request. The write processing unit 220 requests the error correction information generating unit 64 to generate the error correction information from the data to be written, and receives the error correction information that is generated by the error correction information generating unit 64 according to the request.

The write processing unit 220 inquires the block control unit 210 to be described in detail below about a block becoming a write destination (that is, requests to extract a non-allocation block).

If the write processing unit 220 receives a block number of a write destination block from the block control unit 210, the write processing unit 220 erases data of a block corresponding to the block number of the semiconductor memory array 9 through the semiconductor memory interface unit 292, and writes the write requested data, the error detection information, and the error correction information. At this time, the write processing unit 220 may record the error detection information or the error correction information in a predetermined block that is different from the data written block or record the error detection information or the error correction information in a storage area other than the semiconductor memory.

In this case, the equalizing process means a process of equalizing the remaining lifespan of each block. However, when information of a data erase count or a data erase period of time of the block is used during the equalizing process, the write processing unit 220 requests the block control unit 210 to update equalization information of the corresponding block at timing when the data is erased.

Although described in detail below, the block control unit 210 stores and manages an address table 11 that is information where an address area and a block number are associated with each other. The address area indicates information of a range (area) of logical addresses that are transmitted from the host device 300. In regards to the block number, one block number may be associated with the address area and plural block numbers may be associated with the address area. The association between the address area and the block number varies according to necessity. The association between the address area and the block number is called "mapping".

The write processing unit 220 changes the mapping of the address area included in the write request to the block into which the write requested data by the above process is written. Specifically, the write processing unit 220 inquires the block control unit 210 about a number of the block (pre-update block) associated with the address area included in the write request, and requests the block control unit 210 to erase the number of the pre-update block associated with the address area included in the write request. The write processing unit 220 requests the block control unit 210 to associate the number of the block into which the write requested data by the above process is written with the address area included in the write request.

The write processing unit 220 requests the block control unit 210 to set a state of the pre-update block to a non-allocation state. As a result, the write processing unit 220 collects the pre-update block as a non-allocation block, and requests the block control unit to set the state of the block into which the write requested data by the above process is written to an address allocation state.

When the address table 11 is updated, the write processing unit 220 transmits an update notification of the address area corresponding to a notification, which requests to update the updated address area in the address area information table, to the arrangement sequence information managing unit 270.

Examples of information that is included in the update notification include information indicating that each address area is updated or information of a period of time when each address area is updated. If the information is transmitted to the arrangement sequence information managing unit 270, the arrangement sequence information managing unit 270 reflects the information on an update count of each address area or an updated sequence, which is needed as the managed information. The write processing unit 220 inquires the parity control unit 230 about whether the block, which is associated with the address area becoming the write request target immediately before the write request is received, constructs a parity group. When the write processing unit 220 acquires a reply indicating that the block constructs the parity group from the parity control unit 230, the write processing unit 220 deconstructs the parity group.

Specifically, the write processing unit 220 requests the block control unit 210 to set a block state of a parity block group constructing the parity group to a non-allocation state. As a result, the write processing unit 220 collects the block as a non-allocation block. The write processing unit 220 requests the parity control unit 230 to release the registration of the parity group.

In this case, the parity group is a group that includes plural blocks where data is stored and one or more blocks where redundancy data (parity data) generated from the data stored in the plural blocks is stored. The redundancy data is generated by a predetermined method.

The read processing unit 221 receives a read request from the host device 300 through the host interface unit 291. The read request includes at least an address area that corresponds to a range of addresses where the host device 300 requests read. The read request may include storage place information that indicates a place where the read data is stored (written). The read processing unit 221 reads the read requested data. The read processing unit 221 outputs a read reply to the host device 300 through the host interface unit 291. In this case, the read reply is information that includes read data or information indicating the storage completion of the read data in the place specified by the storage place information.

Specifically, the read processing unit 221 inquires the block control unit 210 about a number of the block in which the read requested data is stored, based on the address area included in the read request. The read processing unit 221 receives the corresponding block number from the block control unit 210. The read processing unit 221 reads the data of the block specified by the block number, the error detection information associated with the data of the specified block and stored, and the error correction information associated with the data of the specified block and stored, from the semiconductor memory array 9 through the semiconductor memory interface unit 292, based on the received block number. When the data is stored in the block that is different from the block into which at least one of the error detection information and the error correction information is written, the read processing unit 221 inquires the error detection/correction information managing unit 61 about storage places of the error detection information and the error correction information associated with the data to be read, and reads the error detection information and the error correction information.

The read processing unit 221 cooperates with the error detecting unit 63 of the error correction control unit 260 and determines whether the read data is erroneous, and corrects the erroneous data in cooperation with the error correcting unit 65, when the data is erroneous. When the erroneous data cannot be corrected, the read processing unit 221 requests the restoration possibility/impossibility determining unit 250 to determine whether the data whose error correction is not possible can be restored. When the data can be restored, the read processing unit 221 requests the restoring unit 32 to restore the data whose error correction is not possible, and the restoring unit 32 restores the data.

The read processing unit 221 requests the error detection information generating unit 62 to generate error detection information from the restored data, and receives the error detection information that is generated by the error detection information generating unit 62 according to the request. The read processing unit 221 requests the error correction information generating unit 64 to generate error correction information from the restored data, and receives the error correction information that is generated by the error correction information generating unit 64 according to the request.

The read processing unit 221 inquires the block control unit 210 about a number of a block into which the restored data is written (that is, requests the block control unit 210 to extract a non-allocation block), and receives the block number corresponding to a reply. If the read processing unit 221 receives the block number, the read processing unit 221 erases the data of the block corresponding to the block number of the semiconductor memory array 9 through the semiconductor memory interface unit 292.

The read processing unit 221 writes the data restored in the block specified by the block number, the error detection information, and the error correction information in the semiconductor memory array 9 through the semiconductor memory interface unit 292. The read processing unit 221 may record the error detection information or the error correction information in a predetermined block that is different from the data written block or record the error detection information or the error correction information in a storage area other than the semiconductor memory.

In this case, when information of a data erase count or a data erase period of time of the block is used during the equalizing process, the read processing unit 221 requests the block control unit 210 to update equalization information of the corresponding block at timing when the data is erased.

The read processing unit 221 requests the replacing unit 33 to execute a replacing process. In this case, a process that is executed until the read processing unit 221 requests the replacing unit 33 to execute the replacing process after requesting the error detection information generating unit 62 to generate the error detection information from the restored data is called an access destination changing process.

Similar to the access destination changing process, the read processing unit 221 may replace the block where the data before the error correction is recorded by a block where the error corrected data is recorded. Thereby, a situation where the error state becomes worse and the error correction is finally disabled can be prevented. The replacing process does not need to be executed whenever the error correction is succeeded, and may be executed only when an error degree exceeds a predetermined threshold value.

When command corresponding to a process other than the write process or the read process is received, other command processing unit 223 execute a process corresponding to the received command.

The error correction control unit 260 executes an error detecting process and an error correcting process with respect to the data read from the block. The error correction control unit 260 generates error detection information or error correction information, based on data where the generation of the error detection information or the generation of the error correction information is requested, which will be described in detail below.

The parity control unit 230 manages parity groups composed of plural blocks and parity for each parity group, which will be described in detail below.

The restoration possibility/impossibility determining unit 250 determines whether restoration of data based on parity is enabled with respect to the block where the error is detected by the error correction control unit 260 and the error correction is disabled. Specifically, the restoration possibility/impossibility determining unit 250 inquires the parity control unit 230 about whether the block where the error is detected and the error correction is disabled constructs the parity group. When the restoration possibility/impossibility determining unit 250 receives a reply indicating that the block constructs the parity group from the parity control unit 230, the restoration possibility/impossibility determining unit 250 determines that the restoration of data based on the parity is enabled, and when the restoration possibility/impossibility determining unit 250 receives a reply indicating that the block does not construct the parity group from the parity control unit 230, the restoration possibility/impossibility determining unit 250 determines that the restoration of data based on the parity is disabled.

In the second embodiment, the data where the error is detected and the error correction is disabled is restored from redundancy information based on the parity. However, the essential elements that are related to the process of restoring the data from the redundancy information based on the parity are not limited thereto. For example, the principle of the error detected data being restored from the redundancy information based on the parity may be adopted. In this way, the fault tolerance that is obtained by the error correction is lowered, but a storage area corresponding to the error correction information can be saved. The process contents that are described in this embodiment may be appropriately replaced by the principle of the error detected data being restored from the redundancy information based on the parity.

The parity generation patrol unit 240 detects a block that does not belong to any parity group, among the address allocation blocks. When the number of the address allocation blocks that do not construct the detected parity group exceeds a predetermined threshold value, the parity generation patrol unit 240 generates a new parity group based on blocks of the predetermined number. However, the present invention is not limited to the case where the parity generation patrol unit 240 generates the parity group when the number of the address allocation blocks that do not construct the parity group exceeds the predetermined threshold value. For example, the process may be regularly executed or the process may be executed when a process load of the controller 200a is less than a predetermined threshold value. Also, the process may be executed at previously determined or dynamically determined timing.

Specifically, the parity generation patrol unit 240 sequentially transmits an address area reference request corresponding to a reference request of an address area to the arrangement sequence information managing unit 270, according to arrangement sequence information. The parity generation patrol unit 240 receives information of the address area according to the request, from the arrangement sequence information managing unit 270. The parity generation patrol unit 240 inquires the block control unit 210 about the block number corresponding to the address area, according to the received sequence. The parity generation patrol unit 240 receives the block number from the block control unit 210.

The parity generation patrol unit 240 inquires the parity control unit 230 about whether the blocks corresponding to the received block numbers construct the parity group already, according to the received sequence of the block numbers. When the parity generating patrol unit 240 receives a reply indicating that the blocks corresponding to the received block numbers do not construct the parity group from the parity control unit 230, the parity generation patrol unit 240 collects the blocks, which do not construct the parity group, as the parity generation targets.

When the blocks of the predetermined number that do not construct the parity group are collected, the parity generation patrol unit 240 requests the parity generating unit 31 to generate parity data based on the data recorded in the blocks of the predetermined number, and receives the parity data that is generated by the parity generating unit 31. The parity generation patrol unit 240 requests the error detection information generating unit 62 to generate error detection information from the parity data, and receives the error detection information that is generated by the error detection information generating unit 62. The parity generation patrol unit 240 requests the error correction information generating unit 64 to generate the error correction information from the parity data, and receives the error correction information that is generated by the error correction information generating unit 64.

The parity generation patrol unit 240 requests the block control unit 210 to extract a non-allocation block, and receives a block number from the block control unit 210. The parity generation patrol unit 240 erases data of a block corresponding to the block number of the semiconductor memory array 9, through the semiconductor memory interface unit 292. The parity generation patrol unit 240 writes the parity data generated by the parity generating unit 31 of the parity control unit 230, the error detection information generated by the error detection information generating unit 62 from the parity data, and the error correction information generated by the error correction information generating unit 64 from the parity data in the block corresponding to the received block number, through the semiconductor memory interface unit 292.

The parity generation patrol unit 240 may record the error detection information or the error correction information in a predetermined block that is different from the data written block or record the error detection information or the error correction information in a storage area other than the semiconductor memory.

The parity generation patrol unit 240 requests the block control unit 210 to update equalization information of the erased block. The parity generation patrol unit 240 transmits an update request, which requests to update a state of the data written block to a parity allocation state, to the block control unit 210.

The parity generation patrol unit 240 requests the parity control unit 230 to register the parity group composed of the collected blocks and the data written block.

In the parity generation patrol unit 240, the arrangement sequence information managing unit 270, the block control unit 210, and the parity control unit 230, the sequentially inquired acquisition target information may collectively acquire the association of the sequence information and the acquisition target information, and the receiving side may execute the process using the associated sequence information and acquisition target information.

The read patrol unit 241 is constructed to improve fault tolerance, and previously executes the data restoration using the parity data, which is executed by the read processing unit 221 at the time of processing the read request.

Specifically, the read patrol unit 241 inquires the block control unit 210 about a number of the block whose state is not a non-allocation state among the blocks in a block table 12, and acquires the block number from the block control unit 210. The block that is not in the non-allocation state means a block where valid data is recorded. The block that is not in the non-allocation state includes an address allocation block or a parity allocation block. With respect to each of the acquired blocks, the following previous restoring process is executed.

In the previous restoring process, the read patrol unit 241 reads the data of the block specified by the block number, the error detection information associated with the data of the specified block and stored, and the error correction information associated with the data of the specified block and stored, from the semiconductor memory array 9 through the semiconductor memory interface unit 292, based on the received block number. When the data is stored in the block that is different from the block into which at least one of the error detection information and the error correction information is written, the read patrol unit 241 inquires the error detection/correction information managing unit 61 about storage places of the error detection information and the error correction information associated with the data to be read, and reads the error detection information and the error correction information.

The read patrol unit 241 cooperates with the error detecting unit 63 of the error correction control unit 260 and determines whether the read data is erroneous, and corrects the erroneous data in cooperation with the error correcting unit 65, when the data is erroneous. When the erroneous data cannot be corrected, the read patrol unit 241 requests the restoration possibility/impossibility determining unit 250 to determine whether the data whose error correction is not possible can be restored. When the data can be restored, the read patrol unit 241 requests the restoring unit 32 to restore the data whose error correction is not possible, and the restoring unit 32 restores the data.

The read patrol unit 241 requests the error detection information generating unit 62 to generate error detection information from the restored data, and receives the error detection information that is generated by the error detection information generating unit 62 according to the request. The read patrol unit 241 requests the error correction information generating unit 64 to generate error correction information from the restored data, and receives the error correction information that is generated by the error correction information generating unit 64 according to the request.

The read patrol unit 241 inquires the block control unit 210 about a number of a block into which the restored data is written (that is, requests the block control unit 210 to extract a non-allocation block), and receives the block number corresponding to a reply. If the read patrol unit 241 receives the block number, the read patrol unit 241 erases the data of the block corresponding to the block number of the semiconductor memory array 9 through the semiconductor memory interface unit 292.

The read patrol unit 241 writes the data restored in the block specified by the block number, the error detection information, and the error correction information in the semiconductor memory array 9 through the semiconductor memory interface unit 292. The read patrol unit 241 may record the error detection information or the error correction information in a predetermined block that is different from the data written block or record the error detection information or the error correction information in a storage area other than the semiconductor memory.

In this case, when information of a data erase count or a data erase period of time of the block is used during the equalizing process, the read patrol unit 241 requests the block control unit 210 to update equalization information of the corresponding block at timing when the data is erased.

The read patrol unit 241 requests the replacing unit 33 to execute a replacing process.

Similar to the access destination changing process, the read patrol unit 241 may replace the block where the data before the error correction is recorded by a block where the error corrected data is recorded. Thereby, a situation where the error state becomes worse and the error correction is finally disabled can be prevented. The replacing process does not need to be executed whenever the error correction is succeeded, and may be executed only when an error degree exceeds a predetermined threshold value.

Until now, the previous restoring process has been described.

During the previous restoring process, when the restoration possibility/impossibility determining unit 250 determines that the data where the error correction is disabled cannot be restored and the number of the block where the restoration disabled data is recorded is included in the address table 11, existence of an error may be further recorded in the address area associated with the block where the restoration disabled data is recorded among the blocks of the address table 11.

By the previous restoring process, if the restoration of the data where the error correction is disabled is performed before the actual read process is executed, the redundancy can be restored in advance even though the redundancy disappears, and fault tolerance can be improved.

When the occurrence frequency of the error that is detected at the time of the read process exceeds a predetermined threshold value, the read patrol process is executed. However, the present invention is not limited to the case where the read patrol process is executed only when the occurrence frequency of the error during the read process exceeds the predetermined threshold value. For example, the read patrol process may be regularly executed or executed when a process load of the controller 200a is less than a predetermined threshold value. Also, the process may be executed at previously determined or dynamically determined timing.

The arrangement sequence information managing unit 270 has an address area information table that is information where information of an address area and arrangement sequence information are associated with each other, and manages the address area information table.

Figure 4A:
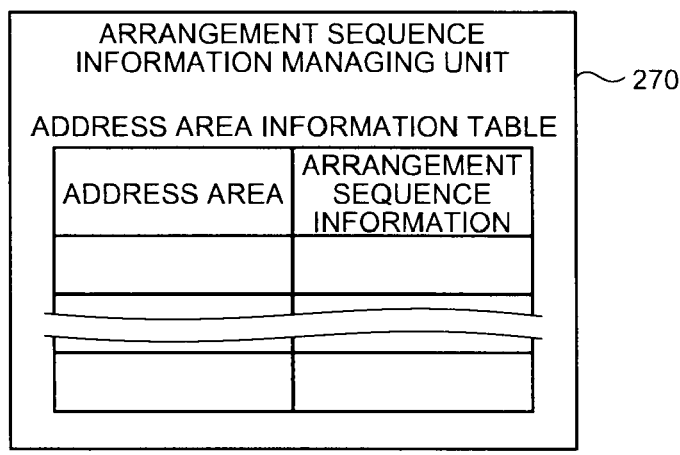
FIG. 4A is a diagram illustrating an example of the configuration of an arrangement sequence information managing unit 270.

FIG. 4A illustrates an example of the configuration of the arrangement sequence information managing unit 270. The arrangement sequence information managing unit 270 of FIG. 4A has an address area information table.

In the address area information table, arrangement sequence information is associated with each address area. The arrangement sequence information may be a data update sequence. As to the management, when the arrangement sequence information managing unit 270 receives an update notification of the address area from the write processing unit 220, the arrangement sequence information managing unit 270 updates arrangement sequence information that is associated with the address area becoming the update target. Specifically, the arrangement sequence information managing unit 270 generates information of an update count of each address area or information of an update sequence, based on information indicating that each address area included in the update notification of the address area received from the write processing unit 220 is updated or information of a period of time when each address area is updated. For example, the arrangement sequence information managing unit 270 updates the arrangement sequence information, based on values obtained by evaluating the information of the update count of each address area or the information of the update sequence by a predetermined evaluation function.

The arrangement sequence information managing unit 270 receives an address area reference request from the parity generation patrol unit 240. The arrangement sequence information managing unit 270 extracts the information of the address area that is associated with the arrangement sequence included in the received address area reference request and transmits the information to the parity generation patrol unit 240.

When the read processing unit 221 writes the data where the error correcting unit 65 has corrected the error according to the request from the read processing unit 221 in the non-allocation block and changes the mapping of the address area or the read processing unit 221 writes the data where the restoring unit 32 has restored according to the request from the read processing unit 221 in the non-allocation block and changes the mapping of the address area, the read processing unit 221 may request the arrangement sequence information managing unit 270 to update the arrangement sequence information and the arrangement sequence information managing unit 270 may update the arrangement sequence information. With respect to the process of the read patrol unit 241 that is the same as the process of the read processing unit 221, the arrangement sequence information may be updated. If the arrangement sequence information is updated, appropriate information is obtained at the time of such as a next write process.

The arrangement sequence information is used to improve fault tolerance as much as possible, under the condition that all of the blocks do not necessarily construct the parity group, which will be described in detail below.

When the data is written, the data is written into the non-allocation block and the mapping of the address area where the write is requested is updated with the data written block. Accordingly, in the block that is mapped to the address area where the update frequency (that is, write frequency) is high, a period of time during which the block is mapped to the corresponding address area is short. In the block that is mapped to the address area where the update frequency is low, a period of time during which the block is mapped to the corresponding address area is long.

For convenience of explanation, it is assumed that the error occurred with respect to the data recorded in the block is occurred with the same probability in all of the blocks.

On the above assumption, in the block that has a long period of time during which the block is mapped to the certain address area, during the period of time during which the block is mapped to the address area, the possibility of the error being occurred with respect to the data recorded in the block becomes relatively high. Meanwhile, in the block that has a short period of time during which the block is mapped to the certain address area, during the period of time during which the block is mapped to the address area, the possibility of the error being occurred with respect to the data recorded in the block becomes relatively low.

Accordingly, in order to improve fault tolerance, it is effective to generate a parity group preferentially using the blocks that are mapped to the address area having the low update frequency. If the blocks that are mapped to the address area having the low update frequency are collected and the parity group is generated, the possibility of the parity group being deconstructed can become low. As a result, the generation count of the parity group can be reduced, and the write process count of the parity data accompanied by the generating process of the parity group can be reduced. Therefore, performance of the entire semiconductor storage, such as the processing speed, can be prevented from being deteriorated, and the lifespan of the semiconductor memory array 9 can be prevented from being shortened.

The update frequency may be evaluated using values obtained by evaluating the following information of two kinds by a predetermined evaluation function. The information is not limited to the following information of the two kinds, and may be appropriate information that enables the evaluation of the update frequency.

(1) Information on when the mapping of the certain address area is changed lastly (information of time after update)

(2) Information on a change count of the mapping of the certain address area (information of an update count)

In this embodiment, two cases of an example of adopting only the information of the time after the update in the evaluation and an example of adopting only the information of the update count in the evaluation, which is one type of the evaluation function, will be described.

The cache memory 293 temporarily stores data that is being processed by the controller 200a. The host interface unit 291 executes an interface process between the controller 200a and the host device 300. The semiconductor memory interface unit 292 executes an interface process between the controller 200a and the semiconductor memory array 9.

(Block Control Unit)

Figure 5:
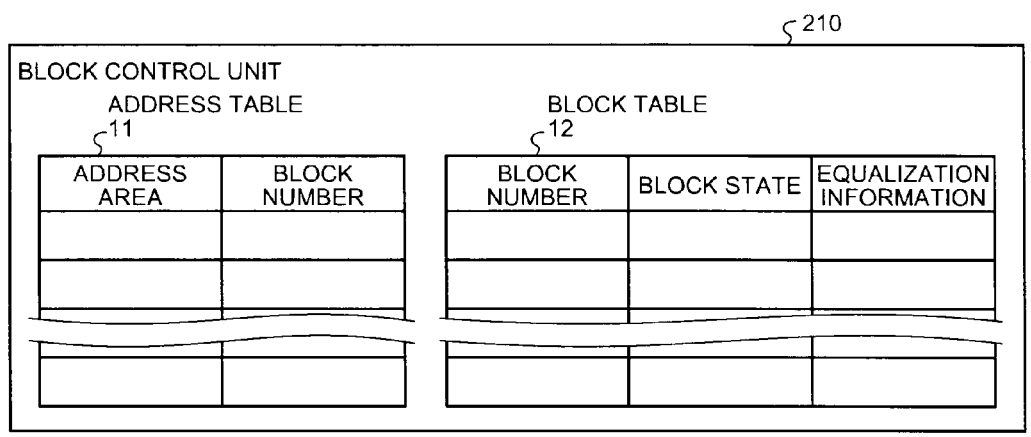
FIG. 5 is a diagram illustrating a function of a block control unit 210.

FIG. 5 illustrates a function of the block control unit 210 that manages blocks composed of semiconductor memories included in the semiconductor storage according to the second embodiment and controls write of data with respect to each block. The block control unit 210 manages the address table 11 and the block table 12.

At the time of a process of writing data in the block or a process of erasing the data stored in the block, the block control unit 210 updates attribute information for each block (corresponding to information of a block state to be described in detail below or the information of the block state and equalization information). The block control unit 210 may also manage the equalization information, execute an equalizing process such that an erase count for each block becomes as equal as possible, and update the equalization information. When the equalization process is executed, the block control unit 210 receives a request of the equalizing process, which is needed at the time of the write process or the erase process of the block.

The block control unit 210 stores and manages the address table 11 that is information where an address area and a block number are associated with each other. The address area means a range (area) of logical addresses that are transmitted from the host device 300. In regards to the block number, one block number may be associated with the address area and plural block numbers may be associated with the address area. The association between the address area and the block number varies according to necessity. Numbers of the blocks in the semiconductor memory array 9 are physical block addresses.

By the address table 11, the block that corresponds to the address area including the addresses transmitted from the host device 300 can be specified. The address table 11 is updated according to a process of associating the block number with respect to the address table to be described in detail below or a process of erasing the block number with respect to the address table.

The block table 12 is information where a block number and a block state are associated with each other. When the equalizing process is executed, the block table 12 may be information where a block number, a block state, and equalization information are associated with each other. The equalization information is information that is needed to execute the equalizing process. The information that is needed to execute the equalizing process is information that directly or indirectly indicates the remaining lifespan of each block. For example, the information may be information of an erase count of the data of the block or information of a period of time when the data of the block is erased. The block table 12 is updated according to a block state changing process to be described in detail below or an updating process of the equalization information.

The address table 11 and the block table 12 may be stored in the cache memory 293 or stored in both the cache memory 293 and the semiconductor memory array 9. Alternatively, the address table 11 and the block table 12 may be stored in a storage area other than the semiconductor memory array 9. The information of the address table or the block table that is stored in the semiconductor memory array 9 does not need to be updated whenever the information of the cache memory 293 is updated. If the needed information may be appropriately recorded in the address table 11 and the block table 12, the data structure that is related to the recording is not limited.

The processes that are executed by the block control unit 210 include a process of associating the block number with respect to the address table 11, a process of erasing the block number from the address table 11, a process of changing the block state, a process of replying the block number corresponding to a response to the inquiry of a block becoming a write destination from the write processing unit 220 or the parity generation patrol unit 240, and a process of replying the block number corresponding to a response to the inquiry of a block becoming a write destination of the data which the restoring unit 32 restores from the read processing unit 221 or the read patrol unit 241. Among the processes, a process of extracting a non-allocation block and replying the non-allocation block is included as the reply of the block number, and a process of updating the equalization information is further included, when the equalizing process is executed.

(Process of Associating the Block Number with Respect to the Address Table)

The block control unit 210 receives a request to associate the block number with respect to the address table 11 from the write processing unit 220 or the replacing unit 33, and sets a block number corresponding to the requested address area. As such, if the address area and the block number are associated with each other, the data that is recorded in the block associated with the requested address can be read in the read process.

(Process of Erasing the Block Number with Respect to the Address Table)

The block control unit 210 receives a request to erase the block number with respect to the address table 11 from the write processing unit 220 or the replacing unit 33, and changes a block number corresponding to the requested address area to a non-setting state corresponding to a state where a block number is not set. As information that indicates the non-setting state, for example, a NULL value is set. Thereby, an association relationship between the address area and the block number is released.

(Process of Changing the Block State)

The block control unit 210 receives a request to change the block state, and sets a block state corresponding to the requested block number to the requested block state. As the block state, at least three kinds of block states, for example, an "address allocation state", a "parity allocation state", and a "non-allocation state" exist. Thereby, the block state can be determined in various processes.

(Process of Extracting the Non-Allocation Block)

If the block control unit 210 receives an extraction request of the non-allocation block, first, the block control unit 210 acquires information of all blocks from the block table 12. The block control unit 210 extracts blocks whose states are non-allocation states from all of the blocks, and extracts an arbitrary block or a block selected by a predetermined method from the extracted blocks. When the equalizing process is executed, the block control unit 210 returns a number of a block determined as an optimal block in the equalizing process, among the non-allocation blocks. The block that is determined as the optimal block in the equalizing process is a block where an erase interval is long and an erase count is small. In this embodiment, the optimal block may be determined using any determining method or various methods may be appropriately set according to necessity to determine the optimal block. As such, if the erasing process and the write process of the data are executed with respect to only the non-allocation block determined as the optimal block in the equalizing process, equalization of the erase count can be realized and the remaining lifespan of each block can be equalized.

(Process of Updating the Equalization Information)

The block control unit 210 receives an update request of the equalization information and appropriately updates the equalization information corresponding to the requested block number. This process is executed, for example, according to the erase of the data of the block. In the extracting process of the non-allocation block, the optimal block in the equalizing process can be extracted by the equalization process. The equalization information is information of an erase count of the data held by the block or information of a period of time when the data of the block is erased. In this embodiment, the contents of the equalization information are not limited to the above example, and the equalization information that is needed in the determining process of the optimal block used in the extracting process of the non-allocation block can be adopted according to necessity.

(Error Correction Control Unit)

Figure 6:
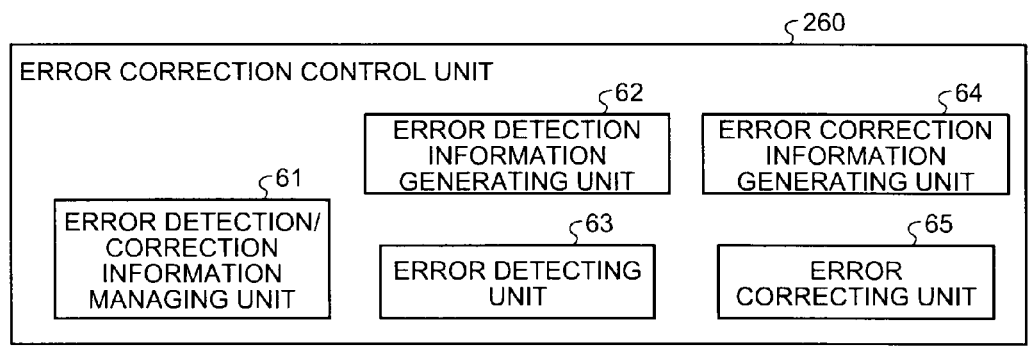
FIG. 6 is a diagram illustrating the functional configuration of an error correction control unit 260.

FIG. 6 illustrates the functional configuration of the error correction control unit 260. The error correction control unit 260 of FIG. 6 executes a generating process of the error detection information and the error correction information, an error detecting process, and an error correcting process, and manages a variety of information needed to execute these processes.

The error correction control unit 260 has the error detection/correction information managing unit 61, the error detection information generating unit 62, the error detecting unit 63, the error correction information generating unit 64, and the error correcting unit 65. The error detection/correction information managing unit 61 manages a correspondence relationship between the error detection information and the error correction information generated from the requested data and the requested data. The error detection information generating unit 62 generates error detection information with respect to the requested data.

The error detecting unit 63 determines whether an error is occurred in the requested data, from the requested data and the error detection information. The error correction information generating unit 64 generates error correction information with respect to the requested data.

The error correcting unit 65 corrects the error of the data, from the requested data determined by the error detecting unit 63 that the error is occurred and the error correction information. The predetermined strength exists in the capability of the error correcting unit 65 to perform the error correction, and the error may not be corrected depending on an error situation of the data.

The error detection information and/or the error correction information may be recorded with data in the data written block or in a predetermined block that is different from the data written block, or the error detection information or the error correction information may be recorded in a storage area other than the semiconductor memory array 9.

When the error detection information and/or the error correction information and the data are recorded in the data written block, for example, the error detection/correction information managing unit 61 manages a recording method of the data recorded in the block and the error detection information and/or the error correction information, that is, a recording format.

When the error detection information and/or the error correction information is recorded in the predetermined block that is different from the data written block or the error detection information and/or the error correction information is recorded in the storage area other than the semiconductor memory array 9, for example, the error detection/correction information managing unit 61 manages a record place and a recording method of the data and the error detection information and/or the error correction information corresponding to the data.

The information that is managed by the error detection/correction information managing unit 61 may be stored in the predetermined block of the semiconductor memory array 9, stored in the cache memory 293, or stored in both the cache memory 293 and the semiconductor memory array 9. Alternatively, the information may be stored in the storage area other than the semiconductor memory array 9. The information that is stored in the semiconductor memory array 9 does not need to be updated whenever the information of the cache memory 293 is updated.

If the needed information is appropriately recorded as the information that is managed by the error detection/correction information managing unit 61, the data structure that is related to the recording is not limited.

In the following embodiment, the case where the error detection information and the error correction information and the data are recorded in the data written block will be described. In the following embodiment, the error detection information and/or the error correction information and the data may not be recorded in the data written block.

(Detail Configuration of the Parity Control Unit)

Figure 7:
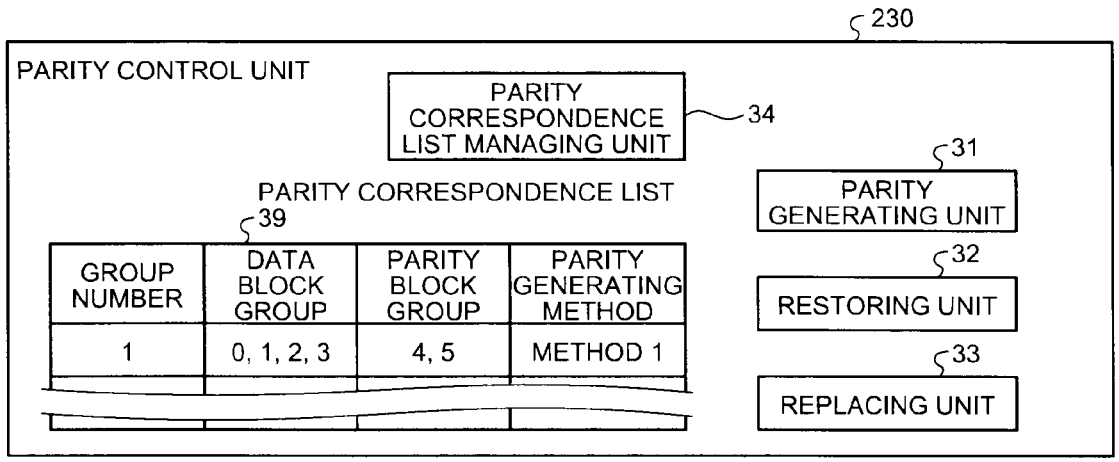
FIG. 7 is a diagram illustrating an example of the functional configuration of a parity control unit 230.

FIG. 7 illustrates an example of the functional configuration of the parity control unit 230. The parity control unit 230 executes a generating process of parity data or a restoring process of data and manages a variety of information needed to execute these processes.

The parity control unit 230 manages the parity correspondence list 39 and has the parity generating unit 31, the restoring unit 32, the replacing unit 33, and the parity correspondence list managing unit 34.

The parity correspondence list 39 is information that indicates a relationship between parity data generated from data of a data block, a parity generating method, and a data recorded block. In this case, the data block means a block in which data becoming a base of generation of the parity data is stored. The parity block means a block where the parity data generated from the data recorded in the data block is recorded. As described above, the parity group means a group that includes plural blocks where data is stored and one or more blocks where redundancy data (parity data) generated from the data stored in the plural blocks is stored. The redundancy data is generated using a predetermined method.

In the parity correspondence list 39 of FIG. 7, a parity group that has a parity group number 1 is illustrated. In the parity group that has the parity group number 1, two parity data generated from a block group including blocks having block numbers 0, 1, 2, and 3 are recorded in blocks having block numbers 4 and 5. A method of generating each parity of a parity group number 1 is a method 1. According to a parity generating method, a parity allocation block is not limited to one parity allocation block, and may be a parity allocation block group composed of plural parity allocation blocks.

The parity correspondence list 39 is updated by the parity control unit 230 at the time of a parity group registering process or a parity group registration releasing process to be described below. Specifically, the parity correspondence list managing unit 34 updates the parity correspondence list 39. In the parity correspondence list 39, the amount of managed information increases or decreases according to an increase or a decrease in the parity group.

The parity generating unit 31 generates parity data according to a predetermined method, from data of the requested block group. Specifically, if the parity generating unit 31 receives a parity generation request from the parity generation patrol unit 240, the parity generating unit 31 generates the parity data using a parity generating method from data stored in a data block group, based on information of the data block group and the parity generating method included in the request, and transmits the generated parity data to the parity generation patrol unit 240.

The restoring unit 32 receives a restoration request of data, which is stored in the block where the error correction can not be made, from the read processing unit 221 or the read patrol unit 241, and restores the data of the requested block from data recorded in a block constructing the parity group to which the requested block belongs, according to the predetermined method. The restoring unit 32 transmits the restored data to the read processing unit 221 or the read patrol unit 241 from which the request is received.

The replacing unit 33 receives a replacing request from the read processing unit 221 or the read patrol unit 241, and updates data before restoration, that is, a variety of information indicating a correction disabled block that corresponds to a block where data where the error correction is disabled is recorded with a variety of information indicating a restored block corresponding to a block where the restored data is newly recorded.

Specifically, when the correction disabled block is registered in the address table 11, the replacing unit 33 requests the block control unit 210 to erase a block number indicating the correction disabled block of the address table 11. The replacing unit 33 requests the block control unit 210 to associate the address area with which the block number erased by the block control unit 210 is associated and the block number indicating the restored block.

The replacing unit 33 requests the block control unit 210 to change the block state of the restored block to a block state of the correction disabled block, in the block table 12. Next, the replacing unit 33 requests the block control unit 210 to change the block state of the correction disabled block to a non-allocation state.

The read processing unit 221 or the read patrol unit 241 may notify the replacing unit 33 of an error occurrence degree of the correction disabled block. Thereby, according to the error occurrence degree, the state of the correction disabled block may be set to a block state of an "error rash state", and the correction disabled block may be controlled not to be used any more.

The replacing unit 33 requests the parity correspondence list managing unit 34 to execute a parity group registration releasing process of a group where a block number indicating the correction disabled block is associated, among the parity correspondence list 39. Then, the replacing unit 33 requests the parity correspondence list managing unit 34 to execute a registering process of the parity group where the block number indicating the correction disabled block is replaced by the block number indicating the restored block, in the block number of the data block associated with the group number of the parity group where the registration is released and the block number of the parity block.

Thereby, the individual units, such as the read processing unit 221, does not have access to the correction disabled block, and can have access to the restored block. For this reason, redundancy that disappears when the error correction is disabled is regenerated.

If the parity correspondence list managing unit 34 receives a request of the parity group registration releasing process, the parity correspondence list managing unit 34 erases the information of the group, which becomes the request target of the releasing process, from the parity correspondence list 39.

If the parity correspondence list managing unit 34 receives a request of the parity group registering process, associates the group of the block numbers of the data blocks, the group of the block numbers of the parity blocks, and the information of the parity generating method with each other and registers the association result.

The parity correspondence list 39 may be stored in a predetermined block of the semiconductor memory array 9, stored in the cache memory 293, or stored in both the cache memory 293 and the semiconductor memory array 9. Alternatively, the parity correspondence list 39 may be stored in a storage area other than the semiconductor memory array 9. The information of the parity correspondence list that is stored in the semiconductor memory array 9 does not need to be updated whenever the information of the cache memory 293 is updated. If the needed information is appropriately recorded in the parity correspondence list 39, the data structure that is related to the recording is not limited.

(Write Process)

Figure 8:
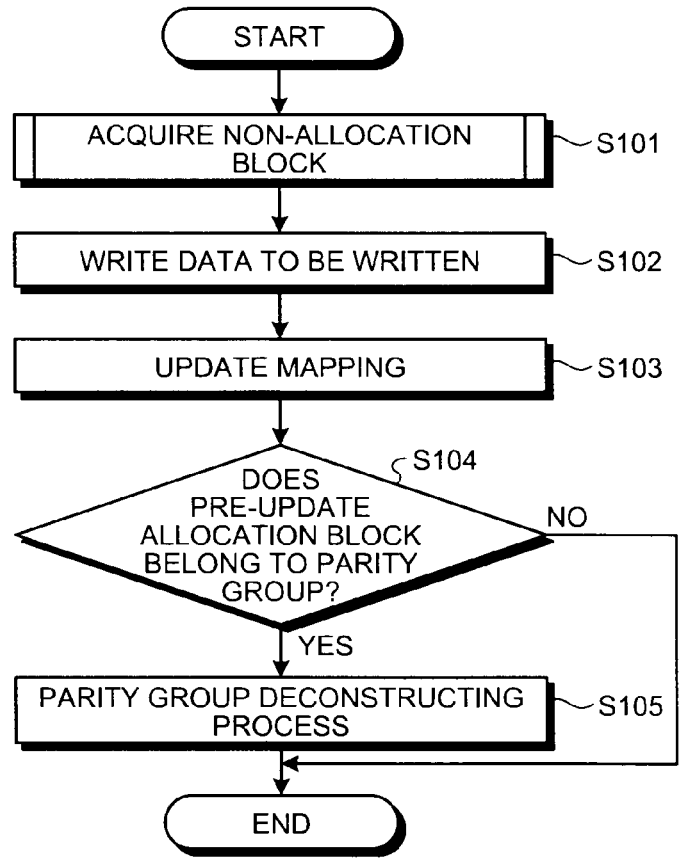
FIG. 8 is a flowchart illustrating a write process according to a second embodiment.

FIG. 8 illustrates a flowchart of the write process. The write process of FIG. 8 starts based on a write request from the host device 300. In step S101, the write processing unit 220 receives the write request, the error detection information generating unit 62 generates error detection information from the write request data, the error correction information generating unit 64 generates error correction information, and contents to be written into a block are prepared. The block control unit 210 executes an extraction process of a non-allocation block and secures the non-allocation block.

In step S102, the write processing unit 220 executes an erasing process of the non-allocation block secured in step S101 and writes the prepared write contents. For example, the write processing unit 220 records the error detection information or the error correction information and data in a data written block. The write processing unit 220 may record the error detection information or the error correction information in a predetermined block that is different from the data written block or record the error detection information or the error correction information in a storage area other than the semiconductor memory.

In step S102, when an equalizing process is executed, the write processing unit 220 executes an update process of the non-allocation block and the block control unit 210 updates equalization information of the non-allocation block.

In step S103, the block control unit 210 and the write processing unit 220 updates mapping of the non-allocation block where the updated information is recorded and the pre-update block. Specifically, first, after receiving the request from the write processing unit 220, the block control unit 210 acquires a number of the pre-update block that corresponds to the address area where the write request address is included, based on the information held in the address table 11 of the block control unit 210. The block control unit 210 notifies the write processing unit 220 of the number of the pre-update block. After receiving the request from the write processing unit 220, the block control unit 210 erases the number of the pre-update block from the address area of the address table 11, and sets a number of a non-allocation block into which data is newly written. Thereby, the update of the address table is completed.

In step S103, after receiving the request from the write processing unit 220, the block control unit 210 sets a state of the pre-update block to a non-allocation state and sets a state of the non-allocation block where the updated information is recorded to an address allocation state. Thereby, setting of the block state is completed. When the block control unit 210 sets the state of the pre-update block to the non-allocation state and the process of step S103 ends, the pre-update block can be collected as the non-allocation block.

In step S103, after receiving the request from the write processing unit 220, the arrangement sequence information managing unit 270 updates arrangement sequence information to correspond to the update of the address table 11.

In step S104, after receiving the request from the write processing unit 220, the parity control unit 230 determines whether the pre-update block, that is, the block whose state is set to the non-allocation state belongs to any parity group. When it is determined that the pre-update block belongs to any parity group, the process proceeds to step S105, and when it is determined that the pre-update block does not belong to any parity group, the process ends.

The determination on whether the pre-update block belongs to any parity group may be made as follows. After receiving the request from the write processing unit 220, the parity control unit 230 searches the parity group to which the pre-update block belongs and determines whether there is the parity group to which the block belongs, based on a return value.

In step S105, the parity control unit 230 and the block control unit 210 deconstruct the parity group according to the request from the write processing unit 220. The deconstruction of the parity group is executed, when the pre-update block belongs to the parity group, to collect the pre-update block and the parity block group belonging to the parity group as the non-allocation blocks.

Specifically, according to the request from the write processing unit 220, the block control unit 210 changes a state of the parity block group constructing the parity group to a non-allocation state and collects the parity block group as the non-allocation blocks. According to the request from the write processing unit 220, the parity control unit 230 releases the registration of the parity group. Thereby, a deconstructing process of the parity group can be realized.

(Example of the Write Process)

FIGS. 9A to 10D illustrate states of each table before and after the write process. In FIGS. 9A to 10D, a part of information that is included in each table is illustrated. FIGS. 9A to 9C illustrate states of the address table 11, the block table 12, and the parity correspondence list 39 before the write process, respectively. In the address table 11 of FIG. 9A, for example, an address area 0 and a block number 0 are associated with each other.

In the block table 12 of FIG. 9B, block numbers 0 to 7 indicate blocks in an address allocation state, block numbers 8 and 9 indicate parity allocation blocks, and block numbers 10 to 12 indicate non-allocation blocks.

In the parity correspondence list 39 of FIG. 9C, parity groups that have group numbers of 0 and 1 are illustrated.

Figure 9D:
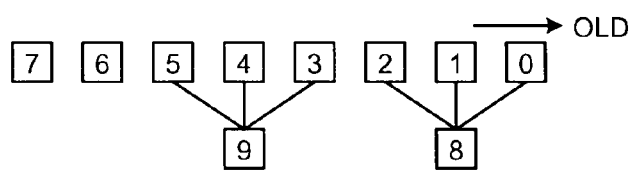

FIG. 9D schematically illustrates a relationship between the blocks and the parity groups, which corresponds to FIGS. 9A to 9C. In FIG. 9D, an arrangement sequence is used as a data update sequence for each address area, that is, an erase period. Specifically, the block numbers 0 to 2 form the parity group 0 and the parity data is stored in the block of the block number 8. The block numbers 3 to 5 form the parity group 1 and the parity data is stored in the block of the block number 9.

Figures 10A, 10B, 10C, 10D:
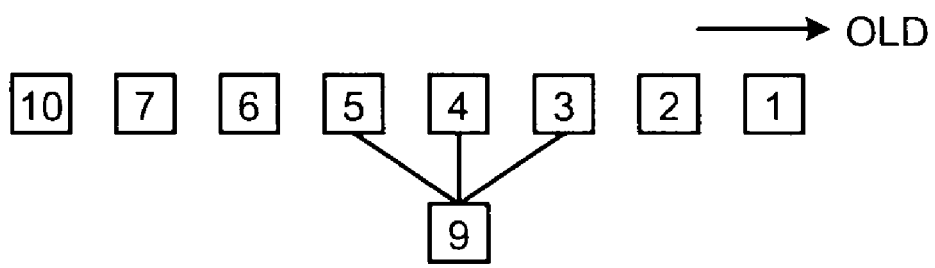
FIG. 10A to 10D are diagrams illustrating a state of each table after the write process according to the second embodiment.

FIGS. 10A to 10C illustrate updated places in the address table 11, the block table 12, and the parity correspondence list 39, when a write request is generated with respect to the address area 0 in the state illustrated in FIGS. 9A to 9C. Only places that correspond to the updated places are illustrated in FIGS. 10A to 10C.

When the write process is executed, first, the block control unit 210 extracts the non-allocation block 10 and the write processing unit 220 writes data. The block control unit 210 updates information of states of the blocks 0 and 10. Thereby, as illustrated in FIGS. 10A and 10B, the block 0 becomes a non-allocation block and the block 10 becomes an address allocation block.

The parity control unit 230 deconstructs the parity group 0. Thereby, as illustrated in FIGS. 10B and 10C, the block 8 where the parity data is stored becomes the non-allocation block, and the parity group that has the group number of 0 is erased from the parity correspondence list 39.

FIG. 10D schematically illustrates the processes of FIGS. 10A to 10C. In this case, a block arrangement sequence is set as a data update sequence for each address area. Accordingly, an arrangement sequence of the block 10 that newly enters in an address allocation state is located at a leftmost side.

(Read Process)

Figure 11:
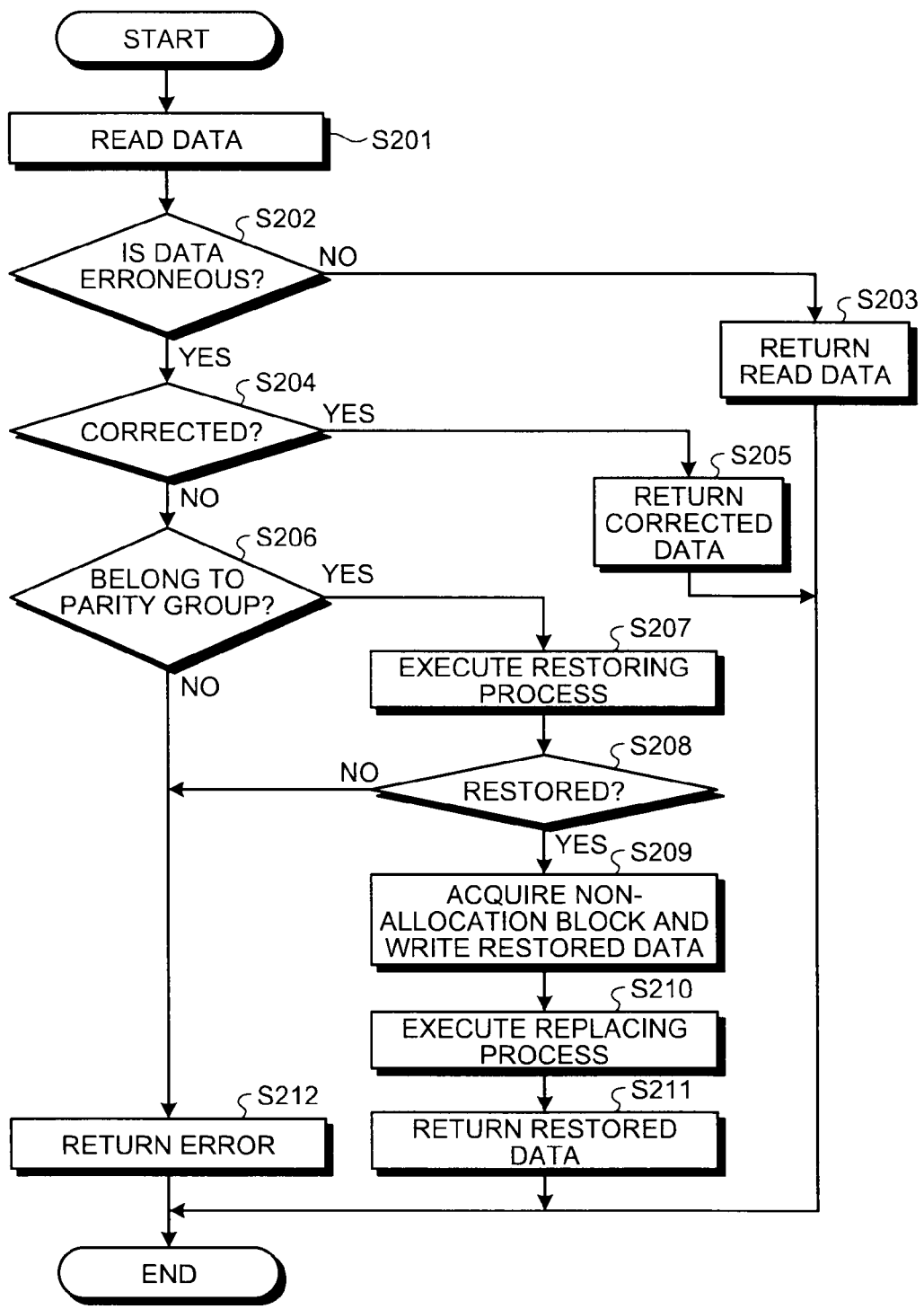
FIG. 11 is a flowchart illustrating a read process.

FIG. 11 illustrates a flowchart of the read process. In step S201 of FIG. 11, the read processing unit 221 receives the read request from the host device 300. According to the request from the read processing unit 221, the block control unit 210 specifies a block number based on the address area and the address table 11 included in the read request, and returns the specified number to the read processing unit 221. The read processing unit 221 reads the data that is recorded in the block. In step S201, the read processing unit 221 reads the error detection information and the error correction information.

In step S202, according to the request from the read processing unit 221, the error detecting unit 63 executes an error detecting process on the read data and determines whether the read data is erroneous. When the read data is erroneous, the process proceeds to step S204, and when the read data is not erroneous, the process proceeds to step S203. In step S203, the read processing unit 221 returns the read data to a read request origin.

Meanwhile, in step S204, according to the request from the read processing unit 221, the error correcting unit 65 executes an error correcting process on the read data. When the error correction is succeeded, the process proceeds to step S205, and when the error correction is failed, the process proceeds to step S206. In step S205, the error corrected data in step S204 is returned to the read request origin.

Similar to steps S209 and S210 described below, the read processing unit 221 may replace the block where the data before the error correction is recorded by the block where the error corrected data is recorded, based on the error corrected data. Thereby, a situation where the error state becomes worse and the error correction is finally disabled can be prevented. The replacing process does not need to be executed whenever the error correction is succeeded, and may be executed only when an error degree exceeds a predetermined threshold value.

In step S206, according to the request from the read processing unit 221, the restoration possibility/impossibility determining unit 250 determines whether the block where the error non-corrected data is recorded belongs to the parity group. When the block belongs to the parity group, the process proceeds to step S207 and a restoring process is executed. Meanwhile, when the block does not belong to the parity group, the restoring process cannot be executed and the process proceeds to step S212. The determination is realized by searching the parity group to which the block belongs in the parity correspondence list 39 and determining whether the parity group exists.

In this embodiment, the data where the error is detected and the error correction is disabled is restored from redundancy information based on the parity. However, the essential elements that are related to the process of restoring the data from the redundancy information based on the parity are not limited thereto. For example, the principle of the error detected data being restored from the redundancy information based on the parity may be adopted. In this way, the fault tolerance that is obtained by the error correction is lowered, but a storage area corresponding to the error correction information can be saved. The process contents that are described in this embodiment may be appropriately replaced by the principle of the error detected data being restored from the redundancy information based on the parity.

In step S207, according to the request from the read processing unit 221, the restoring unit 32 executes a restoring process on the data where the error correction is disabled. In step S208, the restoring unit 32 determines whether the data can be restored. When it is determined that the data can be restored, the process proceeds to step S209 and the restoring process is tried. However, when the data cannot be restored due to any factor, the process proceeds to step S212.

In step S209, the read processing unit 221 updates the block based on the restored data. That is, the read processing unit 221 acquires the non-allocation block and writes the restored data. Specifically, the read processing unit 221 requests the error detection information generating unit 62 to generate the error detection information, and the error detection information generating unit 62 generates the error detection information from the restored data. The read processing unit 221 requests the error correction information generating unit 64 to generate the error correction information, and the error correction information generating unit 64 generates the error correction information from the restored data and prepares the contents to be written into the block.

Next, according to the request from the read processing unit 221, the block control unit 210 executes an extracting process of the non-allocation block and secures the non-allocation block. The read processing unit 221 executes an erasing process on the secured non-allocation block and writes the prepared write contents. In this case, the read processing unit 221 records the error detection information or the error correction information and the data in the data written block. The read processing unit 221 may record the error detection information or the error correction information in a predetermined block that is different from the data written block or record the error detection information or the error correction information in a storage area other than the semiconductor memory.

In step S209, when the equalizing process is executed, the update process of the non-allocation block is executed. Therefore, the block control unit 210 updates the equalization information of the non-allocation block according to the request from the read processing unit 221.

In step S210, according to the request from the read processing unit 221, the replacing unit 33 executes a replacing process of the restored block and the correction disabled block. Thereby, such as the read processing unit 221 does not have access to the correction disabled block, and can have access to the restored block. For this reason, redundancy that disappears when the error correction is disabled is regenerated.

The block where the error is occurred is not limited to the block where the semiconductor memory is failed. For example, only the recorded data is destructed and the corresponding block may be continuously used by executing erasing and write processes again. For this reason, the read processing unit 221 may collect the error occurred block as the non-allocation block.

The read processing unit 221 may notify the replacing unit 33 of an error occurred degree of the block before restoration. Thereby, according to the error occurrence degree, the state of the block before restoration may be set to a block state of an "error rash state", and the block may be controlled not to be used any more.

In step S211, the read processing unit 221 returns the restored data to the read request origin and ends the process. The process of returning the restored data to the read request origin may be executed before the process of steps S209 or S210. Thereby, the read request origin can restart the process subsequent to the read request as fast as possible.

In step S212, the read processing unit 221 returns a value indicating the error to the read request origin. When information indicating the read error is separately added to the address table 11, and when the following read request with respect to the address area is given, the read processing unit 221 may return the read error without executing the processes after the process of step S201. Thereby, the processing amount can be reduced.

(Parity Generating Process)

Figure 12:
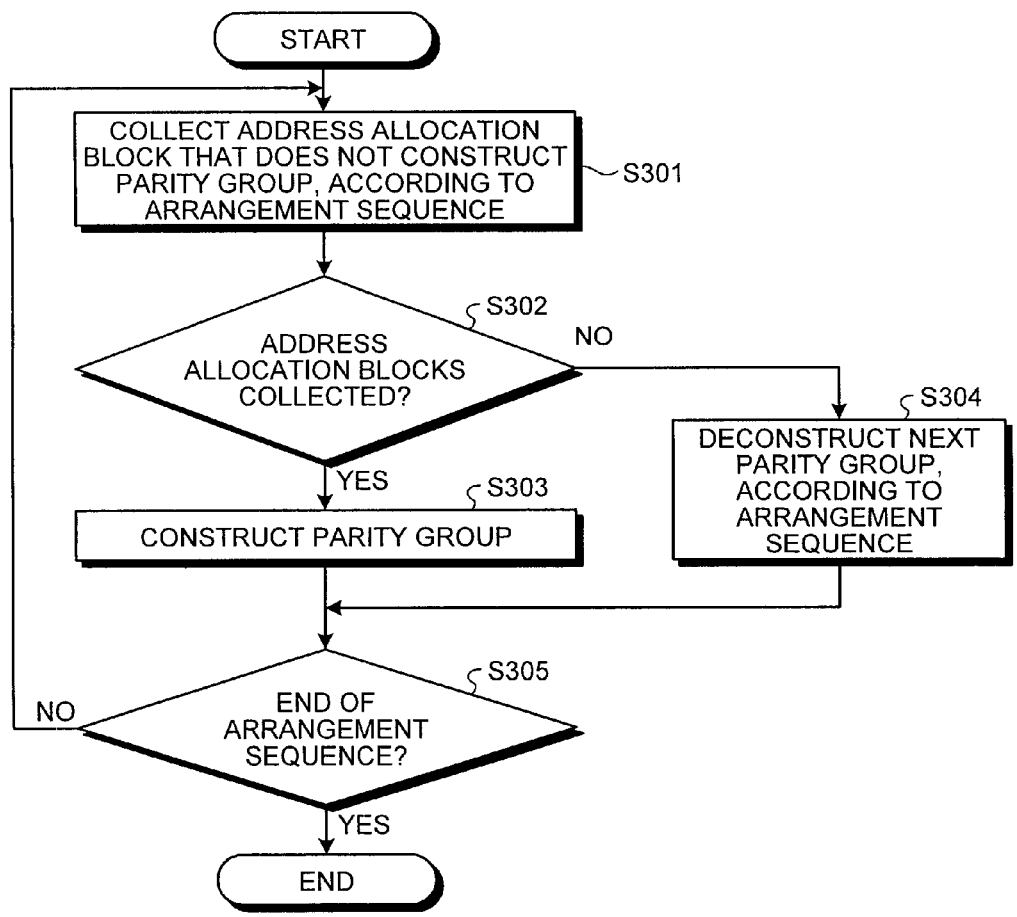
FIG. 12 is a flowchart illustrating a parity generating process.

FIG. 12 illustrates the parity generating process. The parity generating process of FIG. 12 is executed by the parity generation patrol unit 240. When the number of address allocation blocks that do not construct the parity group exceeds a predetermined threshold value, the parity generation patrol unit 240 executes a parity generating process. However, the present invention is not limited to the case where the parity generation patrol unit 240 generates the parity when the number of the address allocation blocks that do not construct the parity group exceeds the predetermined threshold value. For example, the parity generation patrol unit 240 may regularly execute the parity generating process or execute the parity generating process when a process load of the controller 200a is less than a predetermined threshold value. Also, the parity generating process may be executed at previously determined or dynamically determined timing.

In step S301 of FIG. 12, the parity generation patrol unit 240 collects the address allocation blocks not constructing the parity group in the order of the old update sequences, based on the arrangement sequence information managed by the arrangement sequence information managing unit 270, the block state information managed by the block control unit 210, and the parity group information managed by the parity control unit 230.

In step S302, the parity generation patrol unit 240 determines whether the address allocation blocks of the predetermined number are collected. When the number of collected blocks reaches the predetermined number, the process proceeds to step S303, and when the number of collected blocks is less than the predetermined number, the process proceeds to step S304.

In step S303, the parity generation patrol unit 240, the block control unit 210, the parity control unit 230, the error detection information generating unit 62, and the error correction information generating unit 64 generate a new parity group. First, the parity generating unit 31 generates parity data from the data recorded in the collected blocks. Next, according to the request from the parity generation patrol unit 240, the error detection information generating unit 62 generates error detection information from the generated parity data. Accordingly, according to the request from the parity generation patrol unit 240, the error correction information generating unit 64 generates error correction information. Thereby, the parity generation patrol unit 240 prepares the contents to be written into the parity allocation block.

The block control unit 210 executes an extracting process of the non-allocation block and secures the non-allocation block. The parity generation patrol unit 240 executes an erasing process on the secured non-allocation block and writes the prepared write contents. In this case, the error detection information and the error correction information and the data are recorded in one block.

However, the block into which the error detection information or the error correction information are written may be different from the block into which the data is written, or the error detection information or the error correction information may be recorded in a predetermined block. The error detection information or the error correction information may be recorded in a storage area that is different from the semiconductor memory array 9.

According to the request from the parity generation patrol unit 240, the block control unit 210 sets information of the state of the non-allocation block as the parity allocation state. When the equalizing process is executed, according to the request from the parity generation patrol unit 240, the block control unit 210 updates the equalization information of the non-allocation block according to the update process of the non-allocation block.

According to the request from the parity generation patrol unit 240, the parity control unit 230 executes a registering process of a parity group to register the collected blocks and the parity allocation block as a new parity group.

In step S304, the parity generation patrol unit 240 deconstructs a next parity group in the arrangement sequence. Thereby, in step S301 in a next repetition process, it can be expected that address allocation blocks of the predetermined number are collected.

Specifically, first, according to the arrangement sequence information managed by the arrangement sequence information managing unit 270, by the request from the parity generation patrol unit 240 to the parity control unit 230 and the block control unit 210, a registration releasing process of a parity group of a next sequence as the arrangement sequence is executed. Specifically, according to the request from the parity generation patrol unit 240, the parity control unit 230 and the block control unit 210 changes a state of the parity block group constructing the parity group to the non-allocation state and, as a result, collect the parity block group as the non-allocation blocks. According to the request from the parity generation patrol unit 240, the parity control unit 230 releases the registration of the parity group. Thereby, the releasing process of the parity group can be realized.

If the parity generation patrol unit 240 determines at step S305 that the end of the arrangement sequence has not been reached, the process returns to step S301, and the process is repeated until the process related to all of the blocks in the arrangement sequence end. The repeated process ends when the position of the arrangement sequence information reaches the terminating end of the arrangement sequence information.

When the position of the arrangement sequence information reaches the terminating end of the arrangement sequence information and the address allocation blocks of the predetermined number are not collected, the address allocation blocks do not construct a parity group. These address allocation blocks construct the parity group according to the arrangement sequence, when the following parity generating process is executed.

A predetermined threshold value may be set to the arrangement sequence, and the address allocation blocks having the high update frequency whose values exceed the predetermined threshold value may be made not to construct the parity group. The address allocation block having the high update frequency means the address allocation block where a period of time of the address allocation block after becoming the address allocation block is short.

Specifically, the address allocation blocks that have an upper predetermined ratio in the update frequency may not construct the parity group. For example, a value of 10% can be used as the predetermined ratio. Thereby, a parity generation count can be further reduced, processing performance can be improved, and the lifespan of the semiconductor memory array 9 can be suppressed from being shortened due to the write of the parity data.

(Variation of a Parity Generating Process)

In the parity generating process described above, the arrangement sequence information is dynamically changed, which is obtained from an observed result related to the update frequency and the fault tolerance when the arrangement sequence information of the block is introduced.

However, instead of dynamically changing the arrangement sequence information and constructing the parity group, the parity group may be constructed according to static information, for example, an address area number sequence. When the static information is used, the fault tolerance is lowered, as compared with the case where the parity group is constructed according to the dynamically changed arrangement sequence information. Meanwhile, if the parity group is constructed according to the static information, the address allocation blocks of the predetermined number can be always collected, at the time of the determination of step S302 of FIG. 12.

(Example of the Parity Generating Process)

FIGS. 13A to 16D illustrate examples of the address table 11 and so on at the time of a process of generating a parity group.

Figure 13D:
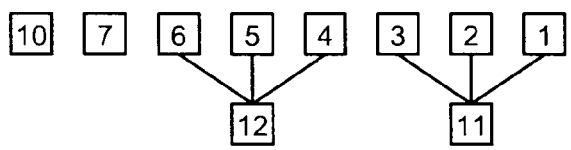

FIGS. 13A to 13D illustrate an example of the address table 11 and so on when an arrangement sequence is a data update sequence for each address area. Specifically, FIGS. 13A to 13D illustrate an example of the address table 11 when the write request with respect to the address area 0 is generated in the state of FIGS. 9A to 9D, the state of FIGS. 9A to 9D becomes the state of FIGS. 10A to 10D, and the parity group is generated. FIG. 13A illustrates only the address table 11, FIG. 13B illustrates only the block table 12, and FIG. 13C illustrates only the parity correspondence list 39. In this case, only minimally required information is described. FIG. 13D schematically illustrates the generated parity group.

In the state illustrated in FIGS. 10A to 10D, the parity generation patrol unit 240 collects the blocks 1 and 2 of the address allocation blocks. In this case, however, address allocation blocks of the predetermined number, that is, three address allocation blocks are not collected. Accordingly, the parity control unit 230 deconstructs a next parity group 1 according to the arrangement sequence information. Thereby, the block 9 becomes a non-allocation block and the group number 1 is erased from the parity correspondence list 39 illustrated in FIG. 100.

If the parity generation patrol unit 240 collects the block 3 that is the address allocation block, the three address allocation blocks can be collected. Thereby, the parity group can be constructed. By this process, for example, the block 11 becomes the parity allocation block and the parity group 2 is registered in the parity correspondence list 39.

Next, the three address allocation blocks can be collected by collecting the blocks 4, 5, and 6 corresponding to the address allocation blocks, and the parity group can be constructed. By this process, for example, the block 12 becomes the parity allocation block and the parity group 3 is registered in the parity correspondence list 39.

The parity generation patrol unit 240 collects the blocks 7 and 10 corresponding to the address allocation blocks, but the address allocation blocks of the predetermined number are not collected. At this point of time, the position of the arrangement sequence reaches the terminating end of the arrangement sequence and the parity generating process ends.

In this way, the tables that are illustrated in FIGS. 13A to 13D are realized.

FIGS. 14A to 16D illustrate examples of the address table 11 and so on when constructing a parity group according to static information. FIG. 14A to 14D illustrate a state before the write process starts, FIGS. 15A to 15D illustrate a state after the write process is executed, and FIGS. 16A to 16D illustrate a state after the parity group is generated. In FIGS. 14A to 16D, only places that are related to update places are illustrated.

Figures 14C, 14D:
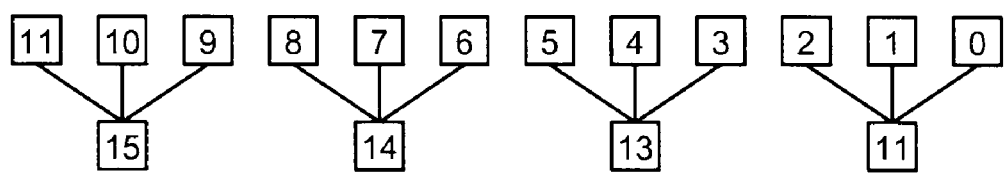
FIGS. 14C and 14D are diagrams illustrating an example of an address table 11 when a parity group is constructed according to static information.
Figures 15A, 15B, 15C, 15D:
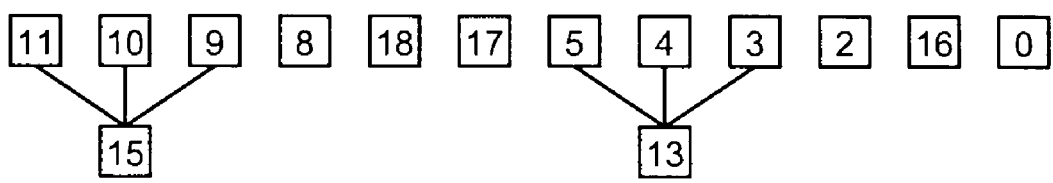
FIGS. 15A to 15D are diagrams illustrating an example of an address table 11 when a parity group is constructed according to static information.
Figures 16C, 16D:
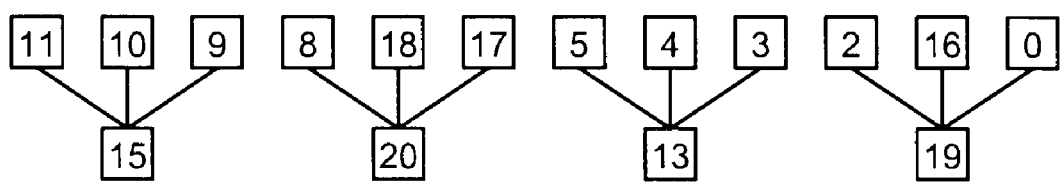
FIGS. 16C and 16D are diagrams illustrating an example of an address table 11 when a parity group is constructed according to static information.

In FIGS. 14A to 16D, FIGS. 14A, 15A, and 16A illustrate the address table 11, FIGS. 14B, 15B, and 16B illustrate the block table 12, FIGS. 14C, 15C, and 16C illustrate the parity correspondence list 39, and FIGS. 14D, 15D, and 16D schematically illustrate the states corresponding to the FIGS. 14A, 14B, 14C, 15A, 15B, 15C, 16A, 16B, and 16C.

In the case of the state illustrated in FIG. 14D, if the write process is executed with respect to the address areas 1, 6, and 7, the state becomes a state illustrated in FIG. 15D. In the write process, the parity groups 0 and 2 are deconstructed. For example, the blocks 16, 17, and 18 become new address allocation blocks. If the parity generating process is executed, the state becomes a state illustrated in FIG. 16D.

Different from the case where the parity group is constructed according to the dynamically changed arrangement sequence information, the address allocation blocks of the predetermined number are necessarily collected. In the examples of FIGS. 15A to 16D, the parity group 4 is generated from the address allocation blocks 0, 16, and 2 and the parity group 5 is generated from the address allocation blocks 17, 18, and 8.

(Read Patrol Process)

Figure 17:
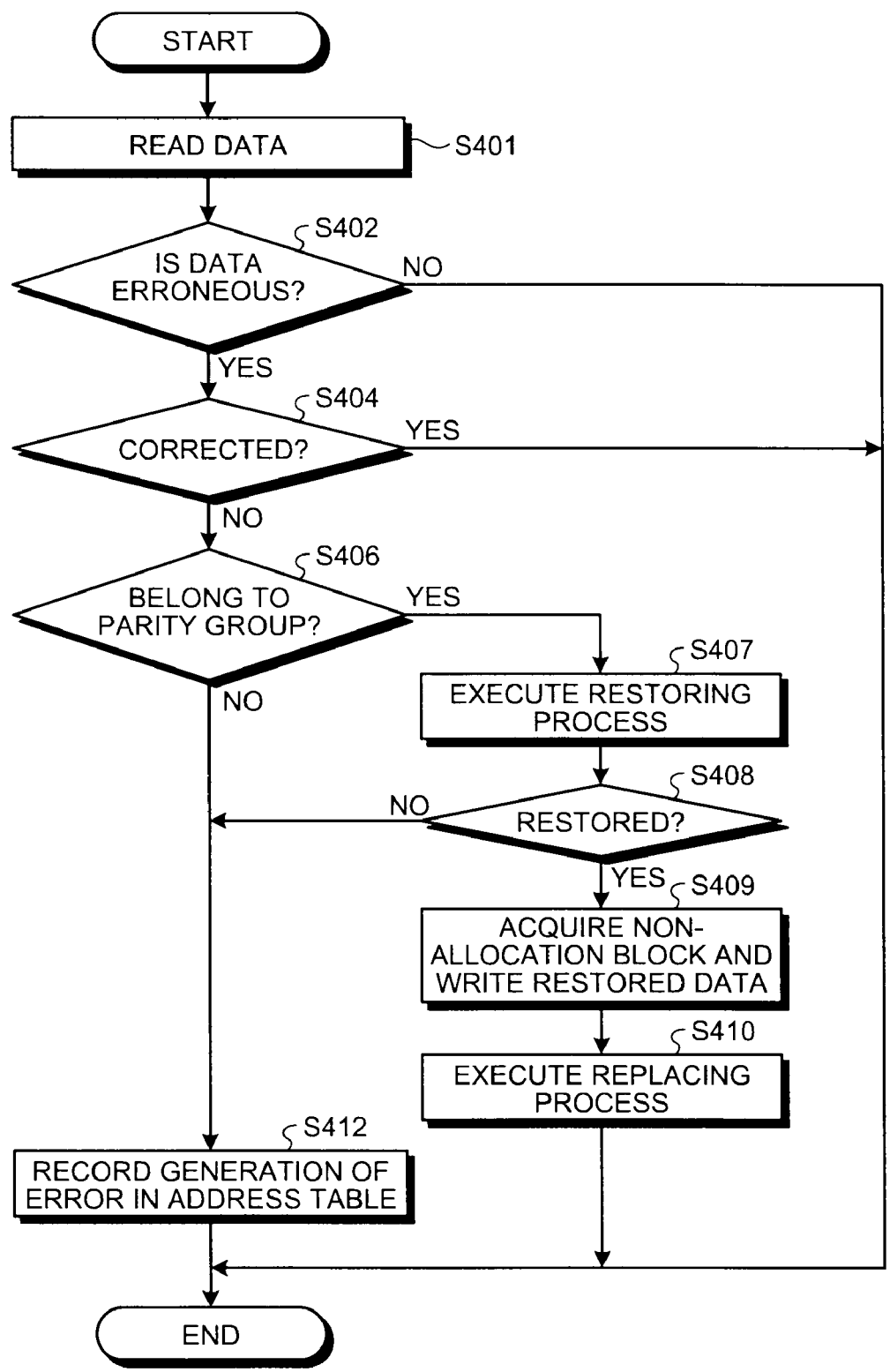
FIG. 17 is a flowchart illustrating a read patrol process.

FIG. 17 illustrates a read patrol process. The process of FIG. 17 is different from the read process of FIG. 11 in that the data is not returned to the read request origin. Specifically, in step S401, the block that becomes the read target may not be limited to the address allocation block. All of the blocks being used, that is, the address allocation blocks and the parity allocation blocks may be set to the read targets.

The processes of steps S203, S205, and S211 of FIG. 11 are not executed. Instead of the process of step S212 of FIG. 11, in step S412, the read patrol unit 241 records the address area subjected to the read process being erroneous in the address table 11. Thereby, in the following read process with respect to the address area, a read error can be returned. A protocol that is needed to notify the host device 300 of the occurrence of the error may be separately prepared and may be notified to the host device 300.

Since the other steps of FIG. 17 are the same as those of FIG. 11, the description thereof will not be repeated here.

When the error occurrence frequency at the time of the read process exceeds the predetermined threshold value, the read patrol unit 241 executes a read patrol process. However, the present invention is not limited to the case where the read patrol unit 241 executes the read patrol process when the error occurrence frequency at the time of the read process exceeds the predetermined threshold value. For example, the read patrol unit 241 may regularly execute the read patrol process or execute the read patrol process when a process load of the controller 200a is less than a predetermined threshold value. Also, the read patrol process may be executed at previously determined or dynamically determined timing.

If the read patrol process is executed, before the actual read process, the restoring process of the block that becomes the error correction disabled state is enabled. Thereby, the fault tolerance becomes high and the processing amount at the time of the actual read process can be reduced.

By this configuration, the data can be restored and the fault tolerance can be improved. The parity data does not need to be generated and written, whenever the write request is received. Therefore, the performance, such as the write process speed, can be suppressed from being deteriorated, and a write count of the parity data in the block can be reduced to minimize the shortening of the lifespan.

The receiver 29 according to the first embodiment corresponds to portions of the host interface unit 291, the write processing unit 220, and the read processing unit 221 according to the second embodiment. The first storage unit 28a according to the first embodiment corresponds to a portion of the block control unit 210 according to the second embodiment. The second writing unit 22b according to the first embodiment corresponds to a portion of the parity control unit 230 according to the second embodiment. The first writing unit 22a according to the first embodiment corresponds to a portion of the write processing unit 220, portions of the semiconductor memory interface unit 292 and the block control unit 210, and a portion of the parity control unit 230 according to the second embodiment. The second writing unit 22b according to the first embodiment corresponds to a portion of the parity generation patrol unit 240, a portion of the parity control unit 230, and portions of the semiconductor memory interface unit 292 and the block control unit 210 according to the second embodiment.

Third Embodiment

In this embodiment, when a write request from the host device 300 is processed, an association relationship between logical address information that can be recognized by the host device 300 and physical address information of data that is recorded in the semiconductor memory array 9 is updated. Also, the association relationship between the logical address information and the physical address information is updated at previously determined or dynamically determined timing.

Figure 18:
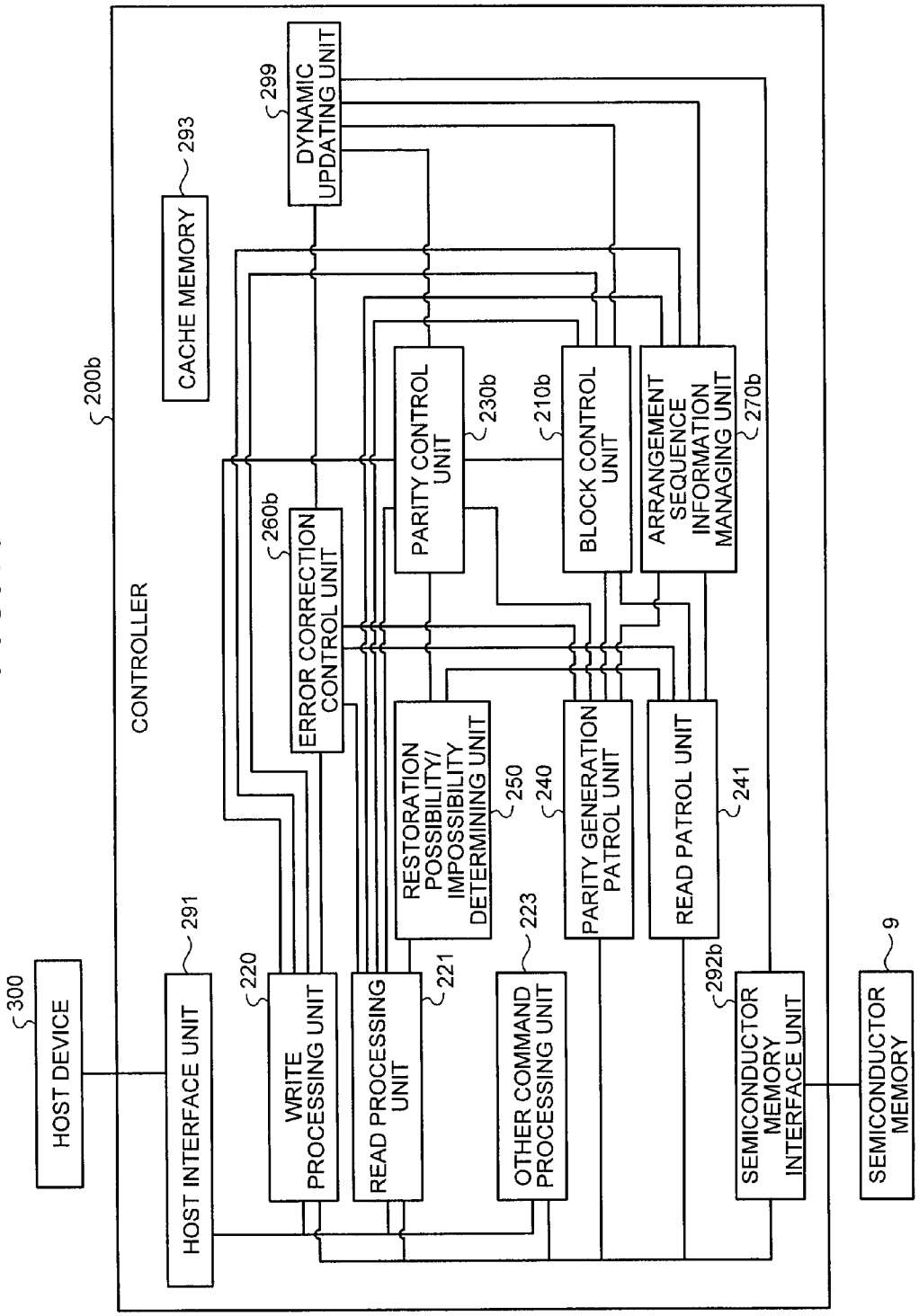
FIG. 18 is a diagram illustrating an example of the functional configuration of a controller 200b that is included in the semiconductor storage 1.

FIG. 18 illustrates an example of the functional configuration of the controller 200b that is included in the semiconductor storage 1 according to this embodiment. In the configuration of the controller 200b illustrated in FIG. 18, a dynamic updating unit 299 is further provided, in addition to the configuration of the controller 200a illustrated FIG. 3. In this case, only a portion of the third embodiment that is different from the second embodiment will be described. In this embodiment, an embodiment where the dynamic updating unit 299 is added to the configuration according to the second embodiment is described. However, the dynamic updating unit 299 may be added to the configuration of the other embodiments to be described below.

Among individual units illustrated in FIG. 18, an error correction control unit 260b, a parity control unit 230b, a block control unit 210b, an arrangement sequence information managing unit 270b, and a semiconductor memory interface unit 292b cooperate with the dynamic updating unit 299 and execute the process. Except for this point, since the contents of the cooperation process are the same as those of FIG. 3, the description thereof will not be repeated here.

The dynamic updating unit 299 updates the association relationship between the logical address information and the physical address information at previously determined or dynamically determined timing.

For example, in the case where an address area A1 and a block number B1 are associated with each other and an address area A2 and a block number B2 are associated with each other, when the association is replaced and updated, the dynamic updating unit 299 executes the following process.

The dynamic updating unit 299 records (copies) data, which is recorded in a block indicated by the block number B1, in a block indicated by the block number B2, and records (copies) data, which is recorded in a block indicated by the block number B2, in a block indicated by the block number B1. For example, using the cache memory 293 (temporary storage area), the copy process is realized as follows. The data that is recorded in the block indicated by the block number B1 is copied to the cache memory 293, the data that is recorded in the block indicated by the block number B2 is recorded (copied) in the block indicated by the block number B1, and the data that is copied to the cache memory 293 is recorded (copied) in the block indicated by the block number B2.

The dynamic updating unit 299 replaces information associated with the block number B1 and information associated with the block number B2 in the parity correspondence list 39, with respect to parity generation/non-generation information corresponding to information indicating whether parity is generated based on the data recorded in the semiconductor memory array 9.

This reason is that the parity data does not need to be generated again, even when data stored in a replacement target block becomes a base of generation of the parity data, because the data stored in the replacement target block does not change. Accordingly, the dynamic updating unit 299 may only replace the information associated with the block number B1 and the information associated with the block number B2 in the parity correspondence list 39. This is applicable to the case where the replacement target block stores the parity data.

The dynamic updating unit 299 replaces the association between the block number B1 associated with the address area A1 and the block number B2 associated with the address area A2. The dynamic updating unit 299 replaces a state of the block corresponding to the block number B1 and a state of the block corresponding to the block number B2.

The replacement target block is not limited to the block (address allocation block) that is associated with the address area. For example, when any one of the blocks is a non-allocation block, the data that is recorded in the non-allocation block is meaningless. Therefore, among the copying processes of the data contents, the copying process on the case where copy origin data is recorded in the non-allocation block can be omitted. Thereby, since a block erase/write count can be reduced, the processing speed can be improved, and the lifespan of the semiconductor storage can be suppressed from being shortened.

In the above process, since data is newly written and mapping of the address area is changed, the dynamic updating unit 299 may update the arrangement sequence information that is managed by the arrangement sequence information managing unit 270b. If the arrangement sequence information is updated, more appropriate information is obtained at the time of such as a next write process.

Specifically, the dynamic updating unit 299 reads the data of the block that is specified by the block number from the semiconductor memory array 9 through the semiconductor memory interface unit 292b, the error detection information that is associated with the data of the specified block and stored, and the error correction information that is associated with the data of the specified block and stored, based on the block number B1. When at least one of the error detection information and the error correction information is stored in a block different from the data written block, the dynamic updating unit 299 inquires the error detection/correction information managing unit 61 of the error correction control unit 260b about storage places of the error detection information and the error correction information associated with the data to be read, and reads the error detection information and the error correction information. The read data, the error detection information, and the error correction information are stored in the cache memory 293.

Next the dynamic updating unit 299 reads the data of the block that is specified by the block number from the semiconductor memory array 9 through the semiconductor memory interface unit 292b, the error detection information that is associated with the data of the specified block and stored, and the error correction information that is associated with the data of the specified block and stored, based on the block number B2. When at least one of the error detection information and the error correction information is stored in a block different from the data written block, the dynamic updating unit 299 inquires the error detection/correction information managing unit 61 of the error correction control unit 260b about storage places of the error detection information and the error correction information associated with the data to be read, and reads the error detection information and the error correction information.

The dynamic updating unit 299 erases the data of the block that is specified by the block number B1 of the semiconductor memory array 9 through the semiconductor memory interface unit 292b. The dynamic updating unit 299 writes the data read from the block specified by the block number B2, the error detection information, and the error correction information in the block specified by the block number B1 of the semiconductor memory array 9 through the semiconductor memory interface unit 292b. The dynamic updating unit 299 may record the error detection information or the error correction information in a predetermined block that is different from the data written block or record the error detection information or the error correction information in a storage area other than the semiconductor memory.

In order to correct the error of the data read from the block specified by the block number B2 or restore the data, the dynamic updating unit 299 may execute the processes that correspond to the processes of steps S402 to S407 in the read patrol process of FIG. 17, and use the error corrected data or the restored data as the write target data.

In this case, when the equalizing process is executed and information of an erase count of the data of the block or information of a period of time when the data of the block is erased is used, the dynamic updating unit 299 requests the block control unit 210b to update the equalization information of the block at timing when the data is erased.

The dynamic updating unit 299 erases the data of the block that is specified by the block number B2 of the semiconductor memory array 9 through the semiconductor memory interface unit 292b. The dynamic updating unit 299 writes the data, which is stored in the cache memory 293, in the block specified by the block number B2 of the semiconductor memory array 9 through the semiconductor memory interface unit 292b. In this case, the written data may be the data read from the block specified by the block number B1, the error detection information, and the error correction information.

The dynamic updating unit 299 may record the error detection information or the error correction information in a predetermined block that is different from the data written block or record the error detection information or the error correction information in a storage area other than the semiconductor memory.

In order to correct the error of the data read from the block specified by the block number B1 or restore the data, the dynamic updating unit 299 may execute the processes that correspond to the processes of steps S402 to S407 in the read patrol process of FIG. 17, and use the error corrected data or the restored data as the write target data.

In this case, when the equalizing process is executed and information of an erase count of the data of the block or information of a period of time when the data of the block is erased is used, the dynamic updating unit 299 requests the block control unit 210b to update the equalization information of the block at timing when the data is erased.

The replacement target block is not limited to the block (address allocation block) that is associated with the address area. For example, when any one of the blocks is a non-allocation block, the data that is recorded in the non-allocation block is meaningless. Therefore, among the copying processes of the data contents, the copying process on the case where copy origin data is recorded in the non-allocation block can be omitted. Thereby, since a block erase/write count can be reduced, the processing speed can be improved, and the lifespan of the semiconductor storage can be suppressed from being shortened.

The dynamic updating unit 299 inquires the parity control unit 230b about whether the block corresponding to the block number B1 or the block number B2 constructs the parity group. When the block corresponding to the block number B1 or the block number B2 constructs the parity group, the dynamic updating unit 299 requests the parity control unit 230b to erase the parity group. Next, the dynamic updating unit 299 requests the parity control unit 230b to register a parity group of parity group information where the information of the block number of the erased parity group is updated with the information of another block number.

A series of processes that issues the parity group erase request and the parity group registration request needs to be replaced, in a state where the compatibility is maintained with respect to the block numbers B1 and B2 and information related to other block is not changed.

When the block number B1 or B2 is registered in the address table 11, the dynamic updating unit 299 requests the block control unit 210b to erase the block number of the address table 11. The dynamic updating unit 299 requests the block control unit 210b to associate the address area, which is associated with the block number erased by the block control unit 210b, and another block number.

A series of processes that issues the block number erase request and the block number registration request needs to be replaced, in a state where the compatibility is maintained with respect to the block numbers B1 and B2 and information related to other block is not changed.

In the above process, since data is newly written and mapping of the address area is changed, the dynamic updating unit 299 may update the arrangement sequence information that is managed by the arrangement sequence information managing unit 270b. If the arrangement sequence information is updated, more appropriate information is obtained at the time of such as a next write process.

The dynamic updating unit 299 requests the block control unit 210b to change a state of the block having the block number B1 to a state of the block having the block number B2 in the block table 12 and requests the block control unit 210b to change a state of the block having the block number B2 to a state of the block having the block number B1. A series of processes that issues the two block state changing requests needs to be replaced, in a state where the compatibility is maintained with respect to the block numbers B1 and B2 and information related to other block is not changed.

In this way, the association between the logical address information and the physical address information can be updated at previously determined or dynamically determined timing.

Fourth Embodiment

In this embodiment, the number of parity allocation blocks increases or decreases under the predetermined condition. In an equalizing process, that is, in a process that is called wear leveling, when data is written, the data is written into the non-allocation block, a state of a block where old data of update target is recorded is set to an invalid state, that is, a non-allocation state, and mapping information of the block is updated.

For this reason, in the same equalizing process method, when the number of non-allocation blocks increases, an erase/write count per block decreases, and the lifespan of the semiconductor storage is lengthened.

In this case, if the number of blocks that are used as the parity allocation blocks increases, a redundancy degree becomes high and fault tolerance becomes high. However, the number of non-allocation blocks decreases and the lengthening effect of the lifespan based on the wear leveling becomes low. Meanwhile, if the number of blocks that are used as the parity allocation blocks decreases, a redundancy degree becomes low and fault tolerance becomes low. However, the number of non-allocation blocks increases and the lengthening effect of the lifespan based on the wear leveling becomes high.

Accordingly, for example, according to an increase/decrease in the occurrence frequency of a read error of data or an increase/decrease of an error rate in a read error, the number of blocks that are used as the parity allocation blocks may be increased or decreased. As such, when the lengthening effect of the lifespan is considered to be more important than the fault tolerance, the number of blocks that are used as the parity allocation blocks decreases. Meanwhile, when the fault tolerance is considered to be more important than the lengthening effect of the lifespan, the number of blocks that are used as the parity allocation blocks increases and the number of non-allocation blocks according to a needed redundancy degree can be secured.

(Entire Block Diagram)

Figure 19:
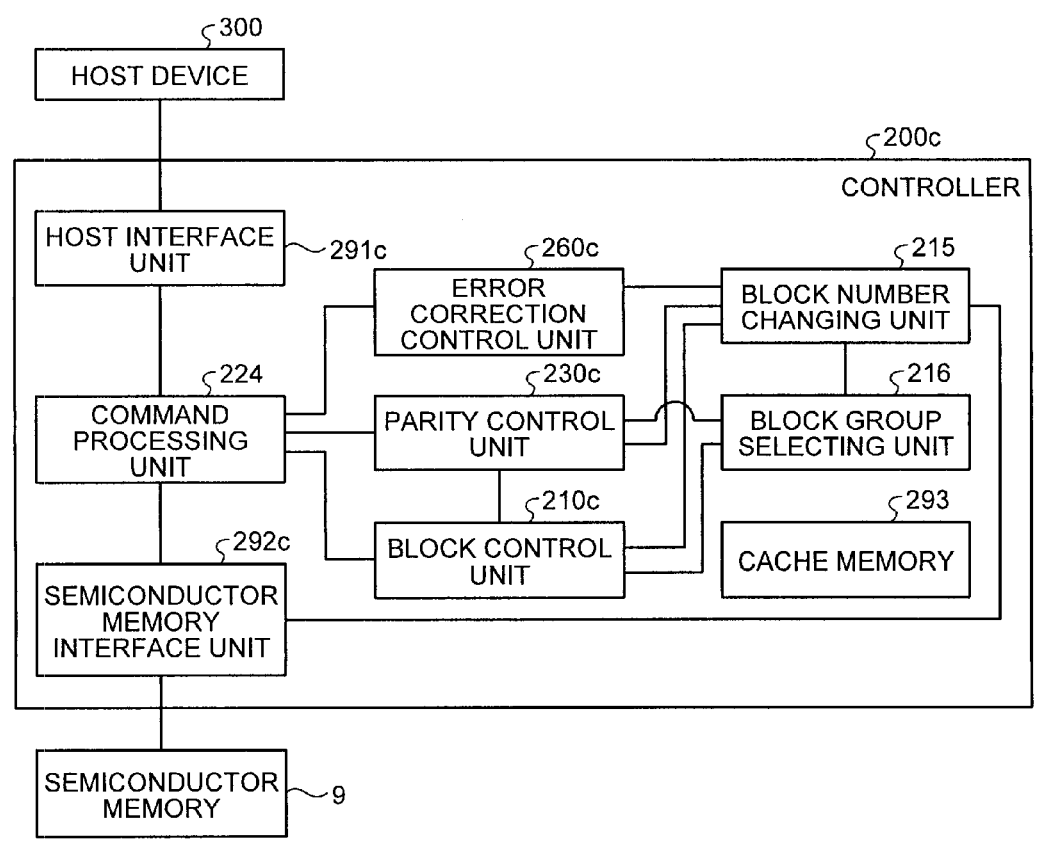
FIG. 19 is a diagram illustrating an example of the functional configuration of a controller 200c that is included in the semiconductor storage 1.

FIG. 19 illustrates an example of the functional configuration of a controller 200c that is included in the semiconductor storage 1 according to this embodiment. In the controller 200c of FIG. 19, individual units that have the same functions and effects as those of the controller 200a of FIG. 3 will be denoted by the same reference numerals as those of FIG. 3, and the description thereof will not be repeated here.

The controller 200c of FIG. 19 includes a block number changing unit 215, a block group selecting unit 216, an error correction control unit 260c, a parity control unit 230c, a block control unit 210c, a command processing unit 224, the cache memory 293, a host interface unit 291c, and a semiconductor memory interface unit 292c. Although not illustrated in FIG. 19, the dynamic updating unit 299 may be provided.

Among the individual units illustrated in FIG. 19, the error correction control unit 260c, the parity control unit 230c, the block control unit 210c, the host interface unit 291c, and the semiconductor memory interface unit 292c cooperate with the command processing unit 224, the block number changing unit 215, or the block group selecting unit 216 and execute the process. Except for this point, since the contents of the cooperation process are the same as those of FIG. 3, the description thereof will not be repeated here.

The command processing unit 224 receives a command, such as a write request or a read request, from the host device 300 through the host interface unit 291c, and cooperates with the block control unit 210c, the parity control unit 230c, and the error correction control unit 260c and executes a predetermined process, accompanied by an updating process of mapping corresponding to an association between the address area and the block number or an updating process of the parity group according to the necessity.

In this embodiment, by a method for increasing or decreasing the number of data blocks constructing the parity group or a method for changing the parity generating method, the number of parity allocation blocks in the entire semiconductor storage can be increased or decreased. At this time, timing when the parity group is constructed or deconstructed does not need to be considered.

That is, the command processing unit 224 may have the functions of the write processing unit 220, the read processing unit 221, the other command processing unit 223, the restoration possibility/impossibility determining unit 250, the parity generation patrol unit 240, the read patrol unit 241, and the arrangement sequence information managing unit 270, all included in the controller 200a of FIG. 3, and deconstruct the parity group in the write process and construct (generate) the parity group in the parity generation patrol process, as in the second embodiment. The command processing unit 224 may adopt the configuration where, in the write process, the requested data write and the update of the parity data are performed and information of the parity group is updated and the configuration where the parity generation patrol process in the second embodiment is not used. The block number changing unit 215 and the block group selecting unit 216 may be added to the configuration of the other embodiments to be described below.

When the needed redundancy degree changes, the block number changing unit 215 executes a block number changing process. However, the present invention is not limited to the case where the needed redundancy degree changes. For example, the block number changing unit 215 may regularly execute the block number changing process or execute the block number changing process when a process load of the controller 200c is less than a predetermined threshold value. Also, the block number changing process may be executed at previously determined or dynamically determined timing.

Specifically, the block number changing unit 215 inquires the block group selecting unit 216 about numbers of blocks where data becoming a base of generation of the parity is recorded and a parity generating method to construct a new parity group where a block number is changed. If the block number changing unit 215 receives the plural block numbers and the parity generating method as the inquiry result, the block number changing unit 215 sequentially inquires the parity control unit 230c about whether the blocks construct the parity group. When the blocks construct the parity group, the block number changing unit 215 deconstructs the parity group. Specifically, the block number changing unit 215 requests the block control unit 210c to change states of all of the parity blocks constructing the parity group to non-allocation states. As a result, the block number changing unit 215 collects all of the parity blocks constructing the parity group as the non-allocation blocks. The block number changing unit 215 requests the parity control unit 230c to release the registration of the parity group.

The block number changing unit 215 requests the parity control unit 230c to generate parity data from the data recorded in the block according to the parity generating method. If the block number changing unit 215 receives the parity data as the request result, the block number changing unit 215 requests the error correction control unit 260c to generate error detection information and error correction information of the parity data. If the block number changing unit 215 receives the error detection information and the error correction information as the request result, the block number changing unit 215 requests the block control unit 210c to extract the non-allocation block. If the block number changing unit 215 receives a block number of a write destination block from the block control unit 210c, the block number changing unit 215 erases data of the block corresponding to the block number of the semiconductor memory array 9 through the semiconductor memory interface unit 292c, and writes the write requested data, the error detection information, and the error correction information. The block number changing unit 215 may record the error detection information or the error correction information in a predetermined block that is different from the data written block or record the error detection information or the error correction information in a storage area other than the semiconductor memory. In this case, when information of a data erase count or a data erase period of time of the block is used during the equalizing process, the block number changing unit 215 requests the block control unit 210c to update equalization information of the corresponding block at timing when the data is erased.

The block number changing unit 215 requests the block control unit 210c to change the state of the data written block to a parity allocation state. The block number changing unit 215 requests the parity control unit 230c to register a parity group including the block number received from the block group selecting unit 216 and the parity generating method, and the information of the number of the block whose state is changed to the parity allocation state.

When there is a parity group to which the block, which is determined as the block number change target by the block group selecting unit 216 and in which data becoming a base of the generation of the parity is recorded, belongs, the block number changing unit 215 may delay the process of deconstructing the parity group, monitor the parity group, executes the delayed process of deconstructing the parity group at timing when the block that belongs to the parity group monitored by the write process is updated and the parity of the parity group needs to be updated, and execute a block number changing process. In this way, a generation count of the parity group can be reduced by at least one. Thereby, since an erase count or a write count of the block can be reduced, the process speed can be improved and the lifespan of the semiconductor storage can be suppressed from being shortened.

The information of the acquisition targets that the block number changing unit 215 sequentially inquires may be collectively acquired by associating the sequence information and the information of the acquisition targets, and the receiving side may execute the process using the associated sequence information and acquisition target information.

The block group selecting unit 216 receives the inquiry of the numbers of blocks where data becoming a base of generation of the parity is recorded and the parity generating method to construct the new parity group where the block number is changed, from the block number changing unit 215. The block group selecting unit 216 selects the parity group or the blocks that do not construct the parity group, to construct the new parity group, based on the predetermined method, such as sequentially inquiring the parity control unit 230c or the block control unit 210c. As methods that construct a new parity group where the block number is changed from the selected parity group, for example, the following three methods exist.

(B1) One parity group is divided into plural parity groups.

(B2) Plural parity groups are integrated as one parity group.

(B3) Plural parity groups are generated from plural parity groups, such that the block number is different from the block number of the original parity group.

The blocks that do not construct the parity group may be combined as the blocks where the data becoming the base of the generation of the parity is recorded, with the three methods. The blocks, which construct the parity group and in which the data becoming the base of the generation of the parity is recorded may be the same and use the different parity generating methods, and the number of blocks where the parity data is recorded may be changed. The blocks where the data becoming the base of the generation of the parity is recorded may not be the same and be used in combination with the three methods, or the blocks that do not construct the parity group may be combined.

The methods that construct the new parity group where the block number is changed are not limited to the above methods, and other appropriate methods may be adopted.

The block group selecting unit 216 transmits the selection result to the block number changing unit 215.

The information of the acquisition targets that the block group selecting unit 216 sequentially inquires may be collectively acquired by associating the sequence information and the information of the acquisition targets, and the receiving side may execute the process using the associated sequence information and acquisition target information.

(Block Number Changing Process)

Figure 20:
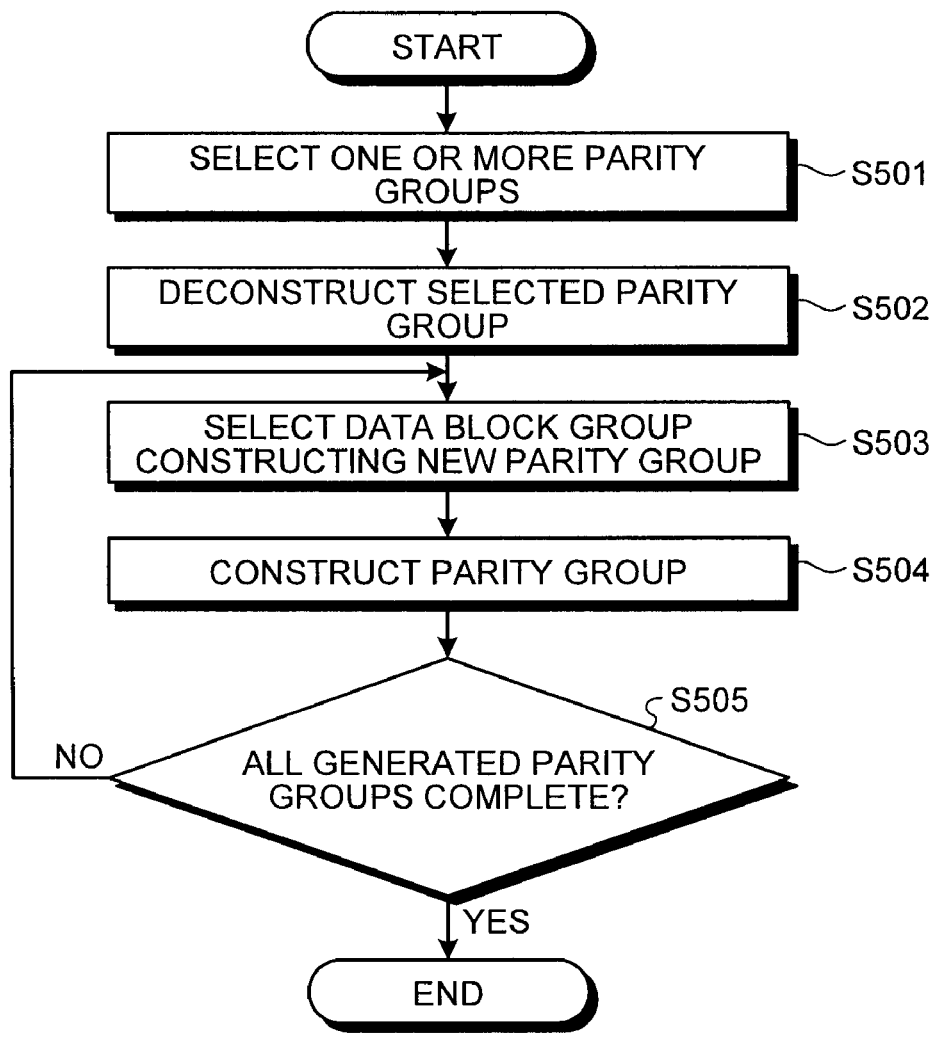
FIG. 20 is a flowchart illustrating a process of changing a block number.

FIG. 20 illustrates a flowchart of a process of changing a block number. The process of FIG. 20 is executed by the block number changing unit 215 and the block group selecting unit 216.

In step S501 of FIG. 20, the block group selecting unit 216 selects one or more parity groups that become block number change targets. The block group selecting unit 216 may select the blocks that do not construct the parity group as the blocks where the data becoming the base of the generation of the parity is recorded.

In step S502, the block number changing unit 215 executes a deconstructing process on the selected parity group. Specifically, first, the block number changing unit 215 cooperates with the parity control unit 230c and executes a registration releasing process on the selected parity group. Next, the block number changing unit 215 cooperates with the block control unit 210c and sets a state of the parity allocation block, which constructs the registration released parity group, to the non-allocation state. As a result, the block number changing unit 215 collects the block as the non-allocation block.

When the block that does not construct the parity group is selected as the block where the data becoming the base of the generation of the parity is recorded to construct a new parity group where the block number is changed, the registration releasing process of the parity group does not need to be executed.

The processes of steps S503 and S504 are repeated by the number of generated parity groups, as per step S505. In step S503, the block group selecting unit 216 selects a data block group (block where the data becoming the base of the generation of the parity is recorded) that constructs a new parity group, among the data block groups obtained when the parity group is deconstructed in step S502.

The number of data block groups may be changed, the number of parity allocation blocks needed as a result may not be changed, the parity generation method may be changed, and the number of needed parity block groups may be changed. For example, the parity generating method where two parity allocation blocks are needed may be changed to the parity generating method where one parity allocation block is needed.

When the above cases are combined and the parity group is constructed, each parity group may be constructed to have a different block number. For example, the parity groups where the numbers of data block groups are 5, 4, and 3 may be mixed and the parity groups may be constructed. Also, the above cases may be combined, the different parity generating methods may be adopted, the parity groups where the numbers of needed parity block groups are 2 and 1 may be mixed, and the parity groups may be constructed.

The methods that construct the new parity group where the block number is changed are not limited to the above methods, and other appropriate methods may be adopted.

In step S504, the parity group is constructed from the data block group selected in step S503 according to the selected parity generating method. Specifically, first, the parity control unit 230c generates parity data from the selected block group. Next, the error correction control unit 260c generates error detection information and error correction information from the generated parity data. Thereby, the error correction control unit 260c prepares the write contents in the parity allocation block.

Next, the block control unit 210c executes an extracting process on the non-allocation block and secures the non-allocation block. The block number changing unit 215 executes an erasing process on the non-allocation block that is secured through the semiconductor memory interface unit 292c and writes the prepared write contents. In this case, the error detection information or the error correction information and the data are recorded in the data written block. However, the error detection information or the error correction information may be recorded in a predetermined block that is different from the data written block or recorded in a storage area other than the semiconductor memory.

Since the block number changing unit 215 executes an updating process on the non-allocation block, the block control unit 210c updates equalization information of the non-allocation block. Next, the block control unit 210c changes the state of the non-allocation block to the parity allocation state.

Next, the parity control unit 230c executes a parity group registering process to register the selected block group and the parity allocation block as a new parity group.

The block number is changed to be different for each parity group. If the above process is continued, the number of blocks that constructs the parity group becomes a so-called local optimal value and may not become a whole optimal value. For example, a situation in which the parity group where the number of data block groups is large and the parity group where the number of data block groups is small alternately exist in the arrangement sequence may be generated. Similarly, a situation in which the parity group where the number of parity block groups is large and the parity group where the number of parity block groups is small alternately exist in the arrangement sequence may be generated.

For this reason, the block number changing process with respect to the entire semiconductor storage may be executed independently from the above process, such that the number of data block groups constructing the parity group or the number of parity block groups becomes an optimal value in the entire semiconductor storage.

(First Parity Generating Process)

The construction of the parity group may be performed at the time of an initializing process of the semiconductor storage 1.

The receiver 29 according to the first embodiment corresponds to portions of the host interface unit 291c and the command processing unit 224 according to the fourth embodiment. The first storage unit 28a according to the first embodiment corresponds to a portion of the block control unit 210c according to the fourth embodiment. The second storage unit 28b according to the first embodiment corresponds to a portion of the parity control unit 230c according to the fourth embodiment. The first writing unit 22a according to the first embodiment corresponds to a portion of the command processing unit 224, portions of the semiconductor memory interface unit 292c and the block control unit 210c, and a portion of the parity control unit 230c according to the fourth embodiment. The second writing unit 22b according to the first embodiment corresponds to a portion of the command processing unit 224, a portion of the block number changing unit 215, a portion of the block group selecting unit 216, a portion of the parity control unit 230c, and portions of the semiconductor memory interface unit 292c and the block control unit 210c according to the fourth embodiment.

Fifth Embodiment

In the fifth embodiment, when data is written, a state of a block where old data of update target is recorded is not immediately set to an invalid state. Thereby, an update count of parity can be suppressed and processing performance can be suppressed from being deteriorated due to the parity update.

In addition, the lifespan of the semiconductor storage can be suppressed from being shortened, by reducing a block erasing/write process accompanied by the parity update.

In this embodiment, each block that is included in the semiconductor memory array 9 is associated with information of a block state indicating any one of at least the following four states.

(C1) A block number is set to an address table 11 (hereinafter, this state is called an "address allocation state").

(C2) The block number is not set to the address table 11, but and the address table 11 holds data that is held when the block is in an immediately previous address allocation state (hereinafter, this state is called an "pre-update allocation state".

(C3) The block is used as a block that holds redundancy information, that is, parity data (hereinafter, this state is called a "parity allocation state").

(C4) The block is not in states of (C1) to (C3) but in a non-used state (hereinafter, this state is called a "non-allocation state").

The "block in the address allocation state" is called an "address allocation block", the "block in the pre-update allocation state" is called an "pre-update allocation block", the "block in the parity allocation state" is called a "parity allocation block", and the "block in the non-allocation state" is called a "non-allocation block". Among the "address allocation blocks", a state before a write process of the block that becomes the "non-allocation block" or the "pre-update allocation block" by the write process is also called a "pre-update block".

[Block Diagram of a Controller]

Figure 21:
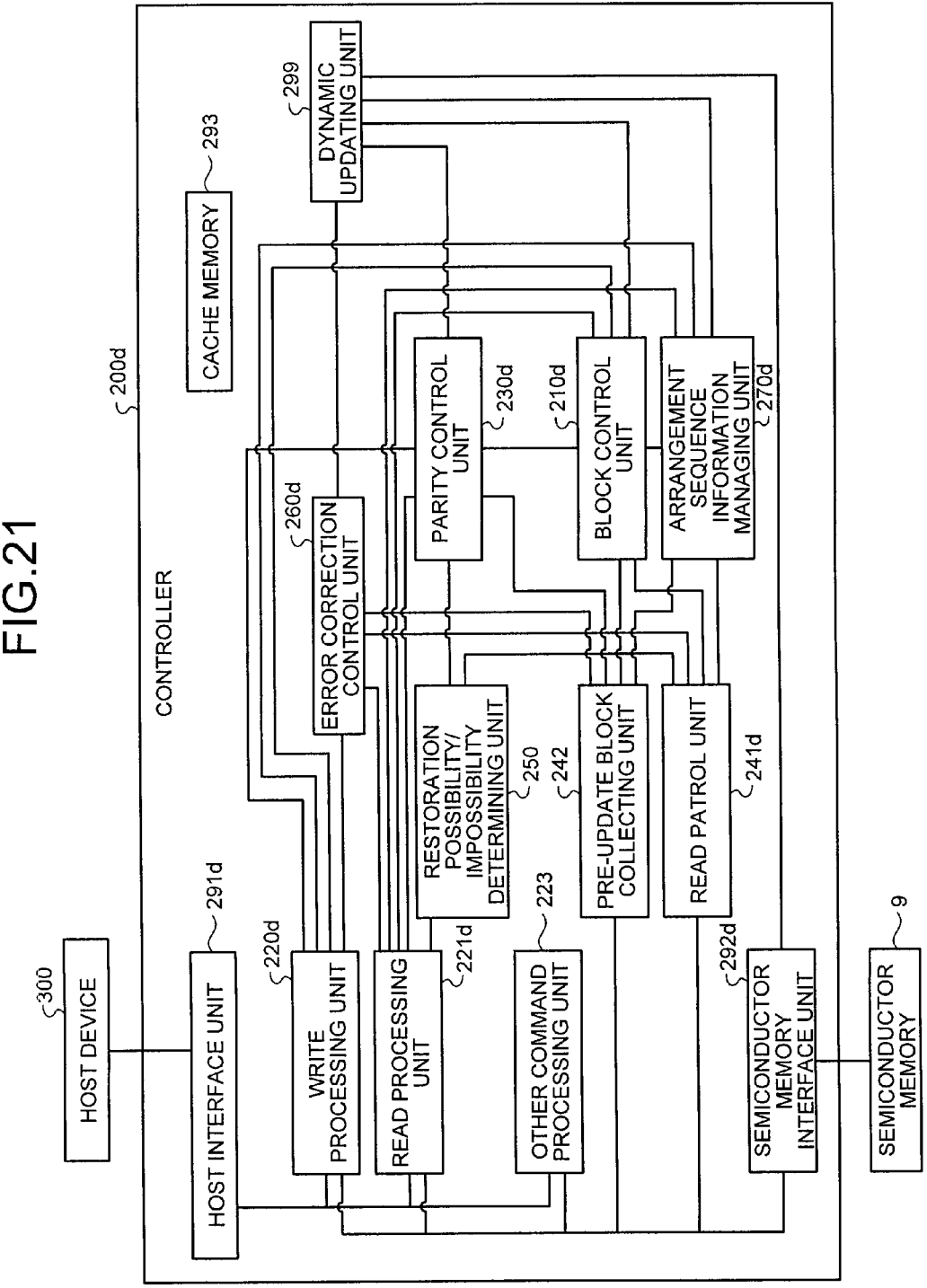
FIG. 21 is a diagram illustrating an example of the functional configuration of a controller 200d that is included in the semiconductor storage 1.

FIG. 21 illustrates an example of the functional configuration of a controller 200d that is included in the semiconductor storage 1 according to this embodiment. The controller 200d of the semiconductor storage according to this embodiment has the same function and effect as that of the controller 200a according to the second embodiment. The controller 200d includes individual units that have functions and effects different from those of the controller 200a.

The controller 200d includes a write processing unit 220d, a read processing unit 221, an other command processing unit 223, an error correction control unit 260d, a parity control unit 230d, a restoration possibility/impossibility determining unit 250, a pre-update block collecting unit 242, a read patrol unit 241d, a block control unit 210d, an arrangement sequence information managing unit 270d, the cache memory 293, a host interface unit 291d, and a semiconductor memory interface unit 292d. The controller 200d may include the dynamic updating unit 299 illustrated in FIG. 18.

In FIG. 21, the individual units that have the same functions and effects as those of the controller 200a of FIG. 3 will be denoted by the same reference numerals and the description thereof will not be repeated here.

Among individual units, the host interface unit 291d, the semiconductor memory interface unit 292d, and the error correction control unit 260d cooperate with the write processing unit 220d or the pre-update block collecting unit 242 and execute the process. Except for this point, since the contents of the cooperation process are the same as those of FIG. 3, the description thereof will not be repeated here.

In regards to the block control unit 210d, the pre-update allocation state is included in addition to the address allocation state, the parity allocation state, and the non-allocation state as the block states, and the block control unit 210d cooperates with the arrangement sequence information managing unit 270d and execute the process. Except for this point, since the contents of the cooperation process are the same as those of FIG. 3, the description thereof will not be repeated here.

In regards to the parity control unit 230d, the blocks that become the data blocks include the pre-update allocation block in addition to the address allocation block. Since only this point is different, the detailed description thereof will not be repeated here.

In regards to the read patrol unit 241d, in the blocks that become the read targets and are not in the non-allocation state, the pre-update allocation block is included in addition to the address allocation block or the parity allocation block. Since only this point is different, the detailed description thereof will not be repeated here.

The write processing unit 220d writes data in a block, based on a write request. The write processing unit 220d does not immediately collect a block, which newly becomes a pre-update block, as a non-allocation block, at the time of a write process. Specifically, the write processing unit 220d receives the write request from the host device 300 through the host interface unit 291d.

The write processing unit 220d requests the error detection information generating unit 62 of the error correction control unit 260d to generate error detection information from the data to be written, and receives the error detection information that is generated by the error detection information generating unit 62 of the error correction control unit 260d, according to the request. The write processing unit 220d requests the error correction information generating unit 64 of the error correction control unit 260d to generate the error correction information from the data to be written, and receives the error correction information that is generated by the error correction information generating unit 64 of the error correction control unit 260d according to the request.

The write processing unit 220d inquires the block control unit 210d about a block becoming a write destination (that is, requests to extract a non-allocation block).

If the write processing unit 220d receives a block number of a write destination block from the block control unit 210d, the write processing unit 220d erases data of a block corresponding to the block number of the semiconductor memory array 9 through the semiconductor memory interface unit 292d, and writes the write requested data, the error detection information, and the error correction information. At this time, the write processing unit 220d may record the error detection information or the error correction information in a predetermined block that is different from the data written block or record the error detection information or the error correction information in a storage area other than the semiconductor memory.

In this case, when information of a data erase count or a data erase period of time of the block is used during the equalizing process, the write processing unit 220d requests the block control unit 210d to update equalization information of the corresponding block at timing when the data is erased.

The write processing unit 220d changes the mapping of the address area included in the write request to the block into which the write requested data by the above process is written. Specifically, the write processing unit 220d inquires the block control unit 210d about a number of the block (pre-update block) associated with the address area included in the write request, and requests the block control unit 210d to erase the number of the pre-update block. The write processing unit 220d requests the block control unit 210d to associate the number of the block into which the write requested data by the above process is written with the address area included in the write request.

The write processing unit 220d requests the block control unit 210d to change a state of the pre-update block to a pre-update allocation state and a state of a non-allocation block into which data is newly written to an address allocation state, to update the states of the blocks.

When the address table 11 is updated, the write processing unit 220d transmits an update notification of the address area corresponding to a notification, which requests to update the updated address area in the address area information table, to the arrangement sequence information managing unit 270d, and transmits a notification of a number of a block, which has become the pre-update allocation block, to the arrangement sequence information managing unit 270d. Examples of information that is included in the update notification include information indicating that each address area is updated and information of a period of time when each address area is updated. If the information is transmitted to the arrangement sequence information managing unit 270d, the arrangement sequence information managing unit 270d reflects the information on an update count of each address area or an updated sequence, which is needed as the managed information.

The write processing unit 220d inquires the parity control unit 230d about whether the block (pre-update allocation block) whose state becomes the pre-update allocation state constructs a parity group. When the write processing unit 220d receives a reply indicating that the pre-update allocation block does not belong to the parity group from the parity control unit 230d, the write processing unit 220d requests the block control unit 210d to change the state of the pre-update allocation block to a non-allocation state. As a result, the write processing unit 220d collects the pre-update allocation update as a non-allocation block.

When the write processing unit 220d receives a reply indicating that the pre-update allocation block belongs to the parity group from the parity control unit 230d, the write processing unit 220d inquires the parity control unit 230d about a block number of the data block group of the parity group. The write processing unit 220d inquires the block control unit 210d about whether the block is the pre-update allocation block. When all of the data block groups are composed of the pre-update allocation blocks, the write processing unit 220d requests the block control unit 210d to change the states of all of the blocks constructing the parity group to the non-allocation states, and requests the parity control unit 230d to release the registration of the parity group. As a result, the write processing unit 220d collects all of the blocks constructing the parity group as the non-allocation blocks.

The write processing unit 220d sequentially inquires the block control unit 210d and collects the blocks that do not construct the parity group, among the address allocation blocks. When the number of collected blocks reaches a predetermined number, the write processing unit 220d requests the parity generating unit 31 of the parity control unit 230d to generate parity data from the data recorded in the collected blocks. When the write processing unit 220d receives the generated parity data from the parity generating unit 31 of the parity control unit 230d, the write processing unit 220d requests the error detection information generating unit 62 of the error correction control unit 260d to generate error detection information from the parity data, and receives the error detection information that is generated by the error detection information generating unit 62 of the error correction control unit 260d according to the request. The write processing unit 220d requests the error correction information generating unit 64 of the error correction control unit 260d to generate the error correction information from the parity data, and receives the error correction information that is generated by the error correction information generating unit 64 of the error correction control unit 260d according to the request.

The write processing unit 220d inquires the block control unit 210d about a block becoming a write destination (that is, requests to extract a non-allocation block).

If the write processing unit 220d receives a block number of a write destination block from the block control unit 210d, the write processing unit 220d erases data of a block corresponding to the block number of the semiconductor memory array 9 through the semiconductor memory interface unit 292d, and writes the parity data, the error detection information, and the error correction information. At this time, the write processing unit 220d may record the error detection information or the error correction information in a predetermined block that is different from the data written block or record the error detection information or the error correction information in a storage area other than the semiconductor memory.

In this case, when information of a data erase count or a data erase period of time of the block is used during the equalizing process, the write processing unit 220d requests the block control unit 210d to update equalization information of the corresponding block at timing when the data is erased.

The write processing unit 220d transmits an update request, which requests to update the state of the data written block to the parity allocation state, to the block control unit 210d.

The write processing unit 220d requests the parity control unit 230d to register the parity group composed of the collected block and the data written block.

The information of the acquisition targets that the write processing unit 220d sequentially inquires may be collectively acquired by associating the sequence information and the information of the acquisition targets, and the receiving side may execute the process using the associated sequence information and acquisition target information.

By this configuration, when the write process is executed, the write processing unit 220d does not collect a block that newly becomes the pre-update block as the non-allocation block, and does not deconstruct the parity group, thereby realizing the fault tolerance with respect to the data held by the address allocation block belonging to the parity group. In this case, the "collection" or the "collect the block as the non-allocation block" means that information of the block state of the block of the different state is "changed to the non-allocation state".

When the pre-update allocation blocks collected by the predetermined number, the pre-update block collecting unit 242 changes the states of the pre-update allocation blocks to the non-allocation states.

The pre-update block collecting unit 242 may collect the pre-update allocation blocks at a predetermined time interval. When the number of pre-update allocation blocks or non-allocation blocks becomes the predetermined number or a ratio thereof becomes a predetermined ratio, the pre-update block collecting unit 242 may collect the pre-update allocation blocks. The process may be executed when a process load of the controller 200d is less than a predetermined threshold value. Also, the process may be executed at previously determined or dynamically determined timing.

Specifically, the pre-update block collecting unit 242 sequentially transmits an address area reference request or a block number reference requests to the arrangement sequence information managing unit 270d, according to arrangement sequence information. The pre-update block collecting unit 242 receives information of the address area or the block number according to the request, from the arrangement sequence information managing unit 270d. When the pre-update block collecting unit 242 receives the information of the address area in the received sequence, the pre-update block collecting unit 242 inquires the block control unit 210d about the block number corresponding to the address area, and receives the block number from the block control unit 210d.

The pre-update block collecting unit 242 inquires the parity control unit 230d about information of the parity group that the block corresponding to the received block number constructs, in the sequence in which the block number is received from the arrangement sequence information managing unit 270d or the block control unit 210d.

The pre-update block collecting unit 242 deconstructs the parity group that is received from the parity control unit 230d and collects the pre-update allocation block and the parity allocation block as the non-allocation block. Specifically, the pre-update block collecting unit 242 requests the parity control unit 230d to release the registration of the parity group. The pre-update block collecting unit 242 requests the block control unit 210d to set the states of the pre-update allocation block constructing the parity group and the parity allocation block to the non-allocation states. As a result, the pre-update block collecting unit 242 collects the pre-update allocation block and the parity allocation block as the non-allocation blocks.

The pre-update block collecting unit 242 collects the address allocation block, which constructs the parity group, as the parity generation target.

If the pre-update block collecting unit 242 collects the parity generation target blocks by the predetermined number, the pre-update block collecting unit 242 requests the parity generating unit 31 of the parity control unit 230d to generate parity data based on the data recorded in the blocks of the predetermined number, and receives the parity data that is generated by the parity generating unit 31 of the parity control unit 230d. The pre-update block collecting unit 242 requests the error detection information generating unit 62 of the error correction control unit 260d to generate error detection information from the parity data, and receives the error detection information that is generated by the error detection information generating unit 62 of the error correction control unit 260d. The pre-update block collecting unit 242 requests the error correction information generating unit 64 of the error correction control unit 260d to generate the error correction information from the parity data, and receives the error correction information that is generated by the error correction information generating unit 64 of the error correction control unit 260d.

The pre-update block collecting unit 242 requests the block control unit 210d to extract a non-allocation block, and receives a block number from the block control unit 210d. The pre-update block collecting unit 242 erases data of a block of the semiconductor memory array 9 corresponding to the received block number, through the semiconductor memory interface unit 292d. The pre-update block collecting unit 242 writes the parity data generated by the parity generating unit 31 of the parity control unit 230d, the error detection information generated by the error detection information generating unit 62 of the error correction control unit 260d from the parity data, and the error correction information generated by the error correction information generating unit 64 of the error correction control unit 260d from the parity data in the block corresponding to the received block number, through the semiconductor memory array interface unit 292d. The pre-update block collecting unit 242 may record the error detection information or the error correction information in a predetermined block that is different from the data written block or record the error detection information or the error correction information in a storage area other than the semiconductor memory.

The pre-update block collecting unit 242 requests the block control unit 210d to update equalization information of the erased block. The pre-update block collecting unit 242 transmits an update request, which requests to update a state of the parity data written block to a parity allocation state, to the block control unit 210d.

The pre-update block collecting unit 242 requests the parity control unit 230d to register the parity group composed of the collected blocks and the data written block.

The information of the acquisition targets that pre-update block collecting unit 242 sequentially inquires may be collectively acquired by associating the sequence information and the information of the acquisition targets, and the receiving side may execute the process using the associated sequence information and acquisition target information.

Figure 4B:
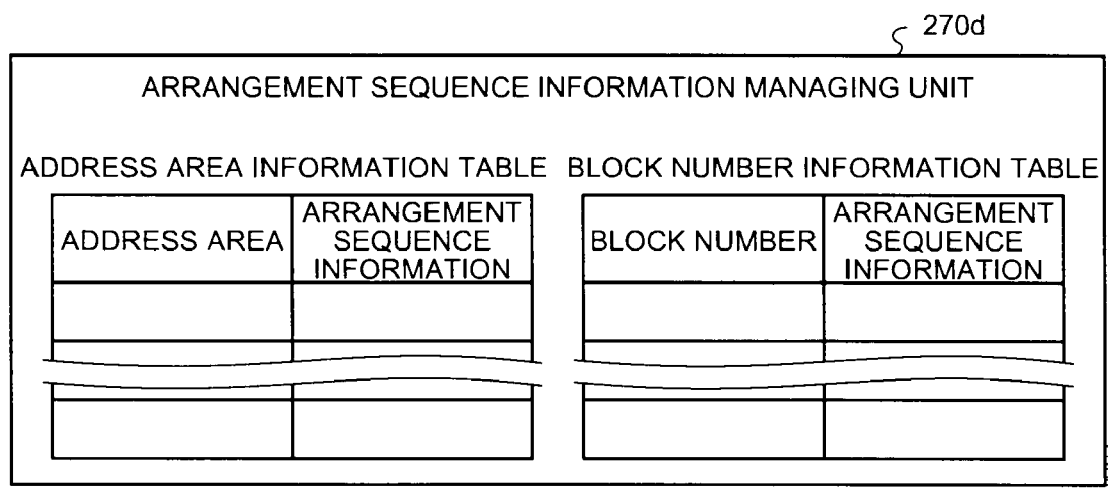
FIG. 4B is a diagram illustrating an example of the configuration of an arrangement sequence information managing unit 270d.

The arrangement sequence information managing unit 270d according to this embodiment is configured to have an address area information table and a block number information table, as illustrated in FIG. 4B. In the address area information table and the block number information table, since the address area information table has the same configuration as the configuration illustrated in FIG. 4A, the detailed description will not be repeated here.

The block number information table manages the arrangement sequence information that cannot be managed by only the address area information table. This is because that pre-update allocation block is used in this embodiment. Specifically, in this embodiment, in the write process, the state of the address allocation block that is mapped to an arbitrary address area before the write request is received is changed to the state of the pre-update allocation block, a block into which data is newly written is mapped to the address area again, and the mapping of the address area is changed. However, in this mapping changing process, the arrangement sequence information with respect to the newly mapped block can be acquired from the address area information table, but the arrangement sequence information with respect to the block whose state is changed to the state of the pre-update allocation block may not be acquired from the address area information table. In order to cause the arrangement sequence information with respect to the block whose state is changed to the state of the pre-update allocation block to be obtained, the arrangement sequence information managing unit 270d uses the block number information table to execute the following process.

When the arrangement sequence information managing unit 270d receives an update notification of the address area from the write processing unit 220d, the arrangement sequence information managing unit 270d receives a notification of a number of the block whose state is changed to the state of the pre-update allocation block. The arrangement sequence information managing unit 270d executes the same update process as the updating process of the address area information table of the arrangement sequence information managing unit 270 according to the second embodiment, and associates the arrangement sequence information associated and recorded before update notification of the address area is received with the received block number in the block number information table and records (that is, copies the information)

the arrangement sequence information in the address area of the address area information table. Thereby, the arrangement sequence information of the pre-update allocation block can be taken over from the address area information table.

If the arrangement sequence information managing unit 270d receives a reference request of the arrangement sequence information from the pre-update block collecting unit 242, the arrangement sequence information managing unit 270d inquires the block control unit 210d about the number of the block in the pre-update allocation state, among all of the blocks. The arrangement sequence information managing unit 270d extracts the arrangement sequence information corresponding to the received block number from the block number information table. The arrangement sequence information managing unit 270d integrates the extracted arrangement sequence information and arrangement sequence information recorded in the address area table and transmits the integrated information to the pre-update block collecting unit 242.

(Write Process)

Figure 22:
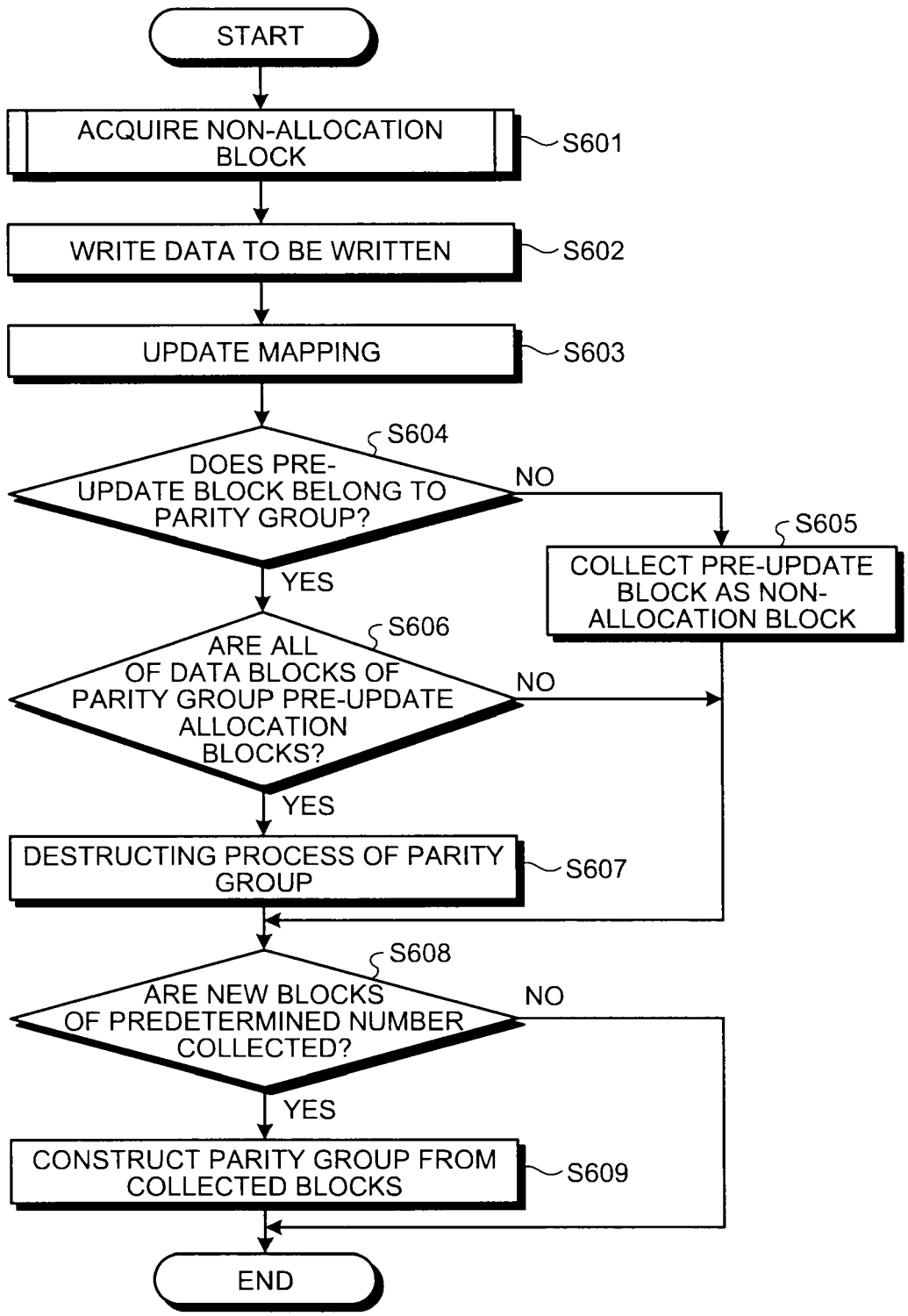
FIG. 22 is a flowchart illustrating a write process according to a fifth embodiment.
Figures 24A, 24B, 24C, 24D:
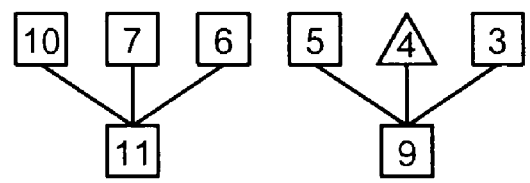
FIGS. 24A to 24D are diagrams illustrating a state of each table during the write process according to the fifth embodiment.

FIG. 22 illustrates a flowchart of the write process. The write process of FIG. 22 is different from the write process of FIG. 8 in that a parity group is deconstructed when all of blocks belonging to one parity group are not address allocation blocks.

In step S601 of FIG. 22, the block control unit 210d receives a write request and acquires the non-allocation block. Specifically, first, the error correction control unit 260d generates error detection information and error correction information from write request data and prepares write contents in the block. Next, the block control unit 210d executes an extracting process on the non-allocation block and secures the non-allocation block.

In step S602, the write processing unit 220d executes an erasing process of the secured non-allocation block and writes the prepared write contents. In this case, the write processing unit 220d records the error detection information and the error correction information in a data written block. However, the write processing unit 220d may record the error detection information or the error correction information in a predetermined block that is different from the data written block or record the error detection information or the error correction information in a storage area other than the semiconductor memory array 9.

The block control unit 210d updates equalization information of the non-allocation block according to the execution of the updating process of the non-allocation block.

In step S603, mapping of the non-allocation block where the updated information is recorded and the pre-update block is updated. Specifically, the block control unit 210d acquires a block number of the address allocation block that corresponds to the address area where the write request address is included, based on the address table 11 managed by the block control unit 210d. The block control unit 210d erases the number of the pre-update block from the address area of the address table 11, and sets a number of the non-allocation block. Thereby, the update of the address table is completed.

Next, the block control unit 210d sets a state of the pre-update block to a pre-update allocation state and sets a state of the non-allocation block to an address allocation state. Thereby, setting of the block state is completed. The arrangement sequence information managing unit 270d updates arrangement sequence information, based on the updated address table 11.

In step S604, the parity control unit 230d determines whether the pre-update block belongs to a parity group. When it is determined that the pre-update block does not belong to the parity group, the process proceeds to step S605, and when it is determined that the pre-update block belongs to any parity group, the process proceeds to step S606.

This determination may be made as follows. The parity control unit 230d searches the parity group to which the pre-update block belongs and determines whether there is the parity group, based on a return value.

In step S605, the block control unit 210d collects the pre-update block as the non-allocation block. The collecting process is realized by changing the state of the pre-update block to the non-allocation state.

When any block is updated and the pre-update block does not belong to the parity group, the parity configuration does not need to be maintained, and the data of the address area is stored in the updated address allocation block. Accordingly, since the data does not need to be held as the pre-update allocation block, the block is collected as the non-allocation block in step S605.

In step S606, the write processing unit 220d, the parity control unit 230d, and the block control unit 210d cooperate with each other and determine whether all of data blocks of a parity group to which the pre-update block belongs become the pre-update allocation blocks. When it is determined that all of the data blocks become the pre-update allocation blocks, the process proceeds to step S607, and when it is determined that all of the data blocks do not become the pre-update allocation blocks, the process proceeds to step S608.

This determination is made as follows. The parity control unit 230d extracts the data block group from the parity correspondence list 39 with respect to the parity group obtained in step S604, and investigates a state of each block from the block table 12 managed by the block control unit 210d.

In step S607, the parity control unit 230d executes a destructing process on the parity group determined in step S606. Specifically, the block control unit 210d changes states of all of the blocks constructing the parity group to non-allocation states. The parity control unit 230d releases the registration of the parity group.

When all of the data block groups of the parity group are the pre-update allocation blocks, the parity group does not need to be held. Accordingly, if the destructing process is executed on the parity group, all of the blocks constructing the parity group can be collected as the non-allocation blocks. Since the destructing process of the parity group is not accompanied by the parity data generating and writing processes, a processing cost is low, as compared with a pre-update block collecting process to be described in detail below.

In step S608, the parity control unit 230d determines whether blocks, which newly become the address allocation blocks, are collected by the predetermined number. When it is determined that the blocks of the predetermined number are collected, the process proceeds to step S609, and when the blocks of the predetermined number are not collected, the process ends.

This determination may be made as follows. The block control unit 210d extracts the address allocation block from all of the blocks registered in the block table 12 managed by the block control unit 210d, the parity control unit 230d extracts the block that does not belong to the parity group, based on the parity correspondence list 39 managed by the parity control unit 230d, and the number of extracted blocks is counted.

In step S602, the non-allocation block into which the data is written becomes the address allocation block in step S603. Since the address allocation block does not belong to the parity group, the address allocation block may be managed in the parity correspondence list 39 or the other list (not illustrated). If the address allocation block is managed in the above manner, the process that extracts the block not belonging to the parity group can be simplified.

In step S609, the parity control unit 230*d* constructs the parity group from the collected blocks. Specifically, first, the parity generating unit 31 of the parity control unit 230*d* generates parity data from the data recorded in the collected blocks. Next, the error correction control unit 260*d* generates error detection information and error correction information from the generated parity data. Thereby, the error correction control unit 260*d* prepares the write contents in the parity allocation block.

Next, the block control unit 210*d* executes an extracting process of the non-allocation block and secures the non-allocation block. The write processing unit 220*d* executes an erasing process on the secured non-allocation block and writes the prepared write contents. In this case, the write processing unit 220*d* records the error detection information and the error correction information and the data in the data written block. However, the write processing unit 220*d* may record the error detection information or the error correction information in a predetermined block that is different from the data written block or record the error detection information or the error correction information in a storage area other than the semiconductor memory array 9.

The block control unit 210*d* updates equalization information of the non-allocation block according to the execution of the updating process of the non-allocation block. The block control unit 210*d* changes the state of the non-allocation block to the parity allocation state.

Next, the parity control unit 230*d* executes a parity group registering process to register the collected block and the parity allocation block as a new parity group.

(Example of the Write Process)

Figures 25A, 25B, 25C, 25D:
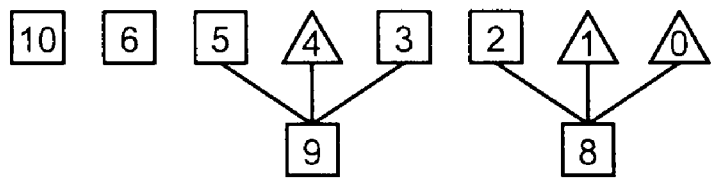
FIGS. 25A to 25D are diagrams illustrating a state of each table after the write process according to the fifth embodiment.

FIGS. 23A to 25D illustrate examples of the write process that is realized by this embodiment. In FIGS. 23A to 25D, FIGS. 23A, 24A, and 25A illustrate the address table 11, FIGS. 23B, 24B, and 25B illustrate the block table 12, FIGS. 23C, 24C, and 25C illustrate the parity correspondence list 39, and FIGS. 23D, 24D, and 25D schematically illustrate the states corresponding to the FIGS. 23A, 23B, 23C, 24A, 24B, 24C, 25A, 25B, and 25C. In this case, only minimally required information is described.

In FIGS. 23A to 25D, only places that are related to update places are illustrated.

FIGS. 23A to 23D illustrate individual tables before the write process starts. In FIG. 23D, Δ indicates a pre-update allocation block and □ indicates an address allocation block or a parity allocation block.

In the states of FIGS. 23A to 23D, when a write request is generated with respect to the address area 2, the following processes of (D1) to (D5) are executed.

(D1) The block control unit 210*d* extracts a non-allocation block 10 and the write processing unit 220*d* writes data.

(D2) The block control unit 210*d* updates states of blocks 2 and 10. Thereby, the block 2 becomes a pre-update allocation block and the block 10 becomes an address allocation block.

(D3) The block control unit 210*d* updates a block number corresponding to the address area 2. Thereby, the address area 2 is associated with the block 10.

(D4) The parity control unit 230*d* destructs a parity group 0, when all of data blocks of the parity group 0 to which the block 2 belongs become the pre-update blocks. Thereby, the blocks 0, 1, 2, and 8 become the non-allocation blocks and the group number 0 is erased from the parity correspondence list 39.

(D5) The parity control unit 230 constructs a new parity group, when address allocation blocks of the predetermined number are collected. That is, the block control unit 210*d* extracts the non-allocation block 11 and the write processing unit 220*d* writes the parity data that is generated by the parity control unit 230*d*. Thereby, the block 11 becomes the parity allocation block and the group number 2 is added to the parity correspondence list 39.

By the processes of (D1) to (D5), the states of FIGS. 24A to 24D are obtained.

In the states of FIGS. 23A to 23D, when a write request is generated with respect to the address area 4, the following processes of (E1) to (E4) are executed.

(E1) The block control unit 210*d* extracts the non-allocation block 10 and the write processing unit 220*d* writes the data.

(E2) The block control unit 210*d* updates states of the blocks 7 and 10. Thereby, the block 7 becomes the pre-update allocation block and the block 10 becomes the address allocation block.

(E3) The block control unit 210*d* updates a block number corresponding to the address area 4. Thereby, the block corresponding to the address area 4 changes from the block 7 to the block 10.

(E4) Since the block 7 does not belong to the parity group, the block 7 is collected as the non-allocation block. Thereby, the block 7 becomes the non-allocation block.

By the processes of (E1) to (E4), the states of FIGS. 25A to 25D are obtained.

(Pre-Update Block Collecting Process)

Figure 26:
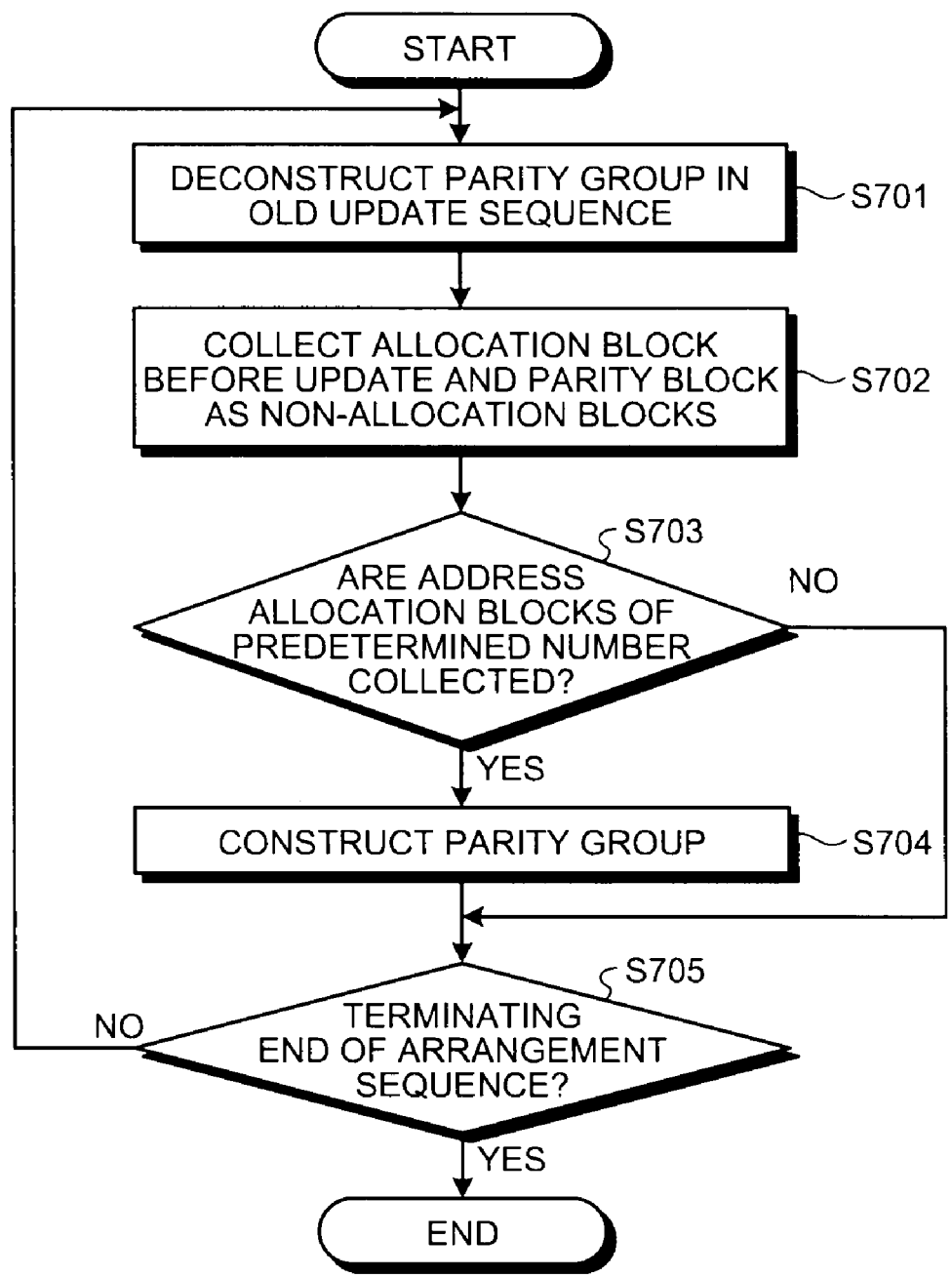
FIG. 26 is a flowchart illustrating a process of causing a pre-update block collecting unit 242 to collect a non-allocation block.

FIG. 26 illustrates a flowchart of a process that causes the pre-update block collecting unit 242 to collect the pre-update allocation block. When the number of non-allocation blocks is less than a predetermined threshold value, the pre-update block collecting unit 242 executes the pre-update block collecting process. However, the present invention is not limited to the case where the pre-update block collecting unit 242 executes the pre-update block collecting process when the number of non-allocation blocks is less than the predetermined threshold value. For example, the pre-update block collecting unit 242 may regularly execute the pre-update block collecting process or execute the pre-update block collecting process when a process load of the controller 200*a* is less than a predetermined threshold value. Also, the process may be executed at previously determined or dynamically determined timing.

In step S701 of FIG. 26, the pre-update block collecting unit 242 deconstructs the parity group in the old update sequence, based on the arrangement sequence information managed by the arrangement sequence information managing unit 270*d*. Specifically, first, the pre-update block collecting unit 242 searches a parity group to which the block having the old update sequence belongs, based on the arrangement sequence information managed by the arrangement sequence information managing unit 270. Next, the parity control unit 230*d* executes a registration releasing process on the parity group.

In step S702, the pre-update block collecting unit 242 collects the pre-update allocation block and the parity allocation block, which construct parity group deconstructed in step S701, as the non-allocation blocks. In the collecting process, the states of the pre-update allocation block and the parity allocation block are set to the non-allocation states.

In step S703, the pre-update block collecting unit 242 determines whether the address allocation blocks, which construct the parity group deconstructed in step S701, are collected by the predetermined number. When it is determined that the address allocation blocks of the predetermined number are collected, the process proceeds to step S704, and when it is determined that the address allocation blocks of the predetermined number are not collected, the process proceeds to step S705.

In step S704, the parity control unit 230d constructs the parity group. Specifically, first, the parity control unit 230d generates parity data from the data recorded in the collected blocks. Next, the error correction control unit 260d generates error detection information and error correction information form the generated parity data. By this process, the write contents are prepared in the parity allocation block.

Next, the block control unit 210d executes an extracting process of the non-allocation block and secures the non-allocation block. The pre-update block collecting unit 242 executes an erasing process on the secured non-allocation block and writes the prepared write contents. In this case, the pre-update block collecting unit 242 records the error detection information and the error correction information in a data written block. However, the pre-update block collecting unit 242 may record the error detection information or the error correction information in a predetermined block that is different from the data written block or record the error detection information or the error correction information in a storage area other than the semiconductor memory.

The block control unit 210d updates equalization information of the non-allocation block according to the execution of the updating process of the non-allocation block. The block control unit 210d changes the state of the non-allocation block to the parity allocation state.

The parity control unit 230d executes a registering process of a parity group to register the collected blocks and the parity allocation block as a new parity group.

In step S705, it is determined whether the position of the arrangement sequence information reaches the terminating end of the arrangement sequence information. When it is determined that the position of the arrangement sequence information reaches the terminating end of the arrangement sequence information, the process ends, and when it is determined that the position of the arrangement sequence information does not reach the terminating end of the arrangement sequence information, the process returns to step S701 and the process is repeated.

When the position of the arrangement sequence information reaches the terminating end of the arrangement sequence information, the number of address allocation blocks may not satisfy the predetermined number determined in step S703. In this case, a parity group of the address allocation blocks whose number does not satisfy the predetermined number is not constructed. When the write process is executed thereafter, it is expected that the address allocation blocks and the updated new address allocation blocks construct the parity group.

The state of the pre-update allocation block that is collected in step S702 may not be immediately changed to the non-allocation state, and the state change may be reserved until the position of the arrangement sequence information reaches the terminating end of the arrangement sequence information. When the total number of pre-update allocation blocks and address allocation blocks satisfy the predetermined number, the parity group can be constructed and the fault tolerance at the terminating end of the arrangement sequence can be improved.

(Example of the Pre-Update Block Collecting Process)

FIGS. 27A to 27D illustrate an example of the pre-update block collecting process, which illustrate a state where the pre-update block collecting process is executed in the state of FIGS. 23A to 23D. In this case, only minimally required information is described.

Only places that correspond to the updated places are illustrated in FIGS. 27A to 27D.

Figures 27A, 27B, 27C, 27D:
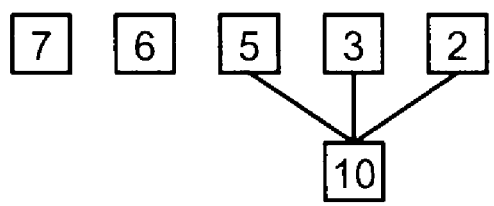
FIGS. 27A to 27D are diagrams illustrating a state of each table after a pre-update block collecting process.

FIG. 27A illustrates the address table 11, FIG. 27B illustrates the block table 12, FIG. 27C illustrates the parity correspondence list 39, and FIG. 27D schematically illustrates the states corresponding to the FIGS. 27A to 27C.

In the states of FIGS. 23A to 23D, if the pre-update block collecting process is executed, the following processes of (F1) to (F7) are executed.

(F1) The parity control unit 230d deconstructs the parity group 0. Thereby, the registration of the parity group 0 in the parity correspondence list 39 is released.

(F2) The pre-update block collecting unit 242 collects the pre-update allocation block and the parity allocation block. The block control unit 210d sets the blocks 0, 1, and 8 as the non-allocation blocks.

(F3) The parity control unit 230d determines the number of collected address allocation blocks. In this case, the number is 1 and the address allocation blocks are not collected by the predetermined number.

(F4) The parity control unit 230d deconstructs the parity group 1. Thereby, the registration of the parity group 1 in the parity correspondence list 39 is released.

(F5) The pre-update block collecting unit 242 collects the pre-update allocation block and the parity allocation block. The block control unit 210d sets the blocks 4 and 9 as the non-allocation blocks.

(F6) The parity control unit 230d determines the number of collected address allocation blocks. In this case, the collected address allocation blocks are the blocks 2, 3, and 5. That is, since the address allocation blocks of the predetermined number (three) are collected, the parity control unit 230d constructs the parity group. The block control unit 210d extracts the non-allocation block 10 and the pre-update block collecting unit 242 writes the parity data. The block control unit 210d sets the block 10 as the parity allocation block and the parity control unit 230d adds the group number 2 to the parity correspondence list 39.

(F7) By the above process, the address allocation blocks 6 and 7 do not construct the parity group.

By this configuration, the data can be restored and the fault tolerance can be improved. The performance, such as the write process speed, can be suppressed from being deteriorated, and the lifespan of the semiconductor storage can be suppressed from being shortened.

The receiver 29 according to the first embodiment corresponds to portions of the host interface unit 291d, the write processing unit 220d, and the read processing unit 221d according to the fifth embodiment. The first storage unit 28a according to the first embodiment corresponds to a portion of the block control unit 210d according to the fifth embodiment. The second storage unit 28b according to the first embodiment corresponds to a portion of the parity control unit 230d according to the fifth embodiment. The first writing unit 22a according to the first embodiment corresponds to a portion of the write processing unit 220d, portions of the semiconductor memory interface unit 292d and the block control unit 210d, and a portion of the parity control unit 230d according to the fifth embodiment. The second writing unit 22b according to the first embodiment corresponds to a portion of the write processing unit 220d, a portion of the pre-update block collecting unit 242, a portion of the parity control unit 230*d*, and portions of the semiconductor memory interface unit 292*d* and the block control unit 210*d* according to the fifth embodiment.

Sixth Embodiment

In this embodiment, the number of blocks that construct the parity group in the second embodiment is dynamically changed. The number of blocks that construct the parity group in the third embodiment may be dynamically changed. When the number blocks that construct the parity group in the third embodiment is dynamically changed, reference numerals that are added to individual functional blocks to be described in detail below may be appropriately replaced.

If the parity group is constructed according to the dynamically changed arrangement sequence information, processes of deconstructing and generating the parity group may be occurred at the time of a parity generating process. Since the processes of deconstructing and generating the parity group are accompanied by a write process of the parity allocation block, this causes a processing time to increase and the lifespan of the semiconductor storage to be shortened.

Accordingly, if the number of blocks that construct the parity group is dynamically changed, the number of processes of deconstructing the parity group can be reduced. If a block number changing process is executed at the same time as the parity generating process, the number of parity allocation blocks in the entire semiconductor storage can be changed.

Figure 28:
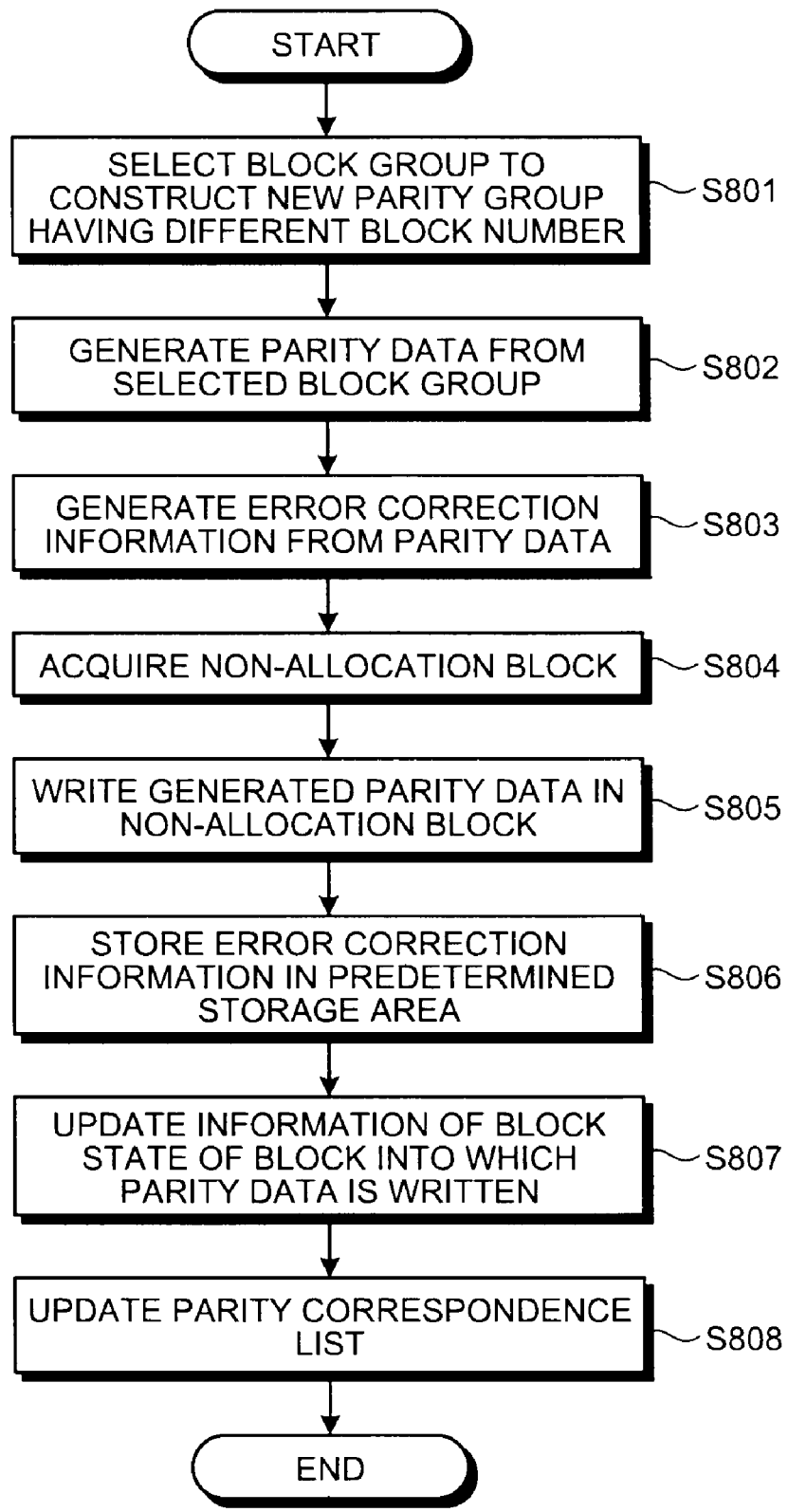
FIG. 28 is a flowchart illustrating a process of newly generating a parity group where a block number is different.

FIG. 28 is a flowchart illustrating a process of newly generating a parity group having a different block number, instead of the parity group generating process in the parity generation patrol process according to the second embodiment. In step S801 of FIG. 28, a block group is selected to construct the new parity group having the different block number.

In step S802, the parity control unit 230 generates parity data from the block group selected in step S801. In step S803, the error detection information generating unit 62 generates error detection information of the parity data generated in step S802, and the error correction information generating unit 64 generates error correction information of the parity data generated in step S802.

In step S804, the block control unit 210 acquires the non-allocation block to write the parity data. In step S805, the parity generation patrol unit 240 executes an erasing process on the non-allocation block acquired in step S804, and writes the parity data generated in step S802 in the non-allocation block acquired in step S804. When an equalizing process is executed, the block control unit 210 updates equalization information of the block.

In step S806, the error detection information and the error correction information that are generated in step S803 are stored in a predetermined storage area. The predetermined storage area may be a block into which the parity data is written, another block, or a storage unit other than the semiconductor memory array 9.

In step S807, the block control unit 210 updates the information of the state of the block into which the parity data is written in step S805 to the parity allocation state. Thereby, the block is registered as the parity allocation block in the block table 12.

In step S808, the parity control unit 230 registers the generated parity group in the parity correspondence list 39. Thereby, the parity correspondence list 39 is updated.

Figure 29A:
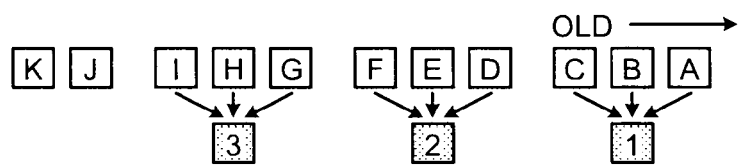
FIGS. 29A to 29C are diagrams illustrating a new parity group that is generated by blocks of a different number.
Figure 29B:
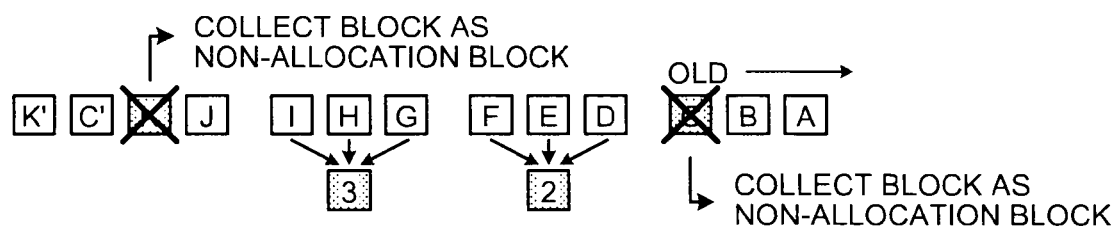
Figure 29C:
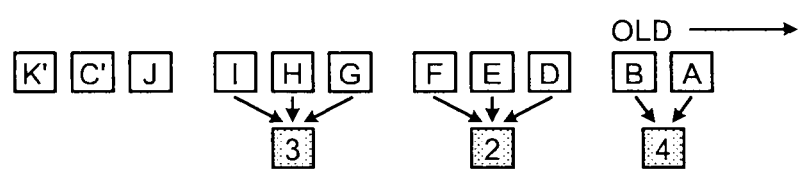

Examples of a method of constructing the parity group having the different block number will be described using FIGS. 29A to 31C. FIGS. 29A to 31C illustrate a new parity group that is generated by blocks of a different number. In FIGS. 29A to 31C, rectangles where alphabet symbols are added indicate address allocation blocks and rectangles where figure symbols are added indicate parity allocation blocks. The construction of the parity group is illustrated with the plural address allocation blocks and the parity allocation blocks associated with the address allocation blocks using an arrow. In FIGS. 29A to 29C, a new parity group is generated by the blocks other than the blocks updated by the write process corresponding to the write request, in one parity group. That is, one or more parity groups are generated from one or more continuous blocks that do not construct the parity group.

In FIG. 29A, one parity group is constructed for every three blocks. In FIG. 29A, in the block of the right side, a passage time after the block becomes the address allocation block by the update due to the write process corresponding to the write request is long.

In FIG. 29B, the state of an address allocation block C and an address allocation block K are updated by the write process corresponding to the write request and become the non-allocation states. As a result, the address allocation block C and the address allocation block K are collected as the non-allocation blocks. Blocks C' and K' where new data is written become new address allocation blocks. Thereby, a parity group that is composed of the blocks A to C is deconstructed. The configuration described until now is the same as that of the second embodiment. In this embodiment, instead of the parity group generating process in the parity generation patrol process according to the second embodiment, when the parity group is constructed, in FIG. 29C, a parity group that is composed of the address allocation blocks A and B continued in the arrangement sequence is newly generated, and a parity allocation block thereof is a block 4.

As such, if the parity group is constructed, it is not needed to deconstruct a parity group composed of the blocks D, E, F, and 2 or a parity group composed of the blocks G, H, I, and 3 and newly write parity data in the block. As a result, a processing time can be suppressed from increasing and the lifespan of the semiconductor storage can be suppressed from being shortened.

Figure 30A:
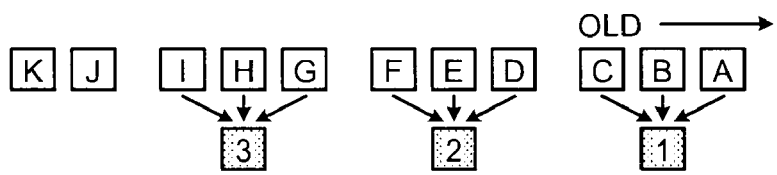
FIGS. 30A to 30C are diagrams illustrating a new parity group that is generated by blocks of a different number.
Figure 30B:
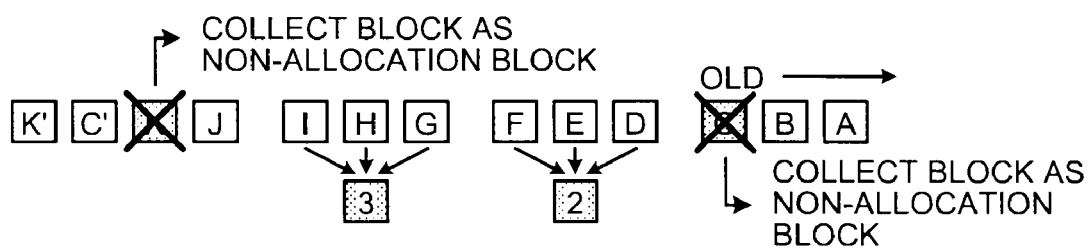
Figure 30C:
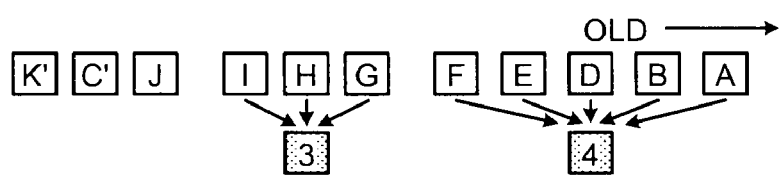

FIGS. 30A to 30C illustrate a new parity group that is generated by blocks of a different number, which illustrates an example of including blocks of a deconstructed parity group in an adjacent parity group in an arrangement sequence. FIGS. 30A and 30B are the same as FIGS. 29A and 29B, respectively.

In FIG. 30C, address allocation blocks A and B and address allocation blocks D to F that construct a parity group adjacent in the arrangement sequence are used to construct a parity group. Thereby, as compared with the case of FIG. 29C, the number of parity groups can be reduced by 1 and the number of parity allocation blocks can be reduced. As a result, the number of non-allocation blocks in the semiconductor storage increases. Accordingly, when an equalizing process is executed and the number of non-allocation blocks is large, the equalizing process can be appropriately executed.

The method that reduces the number of parity allocation blocks is not limited to the above method. For example, a method that reduces the number of parity allocation blocks in the parity group by changing the parity generating method may be adopted.

Figure 31A:
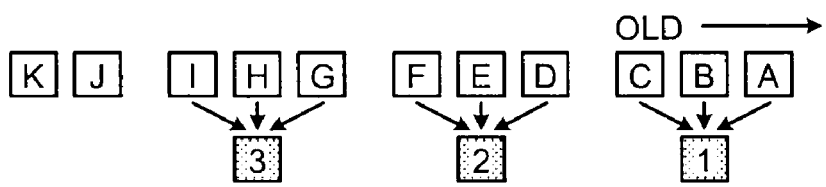
FIGS. 31A to 31C are diagrams illustrating a new parity group that is generated by blocks of a different number.
Figure 31B:
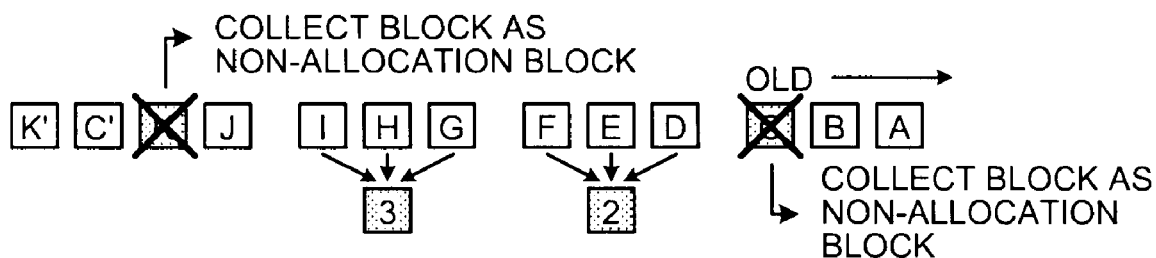
Figure 31C:
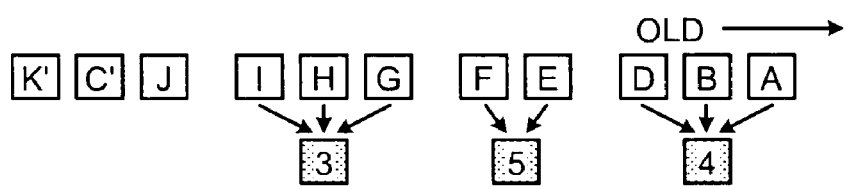

FIGS. 31A to 31C illustrate a new parity group that is generated by blocks of a different number, which illustrates an example of generating plural parity groups from blocks of a deconstructed parity group and blocks of an adjacent parity group in an arrangement sequence. FIGS. 31A and 31B are the same as FIGS. 29A and 29B, respectively.

In FIG. 31C, one parity group is generated from the address allocation blocks A, B, and D and one parity group is generated from the address allocation block E and the block F. FIG. 31C is the same as FIG. 31A in the number of parity groups. However, this embodiment is not limited to the example of FIGS. 31A to 31C, and the number of parity groups may be different from the number of parity groups before update. Thereby, the number of parity groups can be increased to improve fault tolerance. The number of parity allocation blocks in the semiconductor storage is decreased to increase the number of non-allocation blocks. In order to appropriately execute the equalizing process, the number of parity groups can be decreased.

In the drawings, the block table 12 that is included in the block control unit 210 may include lists that are classified for every block state. For example, in the list that is composed of the address allocation blocks, information of the address allocation blocks is arranged in the sequence in which the update time when the write process is executed is old. In the list that is composed of the non-allocation blocks, information of the non-allocation blocks is arranged in the sequence in which the update time when the state becomes the non-allocation state is old.

If the above process that changes the block number for each parity group is continued, the number of blocks that constructs the parity group becomes a so-called local optimal value and may not become a whole optimal value. For example, a situation in which the parity group where the number of data block groups is large and the parity group where the number of data block groups is small alternately exist in the arrangement sequence may be generated. Similarly, a situation in which the parity group where the number of parity block groups is large and the parity group where the number of parity block groups is small alternately exist in the arrangement sequence may be generated.

For this reason, the block number changing process with respect to the entire semiconductor storage may be executed independently from the above process, such that the number of data block groups constructing the parity group or the number of parity block groups becomes an optimal value in the entire semiconductor storage.

By this configuration, the number of processing of deconstructing and generating the parity group can be reduced. In addition, the performance, such as the write process speed, can be suppressed from being deteriorated, and the lifespan of the semiconductor storage can be suppressed from being shortened.

Seventh Embodiment

In this embodiment, the number of blocks that construct the parity group in the fifth embodiment is dynamically changed.

For example, in the fifth embodiment, if the number of pre-update allocation blocks increases, the number of non-allocation blocks decreases. Thereby, the equalizing process is not appropriately executed. Accordingly, the number of non-allocation blocks needs to be increased. For example, in the fifth embodiment, when the write process is not executed during a long period, address allocation blocks of the predetermined number are not collected, and a state where the parity group is not constructed is maintained during a long period. Thereby, fault tolerance with respect to the blocks is lowered.

Accordingly, in this embodiment, if the number of blocks that construct the parity group is dynamically changed, the number of parity allocation blocks decreases and the number of non-allocation blocks increases. With respect to the address allocation blocks where a period during which the parity group is not constructed exceeds a predetermined threshold value, the parity group is constructed by blocks of the number smaller than the predetermined number.

At the time of the pre-update block collecting process in the fifth embodiment, the number of blocks that construct the parity group is changed. Thereby, a process of deconstructing the parity group accompanied by the pre-update block collecting process and a process of deconstructing the parity group due to the change in the block number can be simultaneously executed, and the number of parity write processes can be reduced.

Specifically, at the time of the processes of steps S701 and S702 of FIG. 26, the process of deconstructing the parity group is executed and the process of changing the block number is executed.

The process of deconstructing the parity group due to the pre-update block collecting process and the process of deconstructing the parity group due to the change in the block number can be simultaneously executed, and the process of deconstructing the parity group not including the pre-update block can be omitted.

Figure 32:
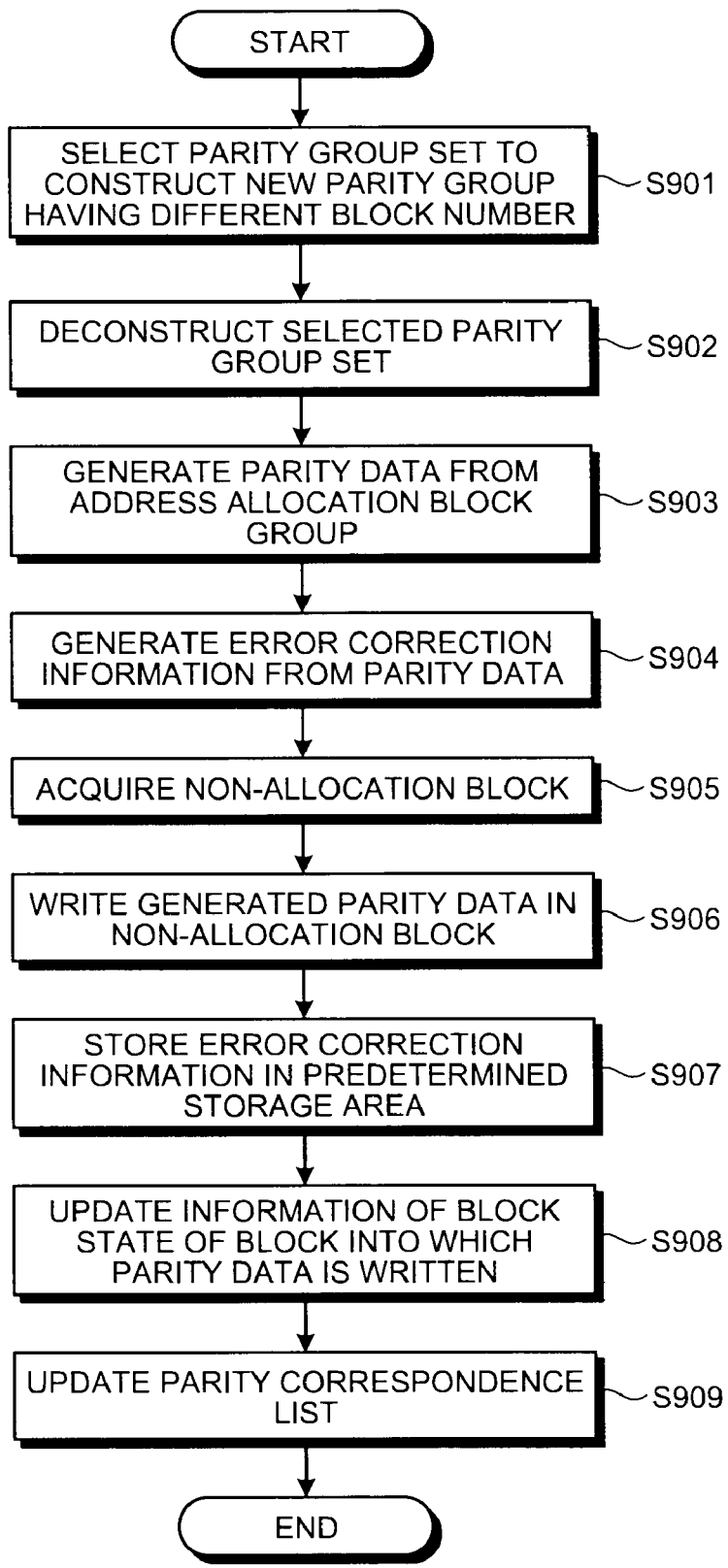
FIG. 32 is a flowchart illustrating a process of dynamically changing the number of blocks constructing a parity group and generating a parity group.

FIG. 32 is a flowchart illustrating a process of simultaneously executing the pre-update block collecting process and the block number changing process and generating a new parity group.

In step S901 of FIG. 32, a parity group set is selected to construct the new parity group having the different block number. In step S902, the parity group set selected in step S901 is deconstructed. Specifically, a registration releasing process of the parity group is executed, and the pre-update allocation block and the parity allocation block that belong to the parity group are collected as the non-allocation blocks.

In step S903, the parity control unit 230 generates parity data from the address allocation block group obtained in step S902. Since the processes of steps S904 to S909 are the same as those of steps S803 to S808 of FIG. 28, the detailed description thereof will not be repeated here.

FIGS. 33A and 33B illustrate an example of a new parity group that is generated by blocks of a different block number. In FIGS. 33A and 33B, among rectangles where alphabet symbols are added, non-patterned rectangles indicate address allocation blocks, hatched blocks indicate pre-update allocation blocks, and rectangles where figure symbols are added indicate parity allocation blocks. The construction of the parity group is illustrated with the plural address allocation blocks and the parity allocation blocks associated with the address allocation blocks using an arrow.

In FIG. 33A, six parity groups from a parity group to which a parity allocation block 1 belongs to a parity group to which a parity allocation block 6 belongs are illustrated, and each parity group includes blocks of four data block groups.

In FIG. 33B, from the state of FIG. 33A, the pre-update allocation blocks are collected as the non-allocation blocks according to the arrangement sequence, and two parity groups are newly generated. A parity group to which the parity allocation block 7 belongs is newly generated from the parity group to which the parity allocation block 1 belongs to the parity group to which the parity allocation block 3 belongs in FIG. 33A, and includes six address allocation blocks B, D, G, I, J, and L. A parity group to which a parity allocation block 8 belongs is newly generated from the parity group to which the parity allocation block 4 belongs and the parity group to which the parity allocation block 5 belongs in FIG. 33A, and includes five address allocation blocks N, A', C', E', and F'.

A parity group to which the parity allocation block 6 belongs is the same as the parity group to which the parity allocation block 6 belongs in FIG. 33A. This is because the parity group to which the parity allocation block 6 belongs in FIG. 33A does not include the pre-update allocation block. Specifically, the number of blocks that construct the parity group is changed, and the parity group may not be deconstructed. An address allocation block P' of an end is not included in any of the parity groups.

As such, if the pre-update block collecting process and the block number changing process can be simultaneously executed, the unnecessary parity group deconstructing process can be omitted.

Figure 34:
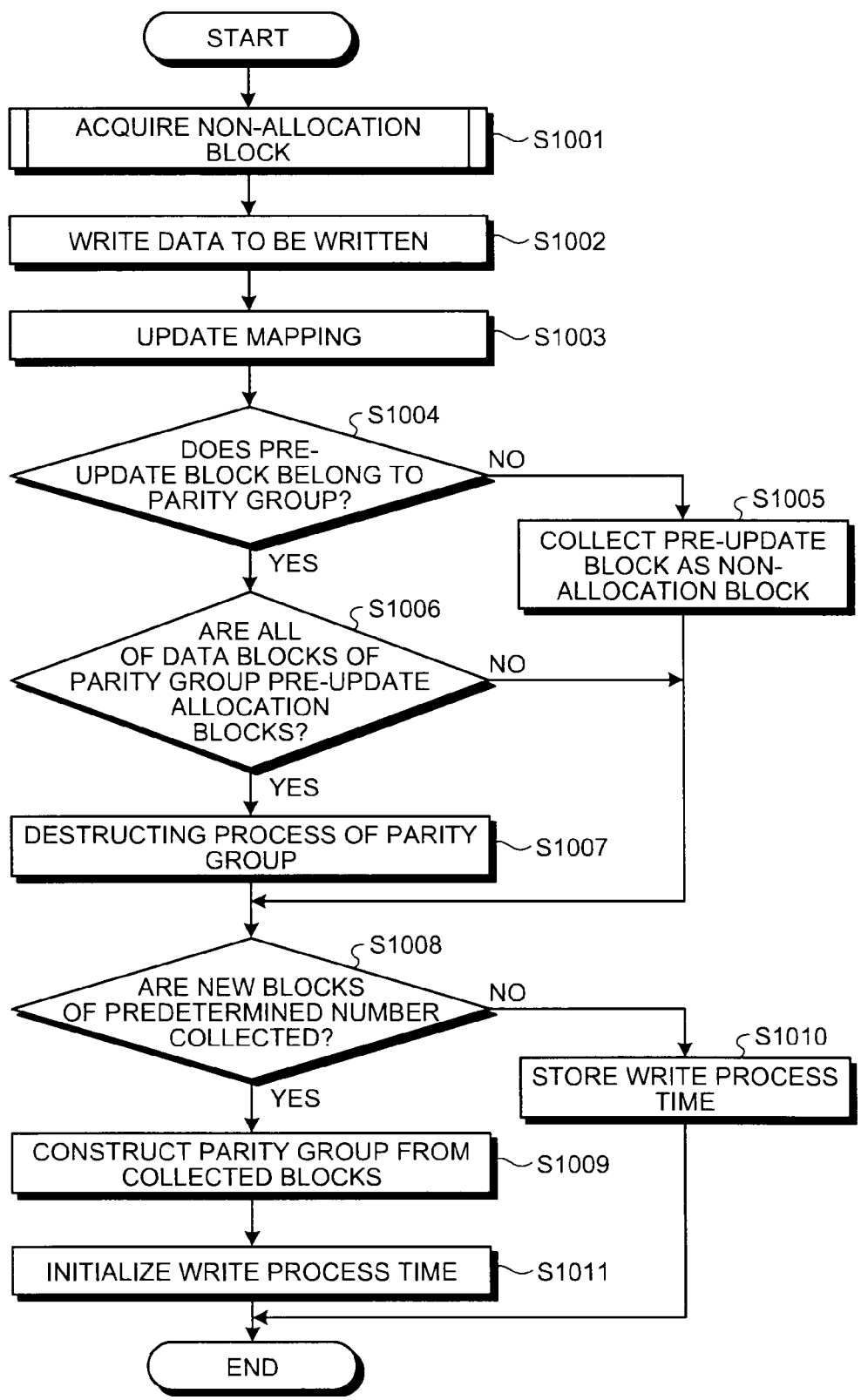
FIG. 34 is a flowchart illustrating a write process of changing the number of blocks constructing a parity group.

FIG. 34 is a flowchart illustrating a write process. FIG. 34 is the same as FIG. 22, except that steps S1010 and S1011 are added, and the process proceeds to step S1010 when the result of step S608 of FIG. 22 is NO and the process proceeds to step S1011 when the process of step S609 of FIG. 22 ends. Accordingly, only steps S1010 and S1011 will be described and the description of the other steps will not be repeated here.

In step S1010 subsequent to step S1008, a write processing time when the write process is executed in step S1002 is stored. Meanwhile, in step S1016 subsequent to step S1009, a write processing time of all of the blocks that construct the parity group in step S1009 is initialized. By this process, the write processing time that becomes a reference when the parity group is reconstructed can be set with a predetermined time cycle. Information of the write processing time may be included in information of each block in the block table 12.

Figure 35:
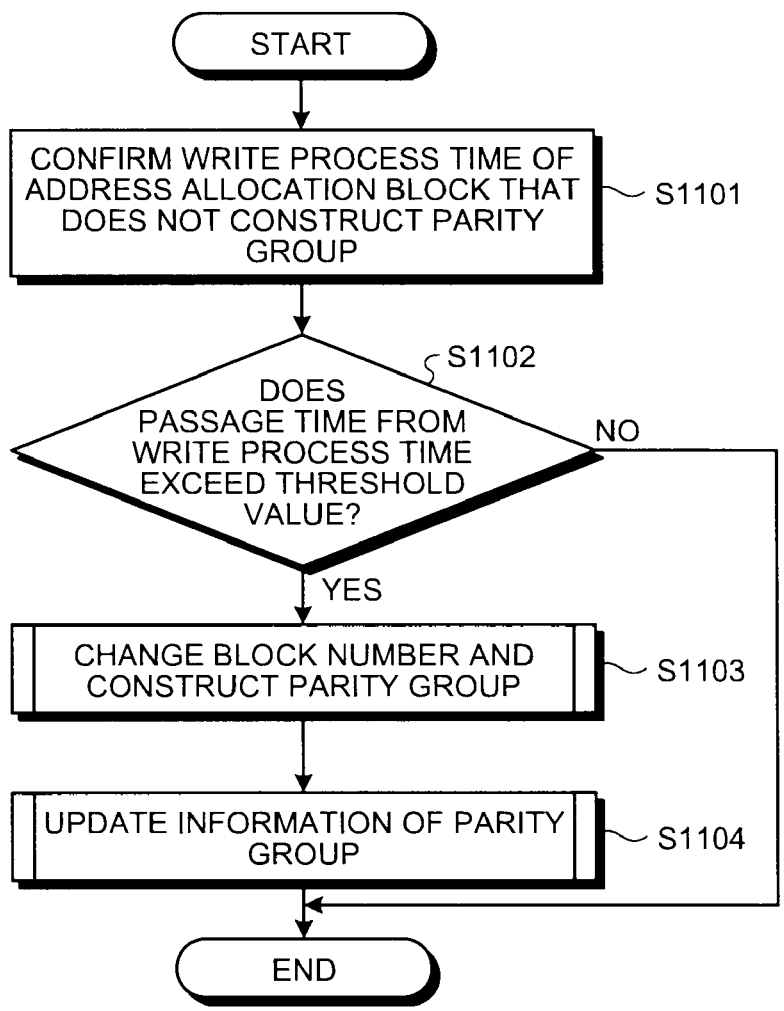
FIG. 35 is a flowchart illustrating a process with respect to an address allocation block not included in a parity group for a predetermined time.

FIG. 35 is a flowchart illustrating a process with respect to an address allocation block that is not included in a parity group for a predetermined time. The process of FIG. 35 may be executed based on the write processing time set in steps S1010 and S1011 of FIG. 34.

In step S1101 of FIG. 35, a parity non-construction block redundancy patrol unit (not illustrated) confirms the write processing time of the address allocation block that does not construct the parity group. In step S1102, the parity non-construction block redundancy patrol unit determines whether the write processing time confirmed in step S1101 exceeds a predetermined threshold value. When it is determined that the write processing time exceeds the predetermined threshold value, the process proceeds to step S1103, and when it is determined that the write processing time does not exceed the predetermined threshold value, the process ends.

In the process of step S1103, the parity group is constructed by the blocks of the number of address allocation blocks where the passage time exceeds the predetermined threshold value. Since some examples of the construction sequence of the parity group are already described above, the detailed description will not be repeated here herein. In the process of step S1104, the information of the parity group that is constructed in step S1103 is registered in the parity correspondence list. Since the registration sequence of the parity correspondence list is already described above, the detailed description will not be repeated here.

Figure 36:
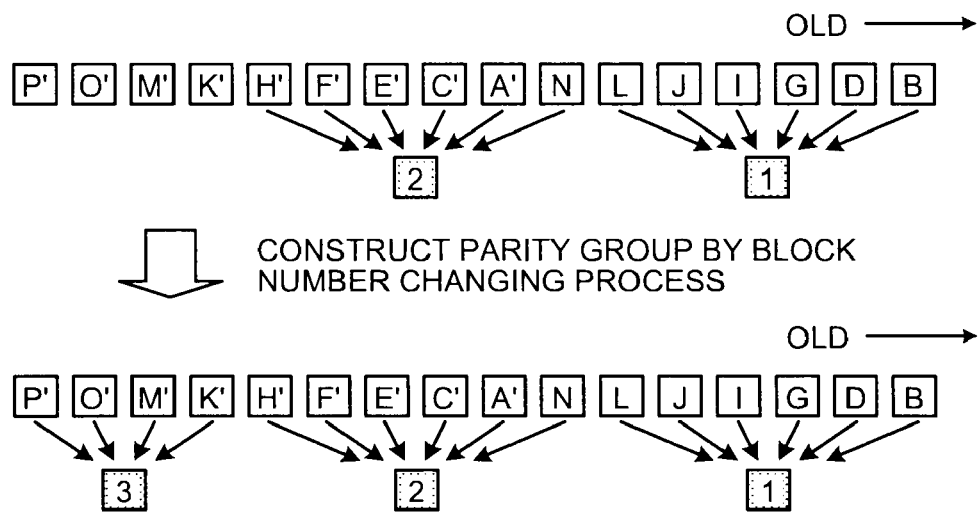
FIG. 36 is a diagram illustrating a parity group.

FIG. 36 illustrates a parity group generating process that is realized by the flowcharts of FIGS. 34 and 35. In FIG. 36, with respect to address allocation blocks K', M', 0', and P' that do not construct the parity group for a predetermined time, a parity group that is composed of four blocks and includes a parity allocation block 3 is generated.

By this configuration, the number of processing of deconstructing and generating the parity group can be reduced. In addition, the performance, such as the process speed, can be suppressed from being deteriorated, and the lifespan of the semiconductor storage can be suppressed from being shortened. Since the number of address allocation blocks that do not construct the parity group during a long period can be reduced, redundancy can be improved.

Eighth Embodiment

In this embodiment, in order to reduce the number of parity groups that may be deconstructed when the write process in the second embodiment or the third embodiment is executed, control is appropriately performed using a pre-update allocation block. The reference numerals that are added to individual functional blocks to be described in detail below are appropriately replaced on the basis of the applied embodiments.

Specifically, if the write process is executed, redundancy of the data written block does not exist, and redundancy disappears in a different address allocation block of a parity group where the pre-update block is included. Accordingly, the pre-update block is used as the pre-update allocation block, not the non-allocation block, and a deconstructing process of the parity group is appropriately reserved. In this case, a parity generating process from an address allocation block into which data is newly written may be preferentially executed, and a collecting process of the pre-update block may be preferentially executed.

FIGS. 37A to 39C illustrate examples where a parity group generating principle is different according to the kind of information adopted as an arrangement sequence. In FIGS. 37A to 39C, among rectangles where alphabet symbols are added, non-patterned rectangles indicate address allocation blocks, hatched blocks indicate pre-update allocation blocks, and rectangles where figure symbols are added indicate parity allocation blocks. The construction of the parity group is illustrated with the plural address allocation blocks and the parity allocation blocks associated with the address allocation blocks using an arrow.

The adopted arrangement sequence information is not limited to the information of the arrangement sequence exemplified herein.

Figure 37A:
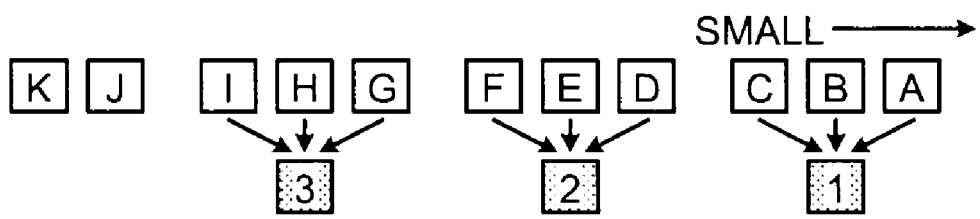
FIGS. 37A to 37C are diagrams illustrating an example of an arrangement sequence of pre-update blocks and generation of a parity group.
Figure 37B:
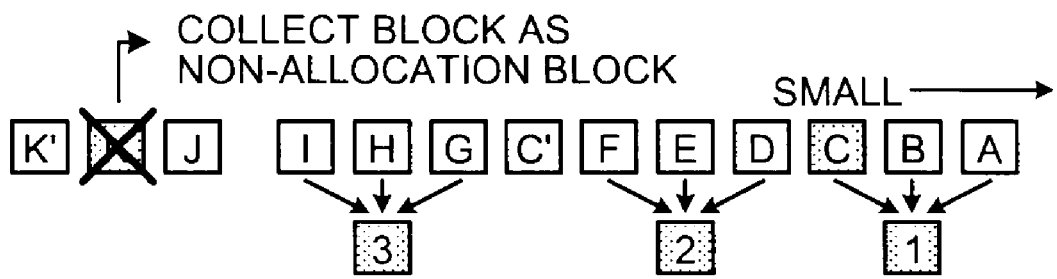
Figure 37C:
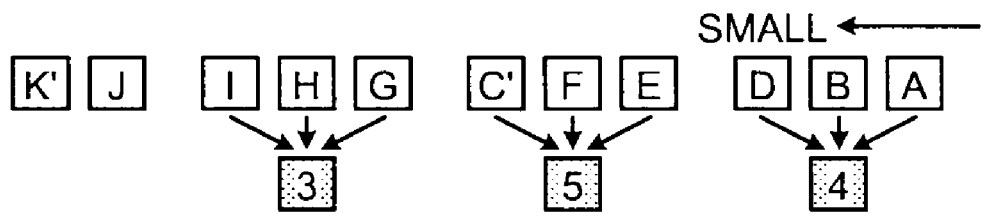

FIGS. 37A to 37C illustrate an example of the case where a parity group is constructed in an arrangement sequence in which an update count is small. In regards to the arrangement sequences of the blocks in FIGS. 37A to 37C, in the case of the right side, the update count is small. In FIGS. 37A to 37C, one parity group is constructed for every three blocks.

FIG. 37B illustrates an example of the case where update is progressed from the state of FIG. 37A. In FIG. 37B, in a block that newly becomes an address allocation block, an arrangement sequence is determined based on the update count. In the example of FIGS. 37A to 37C, a block C' that is obtained by updating a block C is arranged between a block F and a block G, and a block K' that is obtained by updating a block K is arranged immediately after the block K. In FIG. 37B, redundancy of blocks A and B is maintained by the block C becoming the pre-update allocation block.

Since the block K does not belong to the parity group, the block K is collected as non-allocation block.

In this case, if a parity generating process is preferentially executed, a parity group composed of blocks G, H, I, and 3 is deconstructed, and a parity group (parity group α) having blocks C', G, and H and a parity group (parity group β) having blocks I, J, and K' are generated. As such, when the update count is adopted as the arrangement sequence information, a parity group deconstructing process may need to be executed. Meanwhile, in the pre-update block collecting process, the parity group deconstructing process needs to be executed.

Accordingly, when the update count is adopted as the arrangement sequence information, it is effective to simultaneously execute the pre-update block collecting process and the parity generating process.

FIG. 37C illustrates an example of the case where the pre-update allocation block is collected as the non-allocation block and the parity group is reconstructed, from the state of FIG. 37B. In FIG. 37C, the block C of the pre-update allocation block in FIG. 37B is collected, and a parity group is constructed for every three blocks from the right side, in the sequence in which the update count is small.

In the example of FIGS. 37A to 37C, the pre-update block collecting process and the parity generating process are simultaneously executed and the update count of the parity data is reduced. When the state of FIG. 37B changes to the state of FIG. 37C, the two parity groups are reconstructed.

FIGS. 38A to 38D illustrate an example of the case where a parity group is constructed in an arrangement sequence in which an update time is old. In regards to the arrangement sequences of the blocks in FIGS. 38A to 38D, in the case of the right side, the update time is old. In FIGS. 38A to 38D, one parity group is constructed for every three blocks.

Figure 38A:
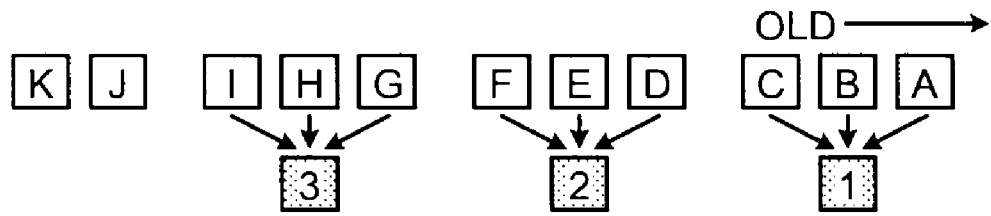
FIGS. 38A to 38D are diagrams illustrating an example of an arrangement sequence of pre-update blocks and generation of a parity group.
Figure 38B:
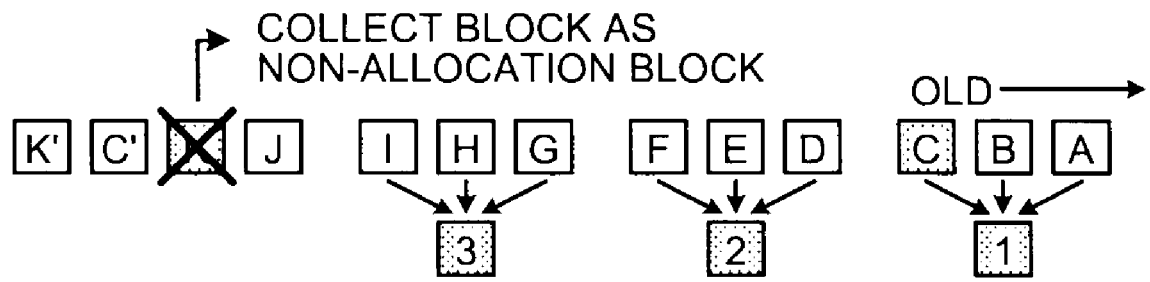

FIG. 38B illustrates an example of the case where update is progressed from the state of FIG. 38A. In FIG. 38B, in a block that newly becomes an address allocation block, an arrangement sequence is determined based on the update time. In the arrangement sequence of FIG. 38A, a block C' that is obtained by updating a block C is arranged next to a block K that corresponds to a block where the update time is earliest. A block K' that is obtained by updating the block K is arranged next to the block C'. The configuration of the parity group of FIG. 38B is the same as that of FIG. 38A. Since the block K does not belong to the parity group, the block K is collected as a non-allocation block.

In FIGS. 38A to 38D, the position where the address allocation block after update is arranged needs to become a left end. The updated block is set as the pre-update allocation block. Accordingly, if the parity group is constructed, the parity group is not deconstructed until the pre-update block collecting process is executed.

Since the address allocation blocks that do not construct the parity group exist continuously in the arrangement sequence, a parity group deconstructing process is not occurred at the time of a parity generating process.

When the update time is adopted as the information of the arrangement sequence, according to importance degrees of the fault tolerance and the increase in the lifespan of the semiconductor storage, the following two methods may be selectively adopted.

(G1) When the fault tolerance is considered to be more important than the increase in the lifespan of the semiconductor storage and redundancy is considered to be important, the parity generating process is preferentially executed.

(G2) When the increase in the lifespan of the semiconductor storage by wear leveling is considered to be more important than the fault tolerance, the pre-update block collecting process is preferentially executed to increase the number of non-allocation blocks.

When the pre-update block collecting process is executed, the parity group deconstructing process needs to be executed. For this reason, in addition to the comparison of the importance degrees of the fault tolerance and the increase in the lifespan of the semiconductor storage, the frequency of the parity generating process being needed and the frequency of the pre-update block collecting process being needed may be considered and the pre-update block collecting process and the parity generating process may be simultaneously executed.

Figure 38C:
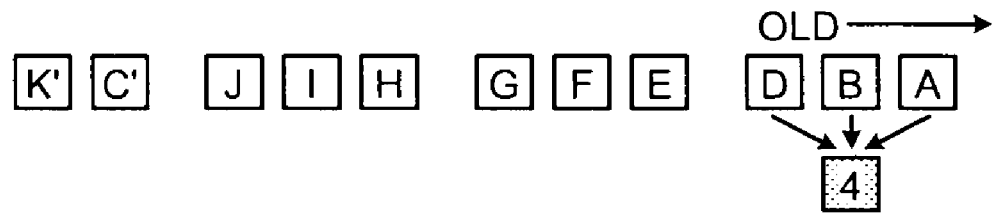
Figure 38D:
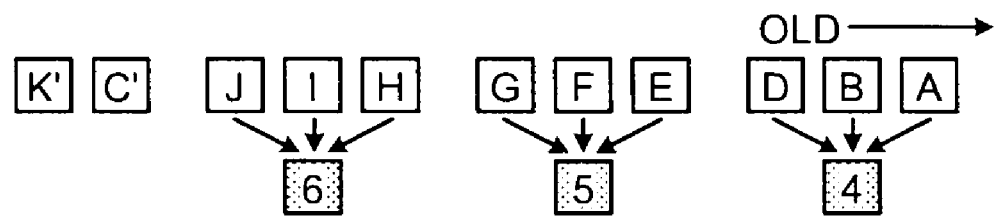

In the example of FIGS. 38C and 38D, the pre-update block collecting process is preferentially executed.

In FIG. 38C, the block C that is the pre-update allocation block is collected as the non-allocation block and a new parity group is generated. In FIG. 38C, one parity group is constructed for every three blocks, from the right end of the arrangement sequence.

In FIG. 38D, the parity group generating process is progressed and a total of three parity groups are generated.

Figure 39A:
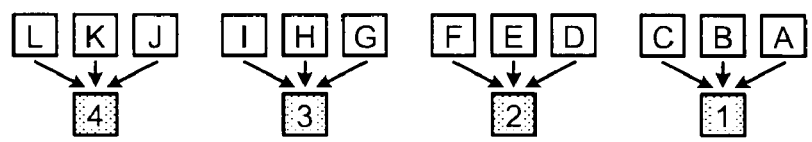
FIGS. 39A to 39C are diagrams illustrating an example of an arrangement sequence of pre-update blocks and generation of a parity group.
Figure 39B:
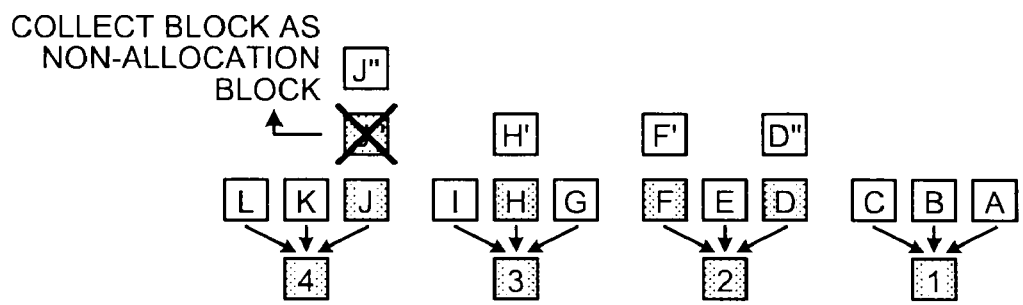
Figure 39C:
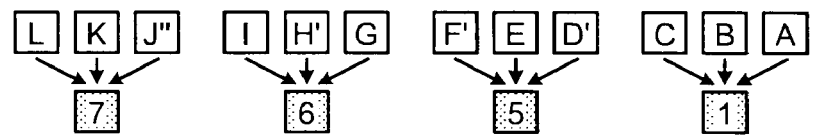

FIGS. 39A to 39C illustrate an example of the case where a parity group is constructed according to arrangement sequence information of static information (for example, logical address information). FIG. 39A illustrates an example of the case where a parity group is constructed for every three blocks. FIG. 39B illustrates an example of the case where the update is progressed from the state of FIG. 39A. In FIG. 39B, an arrangement sequence of new address allocation blocks becomes equal to that of the pre-update blocks. Since a block J' is a pre-update block that does not belong to the parity group, the block J' is collected as a non-allocation block.

FIG. 39C illustrates an example of the case where a parity group is regenerated according to arrangement sequence information, from the state of FIG. 39B. When the state of FIG. 39B changes to the state of FIG. 39C, if a parity group is regenerated according to static information, the pre-update allocation block that constructs the original parity group is not needed. Therefore, the pre-update allocation block can be collected as the non-allocation block.

As such, when the parity group is generated according to the static information, the same results are obtained in the parity generating process and the pre-update block collecting process.

Ninth Embodiment

In this embodiment, the number of blocks that construct the parity group in the eighth embodiment is dynamically changed. Thereby, the count of the parity generating process or the parity group deconstructing process in the pre-update block collecting process in the eighth embodiment can be reduced, and the increase in the processing time and the decrease in the lifespan of the semiconductor storage can be suppressed.

The number of blocks that construct the parity group can be dynamically changed, and the number of parity groups can be increased to improve the fault tolerance. The number of parity allocation blocks in the semiconductor storage can be decreased, the number of the non-allocation blocks can be increased, and the number of parity groups can be decreased to appropriately execute the equalizing process.

In the description below, the case where the number of parity allocation blocks decreases will be described.

FIGS. 40A and 40B illustrate an example of the case where the number of parity groups is reduced. In FIGS. 40A and 40B, among rectangles where alphabet symbols are added, non-patterned rectangles indicate address allocation blocks, hatched blocks indicate pre-update allocation blocks, and rectangles where figure symbols are added indicate parity allocation blocks. The construction of the parity group is illustrated with the plural address allocation blocks and the parity allocation blocks associated with the address allocation blocks using an arrow.

In FIG. 40A, six parity groups from a parity group to which a parity allocation block 1 belongs to a parity group to which a parity allocation block 6 belongs are illustrated, and each parity group includes blocks of four data block groups.

In FIG. 40B, from the state of FIG. 40A, the pre-update allocation blocks are collected as the non-allocation blocks according to the arrangement sequence, and two parity groups are newly generated. A parity group to which the parity allocation block 7 belongs is newly generated from the parity group to which the parity allocation block 1 belongs to the parity group to which the parity allocation block 3 belongs in FIG. 40A, and includes six address allocation blocks B, D, G, I, J, and L. A parity group to which a parity allocation block 8 belongs is newly generated from the parity group to which the parity allocation block 4 belongs and the parity group to which the parity allocation block 5 belongs in FIG. 40A, and includes five address allocation blocks N, A', C', E', and F'.

A parity group to which the parity allocation block 6 belongs is the same as the parity group to which the parity allocation block 6 belongs in FIG. 40A. This is because the parity group to which the parity allocation block 6 belongs in FIG. 40A does not include the pre-update allocation block. Specifically, the number of blocks that construct the parity group is changed, and the parity group may not be deconstructed. An address allocation block P' of an end is not included in any of the parity groups. As such, the number of blocks that construct the parity group is increased to decrease the number of parity groups, thereby decreasing the number of parity allocation blocks where the parity data is stored.

Tenth Embodiment

In this embodiment, an example of the case where, in a semiconductor storage adopting the configuration of maintaining redundancy in a block by parity, before parity data is held in a block of a semiconductor memory array after the parity data is generated, the parity data is temporarily held in a temporary storage area (cache memory) will be described. This embodiment may be combined with any one of the first to ninth embodiments to construct one embodiment. In the description below, the case where this embodiment is combined with any one of the first to ninth embodiments to construct one embodiment will be described. However, reference numerals that are added to individual functional units may be appropriately replaced according to the applied embodiment.

In this embodiment, in a process of the parity generation patrol unit 240, after the parity data is generated, the parity data is held in the cache memory 293 and the parity generating process is completed. The specific description is given below. The cache memory 293 is configured as a DRAM, for example. The parity data that is stored in the cache memory 293 is written into the semiconductor memory array 9 at predetermined timing by a parity data write patrol unit (not illustrated), which will be described in detail below. In this embodiment the semiconductor memory array 9 is composed of a NAND flash memory.

When a new parity group is generated and parity data to be updated on the cache memory 293 exists, the controller 200 of the semiconductor storage 1 according to this embodiment may only update the parity data on the cache memory 293. Thereby, the parity data may be updated without being stored in the semiconductor memory array 9.

As a result, a block update count can be reduced, performance, such as a processing speed, can be suppressed from being deteriorated, and the lifespan of the semiconductor storage can be suppressed from being shortened.

Figure 41A:
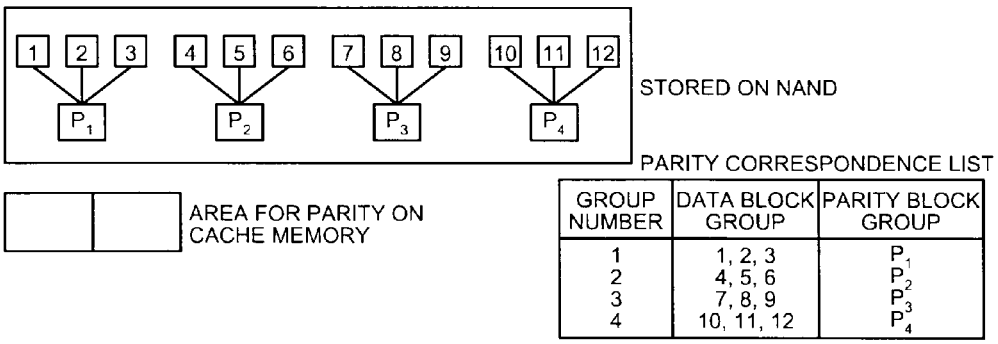
FIGS. 41A to 41C are diagrams illustrating an example of data stored in a block on a semiconductor memory array 9 and parity data stored on a cache memory 293.
Figure 41B:
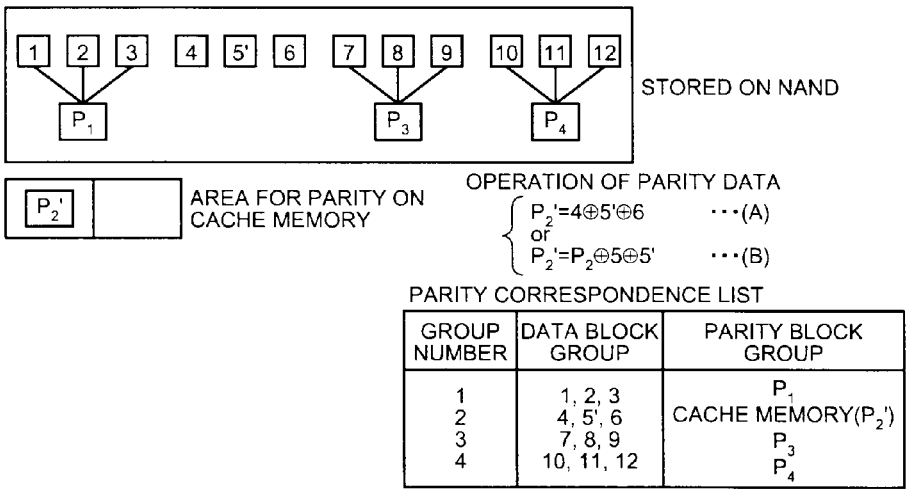
Figure 41C:
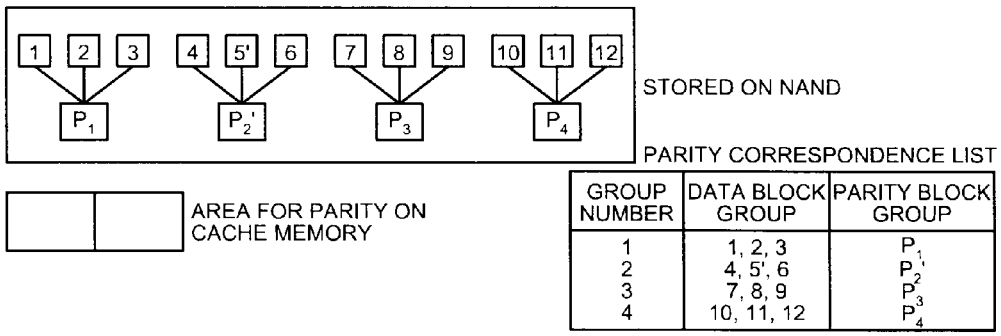

FIGS. 41A to 41C illustrate examples of a parity correspondence list that is used in this embodiment, instead of the parity correspondence list 39. FIGS. 41A to 41C schematically illustrate data and parity data that are stored in a block on the semiconductor memory array 9 and parity data that is stored in the cache memory 293, which are illustrated in the parity correspondence list. In FIGS. 41A to 41C, the semiconductor memory is represented by "NAND". The parity correspondence list is different from the parity correspondence list 39 in only information recorded in a parity block group to be described below, and the other portion is the same as that of the parity correspondence list 39. Therefore, the description of the other portion will not be repeated here. In the parity correspondence list illustrated in FIGS. 41A to 41C, only a portion needed in the description below is illustrated and a portion (for example, parity generating method) not needed in the description below is not illustrated.

FIG. 41A illustrates a state of a block before update, that is, before the write process is executed. In FIG. 41A, all of parity data P1 to P4 are stored in the block on the semiconductor memory array 9. A parity data area on the cache memory 293 is empty. This correspondence information is held in the parity correspondence list. For example, "P1" of an item of a parity block group indicates that parity data P1 is stored in the semiconductor memory.

FIG. 41B illustrates a state where, in the state of FIG. 41A, a block 5 is updated by the write process and becomes a block 5', and in the process of updating the parity data, parity data P2' that is newly generated, instead of the parity data P2, is held in a parity data area on the cache memory. This correspondence information is held in the parity correspondence list. For example, the "cache memory (P2')" of an item of a parity block group indicates that parity data P2' is stored in the cache memory. At this time, the parity data P2' may be generated from data stored in blocks 4, 5', and 6, according to an expression (A) of FIG. 41B, and may be generated from the parity data P2 before update, data stored in the block 5 before update, and data stored in the block 5', according to an expression (B).

When the defined number of data groups that construct the parity group increases, the processing amount increases according to the expression (A). Accordingly, the calculation may be made using a method according to the expression (B).

FIG. 410 illustrates a state where the parity data P2' stored in the cache memory 293 is written into the block, in the state of FIG. 41B. The item of the parity block group in the parity correspondence list becomes "P2'", which indicates that the parity data P2' is stored in the semiconductor memory.

In the state of FIG. 41B, when the block 4 is updated and becomes the block 4' and the parity data becomes P2", the process that updates P2' with new parity data P2" becomes a rewrite process on the cache memory 293. For this reason, in regards to the parity update, since the writing of the data in the semiconductor memory array 9 does not need to be executed, the increase in the processing time and the decrease in the lifespan of the semiconductor storage can be suppressed.

As kinds of timing of a process of writing the parity data stored in the cache memory 293 in the semiconductor memory array 9 and write data, for example, the following three kinds of (H1) to (H3) exist. These kinds are examples of the kinds of process timing and write data, and the present invention is not limited to the three kinds to be described below. For example, the process may start at previously determined or dynamically determined timing, and parity data of the previously determined or dynamically determined amount may be written into the semiconductor memory array 9.

(H1) When storage of parity data of the amount exceeding a capacity of a storage area of the cache memory 293 is requested or when the amount of parity data stored in the cache memory 293 exceeds a predetermined threshold value, all or part of the parity data stored in the cache memory 293 is written into the semiconductor memory array 9.

(H2) When a cache flash command, which is a command requesting to write all of data on the cache memory 293 in the semiconductor memory, is received from the host device 300, all of the parity data that is stored in the cache memory 293 is written.

(H3) When an announce notification command of power supply disconnection is received from the host device 300, all or part of the parity data that is stored in the cache memory 293 is written.

The parity data that is stored in the cache memory 293 may be written into the semiconductor memory array 9 in the sequence in which the parity data is stored. A determination reference of the storage sequence may be any one of the update count, the update sequence, and a value that is obtained by evaluating the update count and the update sequence using a predetermined evaluation function. Thereby, it can be expected that the rewrite of the parity data on the cache memory 293 is generated more and more, and the rewrite of the parity data on the semiconductor memory array 9 can be reduced. The determination reference of the storage sequence is not limited to the above example, and an appropriate determination reference may be adopted. The determination reference may be the same as the arrangement sequence information of the address allocation blocks, which is managed by the arrangement sequence information managing unit 270d.

When it is determined that the write amount of parity data to the semiconductor memory array 9 is large and the write completion is not in time for the power supply disconnection, the management information of the parity data at the corresponding point of time is stored in the semiconductor memory that is a non-volatile memory or the other storage areas. As the management information, for example, the following information is exemplified. However, the management information is not limited to the following examples.

Information on whether parity data exists in the semiconductor memory array 9, that is, the parity data is in a state where the parity data is not erased even at the time of the power supply disconnection.

Information on whether the parity data exists in the cache memory 293, that is, the parity data is in a state where the parity data is erased at the time of the power supply disconnection.

When the management information of the parity data is stored in time for the power supply disconnection, at appropriate timing after power is supplied again, a redundancy state reconstructing unit (not illustrated) may regenerate the parity data that is erased due to the power supply disconnection, and store the parity data in the cache memory 293 or the semiconductor memory array 9. Thereby, a state of the redundancy configuration before the power supply disconnection may be restored.

In this embodiment, the parity data generating process and the write process of the parity data to the semiconductor memory array 9 are separated. Accordingly, when this embodiment is combined with any one of the first to ninth embodiment to construct one embodiment, the parity generating process by the parity generating unit 31 in the parity generating process and the write process of the generated parity data to the semiconductor memory are not continuously executed.

In the first to ninth embodiments, the data block changing process in the write process and the parity data updating process in the parity generating process are individually executed. For this reason, at the time of the data block updating process, the data block before update or the parity allocation block may be collected as the non-allocation block. At the time of the parity data updating process, the data before update may not be referred to and the operation of the parity generation based on the expression (B) may not be executed. Accordingly, the data before update may be referred to, when the parity data is generated.

Figure 42:
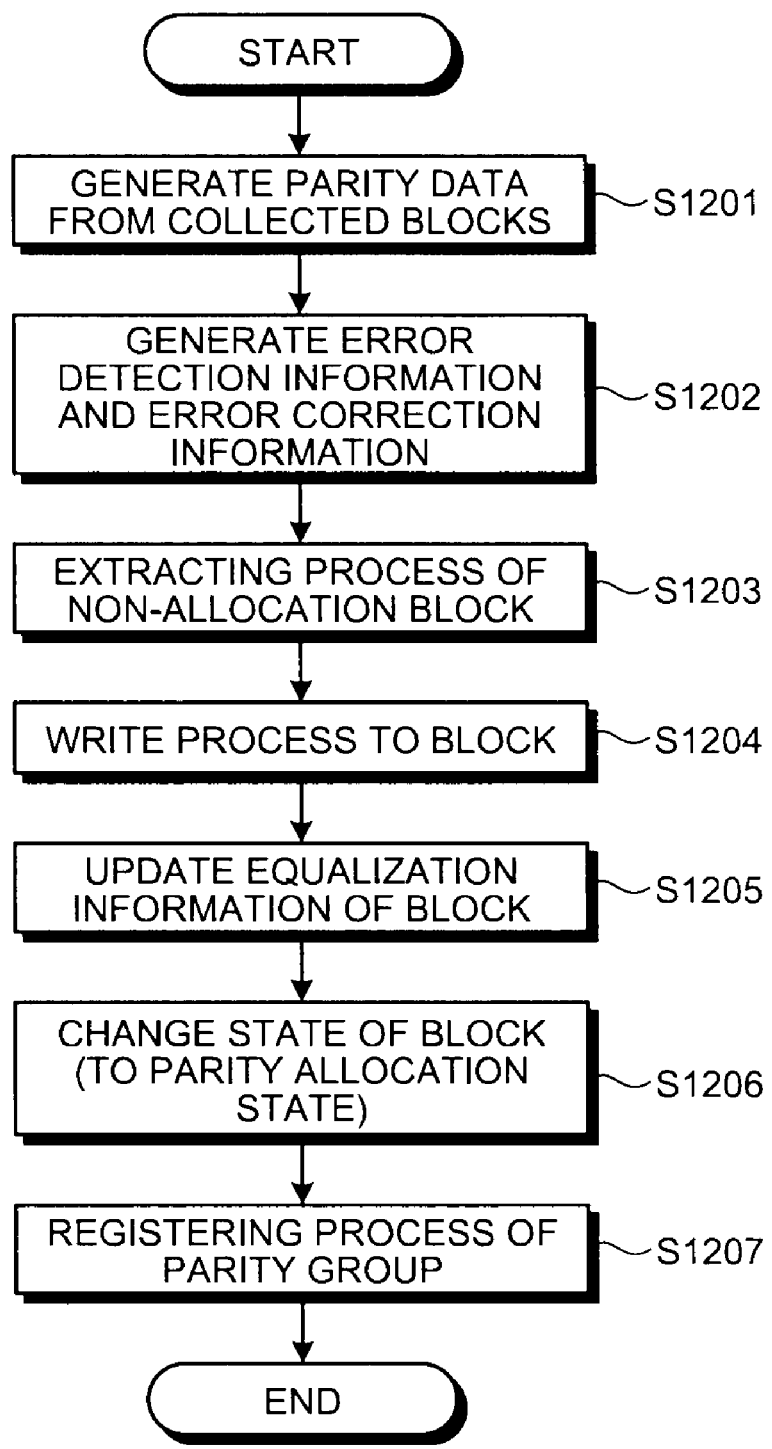
FIG. 42 is a flowchart illustrating a write process in detail according to the second embodiment.
Figure 43:
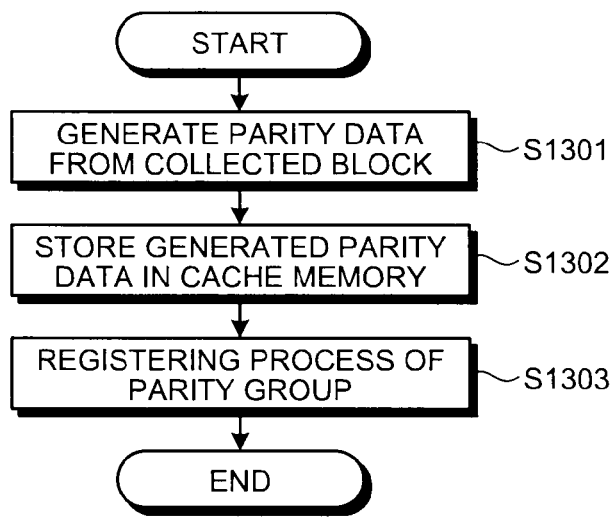
FIG. 43 is a flowchart illustrating a process of storing parity data in the cache memory 293.
Figure 44:
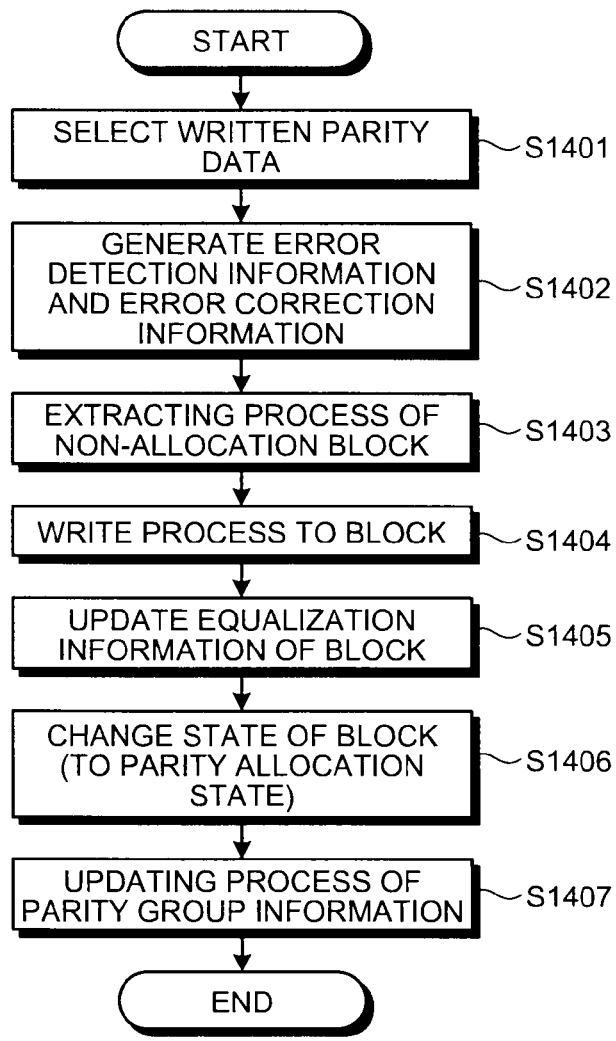
FIG. 44 is a flowchart illustrating a process of moving parity data from the cache memory 293 to the semiconductor memory array 9.

FIGS. 42 to 44 are flowcharts illustrating a process of when the parity data generating process and the parity data write process are separated. FIG. 42 specifically illustrates the processes of steps S503 and S504 extracted from FIG. 20, which is a flowchart illustrating an attention item of when the parity data generating process and the parity data write process are separated. Accordingly, instead of the processes of FIG. 42, the processes of steps S503 and S504 of FIG. 20 may be used.

In step S1201 of FIG. 42, the parity generating unit 31 generates parity data, from collected address allocation blocks of the predetermined number that generate the parity group. In step S1202, the error detection information generating unit 62 generates error detection information of the parity data and the error correction information generating unit 64 generates error correction information of the parity data.

In step S1203, the block control unit 210 extracts a non-allocation block based on the block table 12. In step S1204, the block control unit 210 executes an erasing process on data of the non-allocation block acquired in step S1203, and writes the parity data, which is generated in step S1201, in the non-allocation block acquired in step S1203.

In step S1205, the block control unit 210 updates equalization information of the block in the block table 12. In step S1206, the block control unit 210 changes the information of the block state to the parity allocation state, with respect to the block into which the parity data is written in step S1204.

In step S1207, the parity control unit 230 adds the information of the generated parity group to and registers the information in the parity correspondence list 39.

FIGS. 43 and 44 illustrate examples of the case where the process of storing the parity data in the cache memory 293 and the process of writing the parity data from the cache memory 293 to the semiconductor memory array 9 are discontinuously executed, in the processes of FIG. 42.

FIG. 43 is a flowchart illustrating a process of generating parity data and storing the parity data in the cache memory 293. This process is appropriately used, instead of the process illustrated in FIG. 42 in the parity generating process. In step S1301 of FIG. 43, the parity control unit 230 generates parity data, from collected address allocation blocks of the predetermined number that generate a parity group. In step S1302, the cache memory 293 holds the parity data that is generated in step S1301.

In step S1303, the parity control unit 230 registers information including the parity data in the parity correspondence list 39 and registers the parity group.

FIG. 44 is a flowchart illustrating a process of causing a parity data write patrol unit (not illustrated) to write the parity data, which is stored in the cache memory 293, in the semiconductor memory array 9. The process of writing the parity data from the cache memory 293 to the semiconductor memory array 9 may be executed when the parity data is stored in all areas for parity of the cache memory 293 and new parity data cannot be stored, or when the usage of the areas for parity in the cache memory 293 exceeds a predetermined threshold value.

However, the present invention is not limited thereto, and the parity data on the cache memory 293 may be written into the semiconductor memory array 9, when a cache flash command, which is a command requesting to write all of the data on the cache memory 293 in the semiconductor memory, is received from the host device 300 or an announce notification command of power supply disconnection is received from the host device 300. This process may be regularly executed or the process may be executed when a process load of the controller 200 is low. Also, the process may be executed at previously determined or dynamically determined timing.

In step S1401 of FIG. 44, a parity data write patrol unit (not illustrated) selects parity data to be written into the semiconductor memory array 9, from the parity data stored in the cache memory 293. When the parity data is selected, the parity data is written in the sequence in which the parity data is stored in the cache memory 293, the possibility of the parity data being updated on the cache memory becomes high, and the write process to the semiconductor memory array 9 can be reduced.

A determination reference of the storage sequence may be any one of the update count, the update sequence, and a value that is obtained by evaluating the update count and the update sequence using a predetermined evaluation function. However, the determination reference of the storage sequence is not limited thereto, and an appropriate determination reference may be adopted.

In step S1402, the error correction control unit 260 generates error detection information and error correction information from the parity data selected in step S1401 and prepares the write contents in the block.

In step S1403, the block control unit 210 executes an extracting process of the non-allocation block and secures the non-allocation block. In step S1404, the block control unit 210 executes an erasing process on the non-allocation block secured in step S1403 and writes the contents to be written prepared in steps S1401 and S1402. In this case, the block control unit 210 records the error detection information and the error correction information in the data written block. However, the block control unit 210 may record the error detection information and the error correction information in a predetermined block that is different from the data written block or record the error detection information and the error correction information in a storage area other than the semiconductor memory array 9.

In step S1405, the block control unit 210 updates equalization information in the block table 12. In step S1406, the block control unit 210 changes the information of the block state in the block table 12 to the parity allocation state. Thereby, the block where the write process is executed in step S1404 becomes the parity allocation block.

In step S1407, the parity control unit 230 executes a process of updating the information of the parity group in the parity correspondence list 39. Specifically, the parity control unit 230 updates the information of the parity group, which is registered through the information indicating that the parity data exists on the cache memory 293 in step S1302 of FIG. 43, with information indicating that the parity data exists in the data written block.

The processes of steps S1401 to S1407 may be repetitively executed according to necessity. For example, when the storage area of the cache memory 293 is full or the amount of parity data stored in the storage area of the cache memory 293 exceeds a predetermined threshold value, all of the parity data that is stored in the cache memory 293 may be written or a part of the parity data may be written.

For example, when the cache flash command is received, all of the parity data is written. When the announce notification command of the power supply disconnection is received, all of the parity data may be written or a part of the parity data may be written.

As an example of writing a part of parity data that is stored in the cache memory 293, the case where it is determined that the write amount of parity data is large and the write completion is not in time for the power supply disconnection may be occurred. At this time, the management information of the parity data may be stored. The management information of the parity data may be stored in a predetermined block or recorded in a storage area other than the semiconductor memory array 9.

As the management information of the parity data, for example, the following information is exemplified. However, the management information is not limited to the following examples.

Information on whether parity data of certain parity group exists in the semiconductor memory array 9, that is, whether the parity data is in a state where the parity data is not erased even at the time of the power supply disconnection.

Information on whether the parity data of certain parity group exists in the cache memory 293, that is, whether the parity data is in a state where the parity data is erased at the time of the power supply disconnection.

When the part of the parity data that is stored in the cache memory 293 is written, at appropriate timing after power is supplied again, a redundancy state reconstructing unit (not illustrated) may regenerate the parity data that is erased due to the power supply disconnection, based on the management information of the parity data, and write the parity data in the cache memory 293 or the semiconductor memory array 9. Thereby, a state of the redundancy configuration before the power supply disconnection can be restored, and the redundancy configuration based on the parity can be restored.

(Restoring Process)

In such as the read process, when the data is restored by the parity, the parity data to restore the data is read from one of the following two places.

(J1) When the parity data is stored in the block of the semiconductor memory array 9, the parity data is read from the block.

(J2) When the parity data is stored in the cache memory 293, the parity data is read from the cache memory 293. In this case, it can be expected to shorten the read time, as compared with the case of (J1).

(Operation of Parity Data Update)

FIGS. 45A to 45C illustrate an operation method when the parity data is updated. As the operation method when the parity data is updated, the following two methods exist. The case where the data of the data block constructing the parity group is updated by the write process and the parity data of the parity group is updated will be described below.

First, an example of the case where the data of the data block constructing the parity group is updated at one place by the write process and the parity data of the parity group is updated will be described. Specifically, in the example of FIG. 45A, in a state where parity data P is generated from data recorded in blocks A to G and a parity group is constructed, when data of the block C is updated and becomes C', the parity data P is updated and parity data P' is generated.

The first method is illustrated in an expression (1) of FIG. 45A. The expression (1) illustrates a method that calculates parity data after update from a data group constituting a parity group. In this method, the parity data can be calculated using only information after update. Meanwhile, when the defined number of data constructing the parity group increases, the processing amount increases.

The second method is illustrated in an expression (2) of FIG. 45A. The expression (2) illustrates a method that calculates parity data after update from data before update, parity data before update, and data after update. In this method, information before update is needed. Meanwhile, the processing amount in the second method may be smaller than that in the first method.

Next, an example of the case where the data of the data block constructing the parity group is updated at two or more places by the write process and the parity data of the parity group is updated will be described.

FIG. 45B illustrates an example of the case where data at two places is simultaneously or continuously updated. Specifically, in the example of FIG. 45B, in a state where parity data P is generated from data recorded in blocks A to G and a parity group is constructed, when data of the block C is updated and becomes C' and data of the block F is updated and becomes F' at the same time or continuously, the parity data P is updated and parity data P' is generated.

Even in the case where the data at the two places is simultaneously or continuously updated, when the parity data is calculated by the first method, the process contents and the processing amount are the same as those in the case where the data at one place is updated. In FIG. 45B, when the parity data is calculated by the second method, as illustrated in an expression (2), an operation result may be a combination of the operation results of when the data at one place is updated.

Accordingly, when the parity data is calculated, the processing amount can be reduced by selecting the first method or the second method based on the defined number of data groups constructing the parity group.

Meanwhile, in the example of the write process according to the second embodiment illustrated in FIG. 8, at the time of updating the mapping in step S103, the block before update is collected as the non-allocation block. In step S105, the parity allocation block before update is collected as the non-allocation block.

In this embodiment, instead of collecting the block before update and the parity allocation block before update as the non-allocation blocks in steps S103 and S105, the block before update and the parity allocation block before update may be collected when the parity data is generated. Thereby, the parity data can be calculated by the second method.

The place where the data is held until the parity data is generated may not be the block. For example, the data of the pre-update block and the data of the parity allocation block before update may be read in the cache memory 293 and held. Thereby, the consumption amount of the non-allocation block can be suppressed and wear leveling can be appropriately executed.

The partially calculated data may be stored in the cache memory 293. For example, partially calculated data T that is included in the expression (2) of FIG. 45B and illustrated in an expression (1) of FIG. 45C may be stored in the cache memory 293. The parity data can be calculated from the partially calculated data T and the data C' and F' after update, using the expression (2) of FIG. 45C. Thereby, the consumption amount of the cache memory 293 can be suppressed and the calculation amount when the parity data is generated can be suppressed.

Eleventh Embodiment

The controller that is included in the semiconductor storage according to the embodiments of the present invention may be realized by a CPU. A control method of the semiconductor memory according to the embodiments of the present invention is realized when the CPU executes a program stored in a ROM or a hard disk drive and uses a main memory, such as a RAM, as a work area.

The present invention is not limited to the above-described embodiments, and the components may be deformed and specified in a range without departing from the spirit and scope of the present invention, at the embodiment stage. Also, the plural components disclosed in the embodiments may be appropriately combined to form various inventions. For example, some components may be removed from all of the components disclosed in the embodiments, and the components of the different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor storage, comprising:
a receiver configured to receive, from a host device, a write request including data to be written into a semiconductor memory array or information of a storage place of the data to be written into the semiconductor memory array and logical address information of the semiconductor memory array output by the host device;
a storage unit configured to hold redundancy data generation/non-generation information indicating whether or not redundancy data of data held by the semiconductor memory array is generated;
a writing unit configured to write the data to be written included in the write request or the data to be written obtained based on the information of the storage place thereof included in the write request, into the semiconductor memory array, and write redundancy data generation/non-generation information of the written data into the storage unit;
a first data extracting unit configured to extract data whose redundancy data is not generated from among the data held by the semiconductor memory array, based on the redundancy data generation/non-generation information held by the storage unit;
a first redundancy data generating unit configured to generate redundancy data based on the extracted data;
a first redundancy data writing unit configured to write the generated redundancy data into the semiconductor memory array; and
a first redundancy data generation/non-generation information updating unit configured to update the redundancy data generation/non-generation information, held by the storage unit, of the data whose redundancy data is generated.

2. The semiconductor storage according to claim 1, further comprising a first storage unit configured to hold address association information indicating information on association between the logical address information and physical address information of the data recorded in the semiconductor memory array,
wherein the writing unit is further configured to write the address association information of the data written into the semiconductor memory array, into the first storage unit.

3. The semiconductor storage according to claim 2,
wherein the receiver is further configured to receive a read request including the logical address information from the host device, and the semiconductor storage further comprises:

a reading unit configured to read data from the semiconductor memory array using the physical address information associated with the logical address information, and transmit, to the host device, the read data or a read reply, the read reply being information indicating that, when the read request includes information indicating a write place of the read data, a process of writing the data into the write place ends.

4. The semiconductor storage according to claim 3, further comprising:

a block control unit configured to associate identification information of a block of the semiconductor memory array, which corresponds to physical address information, with block state information, which corresponds to information indicating a type of data held by the block of the semiconductor memory array and manage an association result; and a parity control unit configured to manage the redundancy data generation/non-generation information including parity correspondence information on correspondence between identification information of a block that holds data and identification information of a block that holds redundancy data generated from the data held by the block, wherein the first data extracting unit further configured to extract, based on the parity correspondence information, blocks that are not included in a parity group from among blocks whose block state information indicates an address allocation state where identification information of the block is associated with logical address information in the address association information, the parity group including one or more blocks of a parity allocation state that hold redundancy data and one or more blocks that hold data becoming a base of generation of the redundancy data held in the blocks of the parity allocation state, the first redundancy data generating unit is further configured to generate one or more redundancy data from the data held by the extracted blocks, according to a predetermined method, the first redundancy data writing unit is further configured to write the generated redundancy data into a block of a non-allocation state corresponding to a block not holding data, based on the block state information, and change the block state information of the block into which the redundancy data is written to information indicating the parity allocation state, the first redundancy data generation/non-generation information updating unit generates a new parity group from the extracted blocks and the block of the parity allocation state and registers information of the parity group in the parity correspondence information, and the writing unit is further configured to write the data included in the write request or the data obtained based on the information of the storage place thereof included in the write request, into the block of the non-allocation state based on the block state information, change the block state information of the block into which the data is written to information indicating the address allocation state, associate the logical address information included in the write request with the physical address information of the block into which the data is written in the address association information, change the block state information of the block of the physical address associated with the logical address included in the write request before the process of writing the data to information indicating the non-allocation state, erase information of the parity group in the parity correspondence information when the block is included in the parity group, and change the block state information of the block of the parity allocation state included in the erased parity group to information indicating the non-allocation state.

5. The semiconductor storage according to claim 4,
wherein the first data extracting unit and the first redundancy data generation/non-generation information updating unit is further configured to select a block of an address allocation state constructing a new parity group, according to a predetermined arrangement sequence.

6. The semiconductor storage according to claim 5,
wherein the predetermined arrangement sequence is a time sequence in which data held for each block and/or logical address information is written, a count sequence in which the data held for each block and/or logical address information is written, or a sequence of evaluation values obtained from information of the time sequence and information of the count sequence based on a predetermined evaluation function.

7. The semiconductor storage according to claim 4, further comprising a block number changing unit configured to change the number of blocks whose block state information indicates a parity allocation state.

8. The semiconductor storage according to claim 7,
wherein the block number changing unit includes:

a second erasing unit configured to erase information of a parity group extracted on the basis of a predetermined method from the parity correspondence information, and change the block state information of the block of the pre-update allocation state and the block of the parity allocation state included in the erased parity group to information indicating the non-allocation state;

a second data extracting unit configured to extract a block of the address allocation state included in the erased parity group or not included in any of the parity groups;

a second redundancy data generating unit configured to generate one or more pieces of redundancy data from the extracted block;

a second redundancy data writing unit configured to write the generated redundancy data into the block of the non-allocation state corresponding to the block not holding the data based on the block state information, and change the block state information of the block into which the redundancy data is written to information indicating the parity allocation state; and a third redundancy data generation/non-generation information updating unit configured to generate a new parity group from the extracted block and the block of the parity allocation state and register information of the parity group in the parity correspondence information, and the second redundancy data generating unit and the third redundancy data generation/non-generation information updating unit change the number of blocks that are included in the parity group and hold data becoming a base of the generation of the redundancy data held in the block of the parity allocation state, and/or select one redundancy data generating method from among a plurality of redundancy data generating methods where blocks with the different number in the parity allocation state are associated.

9. The semiconductor storage according to claim 7, wherein the block number changing unit is further configured to change the number of blocks whose block state information indicates the parity allocation state, when the parity group is generated or information of the parity group is erased from the parity correspondence information.

10. The semiconductor storage according to claim 4, further comprising:
a fourth data extracting unit configured to extract a block not included in the parity group over a predetermined time, from among the blocks whose block state information indicates the address allocation state, based on the parity correspondence information;
a fourth redundancy data generating unit configured to generate one or more pieces of redundancy data from the extracted block;
a fourth redundancy data writing unit configured to write the generated redundancy data into a block of the non-allocation state corresponding to the block not holding the data, based on the block state information, and change the block state information of the block into which the redundancy data is written to information indicating the parity allocation state; and
a fourth redundancy data generation/non-generation information updating unit configured to generate a new parity group from the extracted block and the block of the parity allocation state and registers information of the parity group in the parity correspondence information.

11. The semiconductor storage according to claim 4, further comprising a temporary storage unit configured to store the redundancy data generated by the first to fourth redundancy data generating units,
wherein each of the first to fourth redundancy data writing units is further configured to write the redundancy data, which is stored in the temporary storage unit, into the block of the non-allocation state corresponding to the block not holding the data, based on the block state information, and change the block state information of the block into which the redundancy data is written to information indicating the parity allocation state, and
each of the first to fourth redundancy data generation/non-generation information updating unit is further configured to generate a new parity group from the extracted block and the redundancy data stored in the temporary storage unit, register information of the parity group in the parity correspondence information, erase the registered information of the parity group from the parity correspondence information, generate a new parity group from the extracted block and the block of the parity allocation state, and register information of the parity group in the parity correspondence information.

12. The semiconductor storage according to claim 3, further comprising:
a block control unit configured to associate identification information of a block of the semiconductor memory array, which corresponds to physical address information, with block state information, which corresponds to information of data held by the block of the semiconductor memory array and manages an association result; and
a parity control unit configured to manage the redundancy data generation/non-generation information including parity correspondence information on correspondence between identification information of a block that holds data and identification information of a block that holds redundancy data generated from the data held in the block,
wherein the writing unit is further configured to write the data included in the write request or the data obtained based on the information of the storage place thereof included in the write request, into a block of a non-allocation state corresponding to a block not holding data, based on the block state information, change the block state information of the block into which the data is written to information indicating an address allocation state that is a block state where the identification information of the block is associated with the logical address information in the address association information, associate the logical address information included in the write request with the physical address information of the block into which the data is written in the address association information, set the block state information of the block of the physical address associated with the logical address included in the write request before the process of writing the data, to information indicating a pre-update allocation state that is a block state where invalid data is held, when the block is included in a parity group, and change the block state information of the block of the physical address associated with the logical address included in the write request before the process of writing the data to information indicating a non-allocation state that is a block state where data is not held, when the block is not included in the parity group, and
the semiconductor storage further includes a third erasing unit configured to erase information of a parity group including a block in the pre-update allocation state from the parity correspondence information, and change the block state information of the block of the pre-update allocation state and the block of the parity allocation state included in the erased parity group to information indicating the non-allocation state,
a third data extracting unit configured to extract a block of the address allocation state included in the erased parity group,
a third redundancy data generating unit configured to generate one or more redundancy data from the extracted block,
a third redundancy data writing unit configured to write the generated redundancy data into the block of the non-allocation state based on the block state information, and change the block state information of the block into which the redundancy data is written to information indicating the parity allocation state, and
a second redundancy data generation/non-generation information updating unit configured to generate a new parity group from the extracted block and the block of the parity allocation state and register information of the parity group in the parity correspondence information.

13. The semiconductor storage according to claim 12, further comprising:
a pre-update block collecting unit configured to select a block of the pre-update allocation state whose block state information is changed to information indicating the non-allocation state and/or a block of the address allocation state to be newly included in the parity group, according to a predetermined arrangement sequence.

14. The semiconductor storage according to claim 13, wherein the predetermined arrangement sequence is a time sequence in which data held for each block and/or logical address information is written, a count sequence in which the data held for each block and/or logical address information is written, or a sequence of evaluation values obtained from information of the time sequence and information of the count sequence based on a predetermined evaluation function.

15. The semiconductor storage according to claim 3, further comprising:
a restoration possibility/impossibility determining unit configured to determine that restoration of the data held by the block included in the parity group is enabled, based on the parity correspondence information; and
a restoring unit configured to restore the data held by one block from data held by the block included in the parity group including the block, based on the parity correspondence information,
wherein, when at least an error is detected in the data read from the semiconductor memory array and it is determined by the restoration possibility/impossibility determining unit that the restoration of the data held by the block is enabled, the reading unit restores the data held by the block by the restoring unit and transmits the read reply of the restored data to the host device.

16. The semiconductor storage according to claim 15, further comprising a read patrol unit configured to restore the data stored in the block by the restoring unit, write the restored data to the semiconductor memory array, and update the redundancy data generation/non-generation information, the address association information, and/or the block state information, when the restoration possibility/impossibility determining unit determines that the restoration of the data stored in the block is enabled, in the case where the data recorded in the block whose block state information indicates any block state other than the non-allocation state, among the blocks of the semiconductor memory array, is read regardless of the read request and at least an error is detected in the data read from the semiconductor memory array.

17. The semiconductor storage according to claim 3, further comprising a dynamic updating unit configured to rewrite the data held by a plurality of blocks of the semiconductor memory array in the different blocks, and update the redundancy data generation/non-generation information, the address association information, and/or the block state information.

18. The semiconductor storage according to claim 17,
wherein the dynamic updating unit is further configured not to execute a process of rewriting the data held by the block whose block state information indicates the non-allocation state.

19. A semiconductor storage, comprising:
a receiver configured to receive, from a host device, a write request, which includes data to be written in one or more semiconductor memory arrays or information of a storage place of the data to be written in the one or more semiconductor memory arrays and logical address information of the one or more semiconductor memory arrays output by the host device;
a storage unit configured to hold redundancy data generation/non-generation information corresponding to information indicating whether redundancy data of the data held by the one or more semiconductor memory arrays is generated;
a writing unit configured to write data to be written included in the write request or the data to be written obtained based on the information of the storage place thereof included in the write request, into the one or more semiconductor memory arrays, and write redundancy data generation/non-generation information of the written data in the storage unit;
a redundancy data generating/writing unit configured to extract data whose redundancy data is not generated from among the data held by the one or more semiconductor memory arrays, based on the redundancy data generation/non-generation information held by the storage unit, generate redundancy data based on the extracted data, write the generated redundancy data in the one or more semiconductor memory arrays, and update the redundancy data generation/non-generation information of the data whose redundancy data held by the storage unit is generated; and
a block number changing unit configured to change a number of the one or more semiconductor memory arrays in which the redundancy data is held, based on the redundancy data generation/non-generation information held by the storage unit, and update the redundancy data generation/non-generation information.

20. A semiconductor storage, comprising:
a receiver configured to receive, from a host device, a write request, which includes data to be written in a semiconductor memory array or information of a storage place of the data to be written in the semiconductor memory array and logical address information of the semiconductor memory array output by the host device;
a storage unit configured to hold redundancy data generation/non-generation information corresponding to information indicating whether redundancy data of the data held by the semiconductor memory array is generated;
a writing unit configured to write data to be written included in the write request or the data to be written obtained based on the information of the storage place thereof included in the write request, into the semiconductor memory array, and write redundancy data generation/non-generation information of the written data in the storage unit;
a redundancy data generating unit configured to extract data whose redundancy data is not generated from among the data held by the semiconductor memory array, based on the redundancy data generation/non-generation information held by the storage unit, generate redundancy data based on the extracted data, and update the redundancy data generation/non-generation information of the data whose redundancy data is generated;
a temporary storage unit configured to store the generated redundancy data;
a redundancy data generation/non-generation information updating unit configured to store the generated redundancy data in the temporary storage unit and update the redundancy data generation/non-generation information; and
a redundancy data writing unit configured to write the redundancy data stored in the temporary storage unit into the semiconductor memory array, based on the redundancy data generation/non-generation information, and update the redundancy data generation/non-generation information.

* * * * *